US009716894B2

(12) United States Patent
Joshi et al.

(10) Patent No.: US 9,716,894 B2
(45) Date of Patent: Jul. 25, 2017

(54) INTRA PREDICTION MODES FOR LOSSY CODING WHEN TRANSFORM IS SKIPPED

(71) Applicant: QUALCOMM Incorporated, San Diego, CA (US)

(72) Inventors: Rajan Laxman Joshi, San Diego, CA (US); Joel Sole Rojals, La Jolla, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 228 days.

(21) Appl. No.: 14/223,874

(22) Filed: Mar. 24, 2014

(65) Prior Publication Data

US 2014/0286400 A1   Sep. 25, 2014

Related U.S. Application Data

(60) Provisional application No. 61/805,094, filed on Mar. 25, 2013, provisional application No. 61/809,199, filed on Apr. 5, 2013, provisional application No. 61/809,203, filed on Apr. 5, 2013, provisional application No. 61/809,811, filed on Apr. 8, 2013, provisional application No. 61/809,870, filed on Apr.
(Continued)

(51) Int. Cl.
| | | |
|---|---|---|
| H04N 7/12 | (2006.01) | |
| H04N 11/02 | (2006.01) | |
| H04N 11/04 | (2006.01) | |
| H04N 19/467 | (2014.01) | |
| H04N 19/70 | (2014.01) | |
| H04N 19/593 | (2014.01) | |
| H04N 19/436 | (2014.01) | |

(52) U.S. Cl.
CPC ......... *H04N 19/467* (2014.11); *H04N 19/593* (2014.11); *H04N 19/70* (2014.11); *H04N 19/436* (2014.11)

(58) Field of Classification Search
CPC ..... H04N 19/70; H04N 19/467; H04N 19/593
USPC .................................................. 375/240.03
See application file for complete search history.

(56) References Cited

U.S. PATENT DOCUMENTS 5,974,184 A    10/1999  Eifrig et al.
6,125,348 A *   9/2000  Levine .................. G06T 9/004
                                                          704/230
(Continued)

FOREIGN PATENT DOCUMENTS

EP    1773071 A2    4/2007
TW    201313033 A   3/2013
(Continued)

OTHER PUBLICATIONS

Gao et al., On Lossless Coding for HEVC, Feb. 2013, Visual Information Processing and Communication IV, edited by Amir Said, Onur G. Guleryuz, Robert L. Stevenson, Proc. of SPIE-IS&T Electronic Imaging, SPIE vol. 8666, 866609, doi: 10.1117/12.2010198.*

(Continued)

*Primary Examiner* — Jeremaiah C Hallenbeck-Huber
*Assistant Examiner* — Boubacar Abdou Tchoussou

(57) ABSTRACT

A video coder applies a residual differential pulse code modulation technique to a residual data of a block coded using lossy coding. The block may be coded without application of a transform to the residual data.

34 Claims, 10 Drawing Sheets

Related U.S. Application Data 8, 2013, provisional application No. 61/810,179, filed on Apr. 9, 2013, provisional application No. 61/810,218, filed on Apr. 9, 2013, provisional application No. 61/843,144, filed on Jul. 5, 2013.

(56) References Cited

U.S. PATENT DOCUMENTS

| | | |
|---|---|---|
| 2008/0198920 A1 | 8/2008 | Yang et al. |
| 2013/0016777 A1* | 1/2013 | Gao .................. H04N 19/176 375/240.12 |
| 2013/0022119 A1 | 1/2013 | Chien et al. |
| 2013/0028531 A1* | 1/2013 | Sato .................. H04N 19/60 382/233 |
| 2013/0114716 A1* | 5/2013 | Gao .................. H04N 19/593 375/240.14 |
| 2013/0188695 A1* | 7/2013 | Maani ................ H04N 19/70 375/240.12 |
| 2013/0343448 A1 | 12/2013 | He et al. |
| 2014/0072040 A1 | 3/2014 | Mathew et al. |
| 2014/0092977 A1 | 4/2014 | Lainema et al. |
| 2014/0092980 A1* | 4/2014 | Guo ............... H04N 19/00696 375/240.16 |
| 2014/0286400 A1 | 9/2014 | Joshi et al. |
| 2014/0286412 A1 | 9/2014 | Joshi et al. |
| 2014/0286413 A1 | 9/2014 | Joshi et al. |

FOREIGN PATENT DOCUMENTS

| | | |
|---|---|---|
| WO | 2013009896 A1 | 1/2013 |
| WO | 2013067435 A1 | 5/2013 |

OTHER PUBLICATIONS

Bross, et al., "High Efficiency Video Coding (HEVC) text Specification draft 10 (for FDIS & Consent)," JCT-VC Meeting; MPEG Meeting; Jan. 14-23, 2013; Geneva; (Joint Collaborative Team on Video Coding of ISO/IEC JTC1/SC29/WG11 and ITU-T SG.16); 297 pp.

Clare, et al., "CE11: Sign Data Hiding", JCT-VC Meeting; MPEG Meeting; Feb. 1-10, 2012; San Jose; (Joint Collaborative Team on Video Coding of 150/IEC JTC1/SC29/WG11 and ITU•I SG.16); Document: JCTVC-H0224, 10 pp.

Clare, et al., "Non-CE11: Sign Data Hiding without RDOQ", JCT-VC Meeting; MPEG Meeting; Document: JCTVC-H0227, Feb. 1-10, 2012; San Jose; (Joint Collaborative Team on Video Coding of ISO/IEC JTC1/SC29/WG11 and ITU-T SG.16); XP030111254, 10 pp.

Davies "Video coding technology proposal by BBC (and Samsung)," JCT-VC Meeting; Dresden; (Jointcollaborative Team on Video Coding of ISO/IEC JTC1/SC29/WG11 and ITU-TSG.16); URL: http://wftp3.itu.int/av-arch/jctvc-site/, Document: JCTVC-A125, No. XP030007574, 31 pp.

International Search Report and Written Opinion from International Application No. PCT/US2014/031728, dated Jul. 14, 2014, 14 pp.

Jeon, et al., "Non-directional intra prediction for coding efficiency improvement", JCT-VC Meeting; MPEG Meeting; Jan. 20-28, 2011; Daegu;(Joint Collaborative Team on Video Coding of ISO/IEC JTC1/SC29/WG11and ITU-T SG.16 ); No. JCTVC-D083,XP030008123, 5 pp.

Joshi, et al., "AHG8: Residual DPCM for visually lossless coding", JCT-VC Meeting; MPEG Meeting; Apr. 18-26, 2013; Incheon; (Joint Collaborative Team on Video Coding of ISO/IEC JTC1/SC29/WG11 and ITU-T SG.16 ); URL: http://wftp3.itu.int/av-arch/jctvc-site/, No. JCTVC-M0351, XP030114308, 3 pp.

Joshi, et al., "Non-RCE2: Modification of DC intra prediction mode for lossless coding", JCT-VC Meeting; MPEG Meeting; Apr. 18-26, 2013; Incheon; (Joint Collaborative Team on Video Coding of ISO/IEC JTC1/SC29/WG11 and ITU-T SG.16); URL: http://wftp3.itu.int/av-arch/jctvc-site/, No. JCTVC-M0291, XP030114248, 4 pp.

Joshi, et al., "RCE2 subtest C.2: Extension of residual DPCM to lossy coding", JCT-VC Meeting; Document: JCTVC-N0052; Vienna; (Joint Collaborative Team on Video Coding of ISO/IEC JTC1/SC29/WG11 and ITU-T SG.16 ); URL: http://wftp3.itu.int/av-arch/jctvc-site/, No. JCTVC-N0052, XP030114481, 3 pp.

Joshi, et al., "RCE2 subtest C.4: Replacement of DC mode for transform-skip and transform-bypass blocks", JCT-VC Meeting; Jul. 25-Aug. 2, 2013; Vienna; (Joint Collaborative Team on Video Coding of ISO/IEC JTC1/SC29/WG11 and ITU-T SG.16); URL: http://wftp3.itu.int/av-arch/jctvc-site/, No. JCTVC-N0053, XP030114482, 3 pp.

Lan, et al., "Compress Compound Images in H.264/MPGE-4 AVC by Exploiting Spatial Correlation", IEEE Transactions on Image Processing, IEEE Service Center, Piscataway, NJ, US, vol. 19, No. 4, Apr. 2010, XP011286321, pp. 946-957, ISSN: 1057-7149, 12 pp.

Lan, et al., "Screen Content Coding", JCT-VC Meeting; Jul. 21-28, 2010; Geneva; (Joint Collaborative Team on Video Coding of ISO/IEC JTC1/SC29/WG11 and ITU-T SG.16 ); url:http://wftp3.itu.int/av-arch/jctvcsite/, No. JCTVC-B084, XP030007664, 10 pp.

Lan, et al., "Intra and Inter Coding tools for screen contents," 20110311, No. JCTVC-E145, Mar. 16-23, 2011, XP030008651, 11 pp.

Lee, et al., "AHG7: Residual DPCM for HEVC lossless coding", JCT-VC Meeting; MPEG Meeting; Jan. 14-23, 2013; Geneva; (Joint Collaborative Team on Video Coding of ISO/IEC JTC1/SC29/WG11 and ITU-T SG.16 ); URL: http://wftp3.itu.int/av-arch/jctvc-site/, No. JCTVC-L0117, XP030113605, 6 pp.

Lee, et al., "AHG7: Residual DPCM for HEVC lossless coding," MPEG Meeting; Jan. 14-23, 2013; Geneva; (Motion Picture Expert Group or ISO/IEC JTC1/SC29/WG11), No. m27451, Document: JCTVC-L0117 _r2, 7 pp.

Mrak, et al., "CE6.b.2: Report on Combined Intra Prediction with Parallel Intra Coding by BBC and Sharp", Document No. JCTVC-E130, Mar. 16-23, 2011, XP030008636, 5 pp.

Naccari, et al., "HEVC Range extensions test model 1 encoder description," JCT-VC Meeting; Oct. 23-Nov. 1, 2013; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-01013, 16 pp.

Saxena, et al., "Non-RCE2: On sample adaptive intra prediction for oblique modes in lossy coding," JCT-VC Meeting;.Jul. 25-Aug. 2, 2013; Vienna; (Joint collaborative Team on Video coding of ISO/IEC JTC1/SC29/WG11 and ITU-T SG.16); URL: http://wftp.itu.int/av-arch/jctvc-site/ No. JCTVC-N0177-v4, XP030114658, 7 pp.

Sole, et al., "Transform Coefficient Coding in HEVC", IEEE Transactions on Circuits and Systems for Video Technology,IEEE Service Center, Piscataway, NJ, US, vol. 22, No. 12, Dec. 2012, XP011487805, ISSN: 1051-8215, pp. 1765-1777.

Sullivan, et al., "Overview of the High Efficiency Video Coding (HEVC) Standard," IEEE Transactions on Circuits and Systems for Video Technology, IEEE Service Center, Piscataway, NJ, US, vol. 22, No. 12, Dec. 2012, XP011487803, pp. 1649-1668

Zhou, et al., "AHG19: Method of frame-based lossless coding mode for HEVC", MPEG Meeting; Feb. 1-10, 2012; San Josa CR; (Motion Picture Expert Group or ISO/IEC JTC1/SC29/WG11), No. m22955, XP030051480, 14 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

(56) References Cited

OTHER PUBLICATIONS

Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "High efficiency video coding (HEVC) text specification draft 10 (for FDIS & Last Call)," 12th Meeting: Geneva, CH, Jan. 12-23, 2013, JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
Flynn, et al. "High Efficiency Video Coding (HEVC) Range Extensions text specification: Draft 3," Document: JCTVC-M1005_v1, Apr. 18-26, 2013, 315 pp.
Flynn, et al. "High Efficiency Video Coding (HEVC) Range Extensions text specification: Draft 5," Document: JCTVC-O1005_v4, Oct. 23-Nov. 1, 2013, 361 pp.
Second Written Opinion from International Application No. PCT/US2014/031728, dated Mar. 30, 2015, 6 pp.
U.S. Appl. No. 61/805,094, filed Mar. 25, 2013, by Joshi, et al.
U.S. Appl. No. 61/809,203, filed Apr. 5, 2013, by Joshi, et al.
U.S. Appl. No. 61/809,811, filed Apr. 8, 2013, by Joshi, et al.
U.S. Appl. No. 61/810,179, filed Apr. 9, 2013, by Joshi, et al.
Pennebaker, et al., "JPEG Still Image Data Compresion Standard", Jan. 1992, JPEG Still Image Data XP002233886, pp. 81-96.
International Preliminary Report on Patentability from International Application No. PCT/US2014/031728, dated Jul. 7, 2015, 9 pp.
Mrak et al., "Improving Screen Content Coding in HEVC by Transform Skipping," BBC Research & Development, NHP 244, Mar. 2013, 9 pp.

* cited by examiner

| $P_{-1,-1}$ | $P_{-1,0}$ | $P_{-1,1}$ | ... | $P_{-1,N-1}$ | $P_{-1,N}$ | ... | | $P_{-1,2N-1}$ |
|---|---|---|---|---|---|---|---|---|
| $P_{0,-1}$ | $P_{0,0}$ | $P_{0,1}$ | ... | $P_{0,N-1}$ | | | | |
| $P_{1,-1}$ | $P_{1,0}$ | | | ⋮ | | | | |
| ⋮ | ⋮ | | | | | | | |
| $P_{M-1,-1}$ | $P_{M-1,0}$ | ... | | $P_{M-1,N-1}$ | | | | |
| $P_{M,-1}$ | | | | | | | | |
| ⋮ | | | | | | | | |
| | | | | | | | | |
| $P_{2M-1,-1}$ | | | | | | | | |

M = N = 4 in this figure

FIG. 2

M = N = 4 in this figure

INTRA PREDICTION MODES FOR LOSSY CODING WHEN TRANSFORM IS SKIPPED

This application claims the benefit of U.S. Provisional Patent Application No. 61/805,094, filed Mar. 25, 2013, U.S. Provisional Patent Application No. 61/809,199, filed Apr. 5, 2013, U.S. Provisional Patent Application No. 61/809,203, filed Apr. 5, 2013, U.S. Provisional Patent Application No. 61/809,811, filed Apr. 8, 2013, U.S. Provisional Patent Application No. 61/809,870, filed Apr. 8, 2013, U.S. Provisional Patent Application No. 61/810,179, filed Apr. 9, 2013, U.S. Provisional Patent Application No. 61/810,218, filed Apr. 9, 2013, and U.S. Provisional Patent Application No. 61/843,144, filed Jul. 5, 2013, the entire content of each of which is incorporated herein by reference.

TECHNICAL FIELD

This disclosure relates to video coding and compression.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards, to transmit, receive and store digital video information more efficiently.

Video compression techniques perform spatial (intra-picture) prediction and/or temporal (inter-picture) prediction to reduce or remove redundancy inherent in video sequences. For block-based video coding, a video slice may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, techniques of this disclosure relate to intra prediction in video coding. As described herein, a video coder applies a residual differential pulse code modulation technique to a residual data of a block coded using lossy coding. The block may be coded without application of a transform to the residual data.

In one example, this disclosure describes a method of decoding video data, the method comprising: generating a block of residual values, wherein the block is a transform skip block; and wherein generating the block comprises, for $0 \le i \le (M-1)$ and $0 \le j \le (N-1)$, where M is a height of the block and N is the width of the block, calculating a reconstructed residual value $Q(r_{i,j})$ for a residual value $r_{i,j}$ in the block, wherein if the block is coded using a vertical intra prediction mode, $Q(r_{i,j})$ is defined as $$Q(r_{i,j}) = \begin{cases} Q(\tilde{r}_{i,j}), & i=0, 0 \le j \le (N-1), \\ Q(\tilde{r}_{i,j}) + Q(r_{i-1,j}) & 1 \le i \le (M-1), 0 \le j \le (N-1) \end{cases},$$

wherein $Q(\tilde{r}_{i,j})$ denotes a quantized version of a modified residual value $\tilde{r}_{i,j}$, the modified residual value $\tilde{r}_{i,j}$ is a modified version of the residual value $r_{i,j}$, and $Q(r_{i-1,j})$ is a reconstructed residual value for a residual value one row above the residual value $r_{i,j}$, and wherein if the block is coded using a horizontal intra prediction mode, $Q(r_{i,j})$ is defined as:

$$Q(r_{i,j}) = \begin{cases} Q(\tilde{r}_{i,j}), & 0 \le i \le (M-1), j=0, \\ Q(\tilde{r}_{i,j}) + Q(r_{i,j-1}) & 0 \le i \le (M-1), 1 \le j \le (N-1) \end{cases},$$

wherein $Q(r_{i,j-1})$ is a reconstructed residual value for a residual value one column left of the residual value $r_{i,j}$; and, for $0 \le i \le (M-1)$ and $0 \le j \le (N-1)$, adding the reconstructed residual value $Q(r_{i,j})$ to a prediction value to reconstruct a sample value.

In another example, this disclosure describes a method of encoding video data, the method comprising: for $0 \le i \le (M-1)$ and $0 \le j \le (N-1)$, where M is a height of a block and N is the width of a block, wherein the block is a transform skip block; determining a modified residual value $\tilde{r}_{i,j}$ for a residual value $r_{i,j}$, wherein if the block is coded using a vertical intra prediction mode, $\tilde{r}_{i,j}$ is defined as:

$$\tilde{r}_{i,j} = \begin{cases} r_{i,j}, & i=0, 0 \le j \le (N-1) \\ r_{i,j} + Q(r_{(i-1),j}), & 1 \le i \le (M-1), 0 \le j \le (N-1) \end{cases},$$

wherein $Q(r_{(i-1),j})$ denotes a reconstructed residual value for a residual value $r_{i-1,j}$ one row above the residual value $r_{i,j}$, and if the block is coded using a horizontal intra prediction mode, $\tilde{r}_{i,j}$ is defined as:

$$\tilde{r}_{i,j} = \begin{cases} r_{i,j}, & 0 \le i \le (M-1), j=0 \\ r_{i,j} + Q(r_{i,(j-1)}) & 0 \le i \le (M-1), 1 \le j \le (N-1) \end{cases},$$

wherein $Q(r_{i,(j-1)})$ denotes a reconstructed residual value for a residual value $r_{i,j-1}$ one column left of the residual value $r_{i,j}$; and quantizing the modified residual value $\tilde{r}_{i,j}$ to produce a quantized modified residual value $Q(\tilde{r}_{i,j})$.

In another example, this disclosure describes a video decoding apparatus comprising: a memory storing data; and one or more processors configured to: generate a block of residual values, wherein the block is a transform skip block, and wherein to generate the block, the one or more calculators calculate, for $0 \le i \le (M-1)$ and $0 \le j \le (N-1)$, where M is a height of the block and N is the width of the block, a reconstructed residual value $Q(r_{i,j})$ for a residual value $r_{i,j}$ in the block, wherein if the block is coded using a vertical intra prediction mode, $Q(r_{i,j})$ is defined as:

$$Q(r_{i,j}) = \begin{cases} Q(\tilde{r}_{i,j}), & i = 0, 0 \le j \le (N-1), \\ Q(\tilde{r}_{i,j}) + Q(r_{i-1,j}) & 1 \le i \le (M-1), 0 \le j \le (N-1) \end{cases},$$

wherein $Q(\tilde{r}_{i,j})$ denotes a quantized version of a modified residual value $\tilde{r}_{i,j}$, the modified residual value $\tilde{r}_{i,j}$ is a modified version of the residual value $r_{i,j}$, and $Q(r_{i-1,j})$ is a reconstructed residual value for a residual value one row above the residual value $r_{i,j}$, and wherein if the block is coded using a horizontal intra prediction mode, $Q(r_{i,j})$ is defined as:

$$Q(r_{i,j}) = \begin{cases} Q(\tilde{r}_{i,j}), & 0 \le i \le (M-1), j = 0, \\ Q(\tilde{r}_{i,j}) + Q(r_{i,j-1}) & 0 \le i \le (M-1), 1 \le j \le (N-1) \end{cases},$$

wherein $Q(r_{i,j-1})$ is a reconstructed residual value for a residual value one column left of the residual value $r_{i,j}$; and, for $0 \le i \le (M-1)$ and $0 \le j \le (N-1)$, add the residual value $r_{i,j}$ to a prediction value to reconstruct a sample value.

In another example, this disclosure describes a video decoding apparatus comprising: means for generating a block of residual values, wherein the block is a transform skip block; and wherein generating the block comprises, for $0 \le i \le (M-1)$ and $0 \le j \le (N-1)$, where M is a height of the block and N is the width of the block, calculating a reconstructed residual value $Q(r_{i,j})$ for a residual value $r_{i,j}$ in the block, wherein if the block is coded using a vertical intra prediction mode, $Q(r_{i,j})$ is defined as:

$$Q(r_{i,j}) = \begin{cases} Q(\tilde{r}_{i,j}), & i = 0, 0 \le j \le (N-1), \\ Q(\tilde{r}_{i,j}) + Q(r_{i-1,j}) & 1 \le i \le (M-1), 0 \le j \le (N-1) \end{cases},$$

wherein $Q(\tilde{r}_{i,j})$ denotes a quantized version of a modified residual value $\tilde{r}_{i,j}$, the modified residual value $\tilde{r}_{i,j}$ is a modified version of the residual value $r_{i,j}$, and $Q(r_{i-1,j})$ is a reconstructed residual value for a residual value one row above the residual value $r_{i,j}$, and wherein if the block is coded using a horizontal intra prediction mode, $Q(r_{i,j})$ is defined as:

$$Q(r_{i,j}) = \begin{cases} Q(\tilde{r}_{i,j}), & 0 \le i \le (M-1), j = 0, \\ Q(\tilde{r}_{i,j}) + Q(r_{i,j-1}) & 0 \le i \le (M-1), 1 \le j \le (N-1) \end{cases},$$

wherein $Q(r_{i,j-1})$ is a reconstructed residual value for a residual value one column left of the residual value $r_{i,j}$; and for $0 \le i \le (M-1)$ and $0 \le j \le (N-1)$ means for adding the residual value $r_{i,j}$ to a prediction value to reconstruct a sample value.

In another example, this disclosure describes a video encoding apparatus comprising: a memory storing data; and one or more processors configured such that, for $0 \le i \le (M-1)$ and $0 \le j \le (N-1)$, where M is a height of a block and N is the width of a block, wherein the block is a transform skip block, the one or more processors: determine a modified residual value $\tilde{r}_{i,j}$ for a residual value $r_{i,j}$, wherein if the block is coded using a vertical intra prediction mode, $\tilde{r}_{i,j}$ is defined as:

$$\tilde{r}_{i,j} = \begin{cases} r_{i,j}, & i = 0, 0 \le j \le (N-1) \\ r_{i,j} - Q(r_{(i-1),j}), & 1 \le i \le (M-1), 0 \le j \le (N-1) \end{cases},$$

wherein $Q(r_{(i-1),j})$ denotes a reconstructed residual value for a residual value $r_{i-1,j}$ one row above the residual value $r_{i,j}$, and if the block is coded using a horizontal intra prediction mode, $\tilde{r}_{i,j}$ is defined as:

$$\tilde{r}_{i,j} = \begin{cases} r_{i,j}, & 0 \le i \le (M-1), j = 0 \\ r_{i,j} - Q(r_{i,(j-1)}) & 0 \le i \le (M-1), 1 \le j \le (N-1) \end{cases},$$

wherein $Q(r_{i,(j-1)})$ denotes a reconstructed residual value for a residual value $r_{i,j-1}$ one column left of the residual value $r_{i,j}$; and quantize the modified residual value $\tilde{r}_{i,j}$ to produce a quantized modified residual value $Q(\tilde{r}_{i,j})$.

In another example, this disclosure describes a video encoding apparatus comprising: for $0 \le i \le (M-1)$ and $0 \le j \le (N-1)$, where M is a height of a block and N is the width of a block, wherein the block is a transform skip block: means for determining a modified residual value $\tilde{r}_{i,j}$ for a residual value $r_{i,j}$, wherein if the block is coded using a vertical intra prediction mode, $\tilde{r}_{i,j}$ is defined as:

$$\tilde{r}_{i,j} = \begin{cases} r_{i,j}, & i = 0, 0 \le j \le (N-1) \\ r_{i,j} - Q(r_{(i-1),j}), & 1 \le i \le (M-1), 0 \le j \le (N-1) \end{cases},$$

wherein $Q(r_{(i-1),j})$ denotes a reconstructed residual value for a residual value $r_{i-1,j}$ one row above the residual value $r_{i,j}$, and if the block is coded using a horizontal intra prediction mode, $\tilde{r}_{i,j}$ is defined as:

$$\tilde{r}_{i,j} = \begin{cases} r_{i,j}, & 0 \le i \le (M-1), j = 0 \\ r_{i,j} - Q(r_{i,(j-1)}) & 0 \le i \le (M-1), 1 \le j \le (N-1) \end{cases},$$

wherein $Q(r_{i,(j-1)})$ denotes a reconstructed residual value for a residual value $r_{i,j-1}$ one column left of the residual value $r_{i,j}$; and means for quantizing the modified residual value $\tilde{r}_{i,j}$ to produce a quantized modified residual value $Q(\tilde{r}_{i,j})$.

In another example, this disclosure describes a computer-readable data storage medium having instructions stored thereon that, when executed, cause a video decoding apparatus to: generate a block of residual values, wherein the block is a transform skip block; and wherein generating the block comprises, for $0 \le i \le (M-1)$ and $0 \le j \le (N-1)$, where M is a height of the block and N is the width of the block, calculating a reconstructed residual value $Q(r_{i,j})$ for a residual value $r_{i,j}$ in the block, wherein if the block is coded using a vertical intra prediction mode, $Q(r_{i,j})$ is defined as:

$$Q(r_{i,j}) = \begin{cases} Q(\tilde{r}_{i,j}), & i = 0, 0 \le j \le (N-1), \\ Q(\tilde{r}_{i,j}) + Q(r_{i-1,j}) & 1 \le i \le (M-1), 0 \le j \le (N-1) \end{cases},$$

wherein $Q(\tilde{r}_{i,j})$ denotes a quantized version of a modified residual value $\tilde{r}_{i,j}$, the modified residual value $\tilde{r}_{i,j}$ is a modified version of the residual value $r_{i,j}$, and $Q(r_{i-1,j})$ is a reconstructed residual value for a residual value one row above the residual value $r_{i,j}$, and wherein if the block is coded using a horizontal intra prediction mode, $Q(r_{i,j})$ is defined as:

$$Q(r_{i,j}) = \begin{cases} Q(\tilde{r}_{i,j}), & 0 \le i \le (M-1), j = 0, \\ Q(\tilde{r}_{i,j}) + Q(r_{i,j-1}) & 0 \le i \le (M-1), 1 \le j \le (N-1) \end{cases},$$

wherein $Q(r_{i,j-1})$ is a reconstructed residual value for a residual value one column left of the residual value $r_{i,j}$; and, for $0 \le i \le (M-1)$ and $0 \le j \le (N-1)$, add the reconstructed residual value $Q(r_{i,j})$ to a prediction value to reconstruct a sample value.

In another example, this disclosure describes a computer-readable data storage medium having instructions stored thereon that, when executed, cause a video encoding apparatus to: for $0 \le i \le (M-1)$ and $0 \le j \le (N-1)$, where M is a height of a block and N is the width of a block, wherein the block is a transform skip block; determine a modified residual value $\tilde{r}_{i,j}$ for a residual value $r_{i,j}$, wherein if the block is coded using a vertical intra prediction mode, $\tilde{r}_{i,j}$ is defined as:

$$\tilde{r}_{i,j} = \begin{cases} r_{i,j}, & i = 0, 0 \le j \le (N-1) \\ r_{i,j} - Q(r_{(i-1),j}), & 1 \le i \le (M-1), 0 \le j \le (N-1) \end{cases},$$

wherein $Q(r_{(i-1),j})$ denotes a reconstructed residual value for a residual value $r_{i-1,j}$ one row above the residual value $r_{i,j}$, and if the block is coded using a horizontal intra prediction mode, $\tilde{r}_{i,j}$ is defined as:

$$\tilde{r}_{i,j} = \begin{cases} r_{i,j}, & 0 \le i \le (M-1), j = 0 \\ r_{i,j} - Q(r_{i,(j-1)}) & 0 \le i \le (M-1), 1 \le j \le (N-1) \end{cases},$$

wherein $Q(r_{i,(j-1)})$ denotes a reconstructed residual value for a residual value $r_{i,j-1}$ one column left of the residual value $r_{i,j}$; and quantize the modified residual value $\tilde{r}_{i,j}$ to produce a quantized modified residual value $Q(\tilde{r}_{i,j})$.

The details of one or more examples of the disclosure are set forth in the accompanying drawings and the description below. Other features, objects, and advantages will be apparent from the description, drawings, and claims.

BRIEF DESCRIPTION OF DRAWINGS

FIG. 2 is a conceptual diagram illustrating a block of size M (height)×N (width).

FIG. 4 is a conceptual diagram illustrating exemplary samples that may be used for prediction in video coding.

FIG. 5A shows a residual differential pulse code modulation (DPCM) direction for near-vertical modes.

FIG. 5B shows a residual DPCM direction for near-horizontal modes.

DETAILED DESCRIPTION

Figure 1:
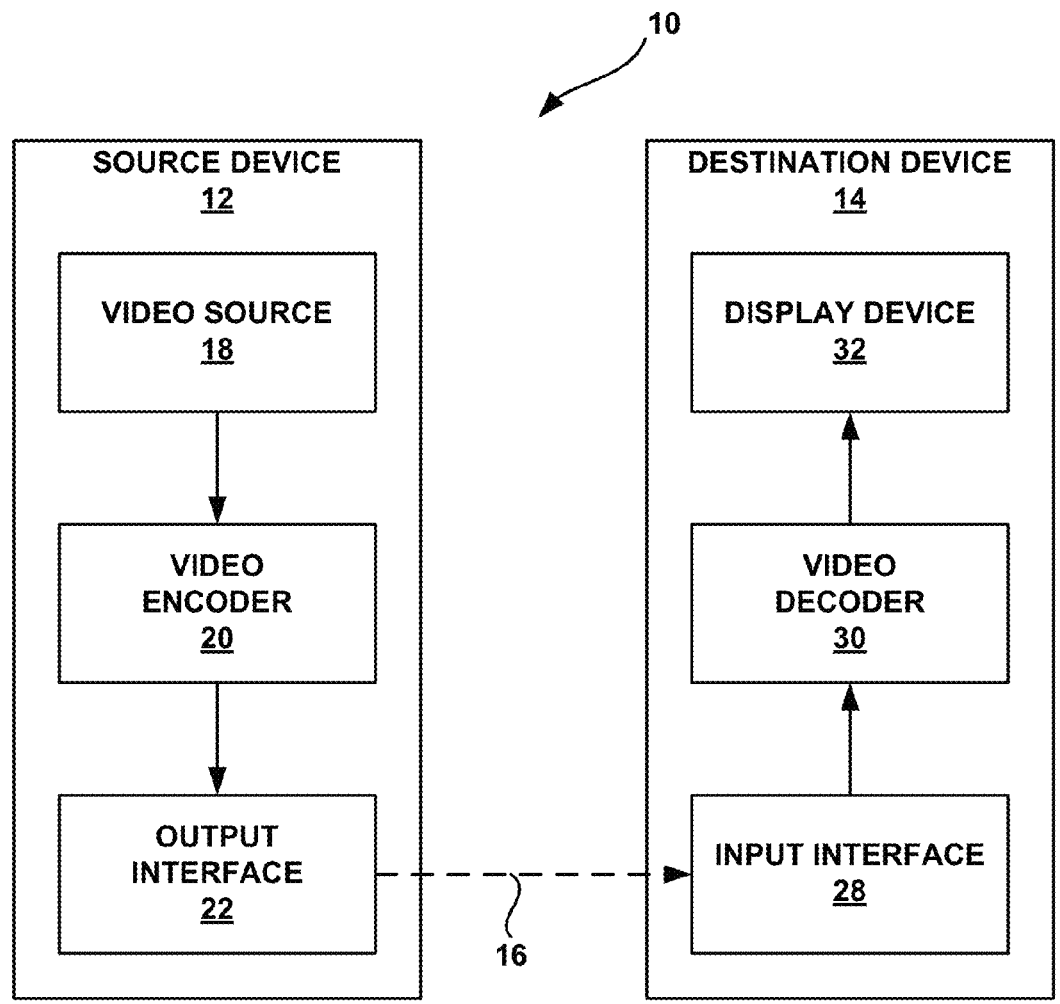
FIG. 1 is a block diagram illustrating an example video coding system that may utilize the techniques of this disclosure.

In general, this disclosure describes techniques for improving intra prediction in High Efficiency Video Coding (HEVC) and other video coding standards. Intra prediction is a process of generating, based on sample values in a current picture, a predictive block for a video block of the current picture. Thus, when a video block of a current picture is encoded using intra prediction, the video encoder does not use sample values from other pictures to generate or otherwise identify the predictive block for the video block.

After generating a predictive block, a video encoder may use the predictive block to determine a block of residual samples (i.e., a residual block). Residual samples in the residual block may indicate the difference between samples in the predictive block and corresponding original samples of the video block. The video encoder may generate a transform coefficient block by applying a transform to the residual block. The transform may convert the residual samples from a pixel domain to a transform domain. The video encoder may then quantize the transform coefficients in the transform coefficient block to reduce the bit depths of the transform coefficients. The video encoder may entropy encode syntax elements representing the quantized transform coefficients and include the resulting entropy encoded syntax elements in a bitstream.

A video decoder may perform an inverse of this process. That is, the video decoder may entropy decode syntax elements in the bitstream to determine quantized transform coefficients. The video decoder may then inverse quantize the quantized transform coefficients to determine the transform coefficients. Furthermore, the video decoder may apply an inverse transform to the transform coefficients to determine the residual block. In addition, the video decoder may determine a predictive block (e.g., using intra prediction). The video decoder may use samples in the predictive block and corresponding residual samples in the residual block to reconstruct samples of the video block.

The application of the transform and the use of quantization causes information loss. Thus, the samples of a video block reconstructed by the video decoder may not have the same level of precision as the original samples of the video block. Accordingly, application of the transform and use of quantization may be a form of "lossy" coding. In some instances, the video encoder may encode a video block using lossless encoding. When the video encoder encodes a video block using lossless encoding, the video encoder does not apply the transform to residual samples and does not quantize the residual samples. Likewise, the video decoder does not apply inverse quantization or the inverse transform. As a result, the samples of the video block reconstructed by the video decoder may have the same level of precision as the original samples of the video block.

In other instances, the video encoder may perform a type of lossy coding in which the video encoder does not apply a transform to residual samples, but does quantize the residual samples. Likewise, the video decoder may apply inverse quantization to the residual samples, but does not apply an inverse transform to the residual samples. Because the video encoder still applies quantization to the residual samples, the samples reconstructed by the video decoder may have less precision than the original samples, but the precision loss may potentially be less than if the transform had been applied.

As indicated above, a video coder (e.g., a video encoder or a video decoder) may use intra prediction to generate a predictive block. More specifically, the video coder uses a particular intra prediction mode from among a plurality of available intra prediction modes to generate the predictive block. In HEVC and other video coding standards, the intra prediction modes include a plurality of directional intra prediction modes, a planar intra prediction mode, and a DC intra prediction mode. In general, when the video coder generates a predictive block using the planar intra prediction mode, the samples of the predictive block may be determined based a combination of linear projections. When the video coder generates a predictive block using the DC intra prediction mode, the video coder may determine a DC intra prediction value. The DC intra prediction value may be an average value of samples adjacent to a left edge and a top edge of the predictive block. The video coder may set each sample value in the predictive block equal to the DC intra prediction value.

Some techniques of this disclosure provide improvements to the DC intra prediction mode when a video coder uses lossless coding. In lossless coding, a video encoder may use original values of samples when using DC intra prediction mode to determine values of samples in a predictive block. In lossy coding, a video decoder does not have access to the original values of samples when using DC intra prediction to determine values of samples in a predictive block. However, in lossless coding, the video decoder does have access to reconstructed values of samples when using DC intra prediction to determine values in the predictive block. In lossless coding, the reconstructed values of the samples are the same as the original values of the samples.

As described herein, the video coder may generate a predictive block. As part of generating the predictive block, the video coder may use at least one of a losslessly reconstructed sample to left of a current sample in a current row of a predictive block and a losslessly reconstructed sample for a row of the predictive block above the current row for DC prediction of the current sample. Furthermore, in some instances, this may enable the video decoder to pipeline the determination of sample values in the predictive block.

Furthermore, as indicated above, a video encoder may perform a form of lossy coding in which quantization is used but the transform is skipped, which may be referred to as transform skip coding. In accordance with one or more additional techniques of this disclosure, the video encoder may apply a form of residual differential pulse code modulation (DPCM) to prepare the non-transformed, but quantized, residual samples for coding. This form of residual DPCM is described in detail elsewhere in this disclosure. In contrast to other proposals for using DPCM in lossy intra coding, this form of residual DPCM described in this disclosure may increase throughput of the video encoder and/or video decoder.

As indicated above, a video encoder may entropy encode syntax elements representing quantized transform coefficients. In lossless coding, or lossy coding when the transform is skipped, the same syntax elements may be used to represent residual samples. In HEVC and other video coding standards, the syntax elements representing a transform coefficient or residual sample may include a sign syntax element that indicates whether the transform coefficient or residual sample is positive or negative. In some instances, it may be unnecessary to include sign syntax elements to indicate whether a transform coefficient or residual sample is positive or negative. Rather, information indicating whether a transform coefficient or residual sample is positive or negative may be embedded in values of other syntax elements for the transform coefficient or residual sample. Embedding such information in values of other syntax elements, instead of signaling sign syntax elements may be referred to as sign data hiding.

However, sign data hiding may be difficult to implement for blocks that are coded using lossy coding for which the transform is skipped and a planar intra prediction mode, a DC intra prediction mode (e.g., a DC intra prediction mode in which reconstructed samples corresponding to samples in the predictive block are used to determine value of predictive samples in the predictive block), or residual DPCM is used. Furthermore, in transform skip coding, sign data hiding may introduce errors into the residual values that are compounded when residual DPCM is applied. Such errors may propagate to subsequent residual samples, resulting in a degradation of performance. Thus, in accordance with one or more techniques of this disclosure, sign data hiding may be normatively disabled for such blocks even if one or more syntax elements indicate that sign data hiding is enabled for such blocks.

For instance, in some examples, the video decoder determines that sign data hiding is disabled for a current block if the current block is generated using lossy coding without application of a transform to residual data and the current block is intra predicted using an intra prediction mode in which residual DPCM is used. In such examples, when sign data hiding is disabled for the current block, the video decoder may obtain, from the bitstream, for each respective significant value in the block, a respective syntax element indicating whether the respective significant value is positive or negative.

FIG. 1 is a block diagram illustrating an example video coding system 10 that may utilize the techniques of this disclosure. As described herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). Channel 16 may include various types of devices, such as routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, local disk drives, and the like.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

FIG. 1 is merely an example and the techniques of this disclosure may apply to video coding settings (e.g., video encoding or video decoding) that do not necessarily include any data communication between the video encoding device and the video decoding device. In other examples, data is retrieved from a local memory, streamed over a network, or the like. A video encoding device may encode and store data to memory, and/or a video decoding device may retrieve and decode data from memory. In many examples, the video encoding and decoding is performed by devices that do not communicate with one another, but simply encode data to memory and/or retrieve and decode data from memory.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which a video decoding device may then retrieve at any time after being stored to this medium.

In some examples, video encoder 20 and video decoder 30 operate according to a video compression standard, such as the High Efficiency Video Coding (HEVC) standard. A draft of the HEVC standard, referred to as "HEVC Working Draft 6," is described in Bross et al., "High Efficiency Video Coding (HEVC) text specification draft 6," Joint Collaborative Team on Video Coding (JCT-VC) of ITU-T SG16 WP3 and ISO/IEC JTC1/SC29/WG11, 7th Meeting: Geneva, Switzerland, November, 2011, the entire content of which is incorporated herein by reference. As of Apr. 5, 2013, HEVC Working Draft 6 is downloadable from http://phenix.int-evry.fr/jct/doc_end_user/documents/8_San%20Jose/wg11/JCTVC-H1003-v22.zip. Another draft of the HEVC standard, referred to as "HEVC Working Draft 9," is described in Bross et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, China, October, 2012, the entire content of which is incorporated herein by reference. As of Mar. 24, 2014, HEVC Working Draft 9 is downloadable from http://phenix.int-evry.fr/jct/doc_en-d_user/documents/11_Shanghai/wg11/JCTVC-K1003-v8.zip. Another draft of HEVC, referred to as "HEVC Working Draft 10," is described in Bross et al., "High Efficiency Video Coding (HEVC) text specification draft 10 (for FDIS & Consent)," Joint Collaborative Team on Video Coding (JCT-VC) of ITU-T SG16 WP3 and ISO/IEC JTC1/SC29/WG11, 12th Meeting: Geneva, CH, 14-23 Jan. 2013, the entire content of which is incorporated herein by reference. As of Mar. 24, 2014, HEVC Working Draft 10 is available from http://phenix.int-evry.fr/jct/doc_end_user/documents/12_Geneva/wg11/JCTVC-L1003-v20.zip. The techniques of this disclosure, however, are not limited to any particular coding standard or technique.

Furthermore, a range extension specification is being developed for HEVC. The range extension specification provides for alternate sampling modes, such as 4:0:0, 4:2:0, 4:2:2, and 4:4:4 chroma sampling. Flynn et al., "High Efficiency Video Coding (HEVC) Range Extensions text specification: Draft 3," Joint Collaborative Team on Video Coding (JCT-VC) of ITU-T SG 16 WP 3 and ISO/IEC JTC 1/SC 29/WG 11, 13th Meeting: Incheon, KR, 18-26 Apr. 2013, (hereinafter, "JCTVC-M1005_v2") is a draft of the range extension specification for HEVC. As of Mar. 24, 2014, JCTVC-M1005_v2 is available at http://phenix.int-evey.fr/jct/doc_end_user/documents/13_Incheon/pending/JCTVC-M1005-v2.zip. The entire content of JCTVC-M1005_v2 is incorporated herein by reference.

As mentioned briefly above, video encoder 20 encodes video data. The video data may comprise one or more pictures. Each of the pictures is a still image forming part of a video. When video encoder 20 encodes the video data, video encoder 20 may generate a bitstream. The bitstream may include a sequence of bits that form a coded representation of the video data. The bitstream may include coded pictures and associated data. A coded picture is a coded representation of a picture. The associated data may include sequence parameter sets (SPSs), picture parameter sets (PPSs), and other syntax structures. A SPS may contain parameters applicable to zero or more sequences of pictures. A PPS may contain parameters applicable to zero or more pictures.

A picture may include three sample arrays, denoted $S_L$, $S_{Cb}$ and $S_{Cr}$. $S_L$ is a two-dimensional array (i.e., a block) of luma samples. Luma samples may also be referred to herein as "Y" samples. $S_{Cb}$ is a two-dimensional array of Cb chrominance samples. $S_{Cr}$ is a two-dimensional array of Cr chrominance samples. Chrominance samples may also be referred to herein as "chroma" samples. Cb chrominance samples may be referred to herein as "U samples." Cr chrominance samples may be referred to herein as "V samples."

In some examples, video encoder 20 may down-sample the chroma arrays of a picture (i.e., $S_{Cb}$ and $S_{Cr}$). For example, video encoder 20 may use a YUV 4:2:0 video format, a YUV 4:2:2 video format, or a 4:4:4 video format. In the YUV 4:2:0 video format, video encoder 20 may down-sample the chroma arrays such that the chroma arrays are ½ the height and ½ the width of the luma array. In the YUV 4:2:2 video format, video encoder 20 may down-sample the chroma arrays such that the chroma arrays are ½ the width and the same height as the luma array. In the YUV 4:4:4 video format, video encoder 20 does not down-sample the chroma arrays.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs).

As part of encoding a picture, video encoder 20 may generate encoded representations of each slice of the picture (i.e., coded slices). To generate a coded slice, video encoder 20 may encode a series of CTUs. This disclosure may refer to an encoded representation of a CTU as a coded CTU. In some examples, each of the slices includes an integer number of coded CTUs.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. In monochrome pictures, or pictures coded using separate color planes, a CU may comprise a single coding block of samples and syntax structures used to code the coding block. Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU. In monochrome pictures, or pictures coded using separate color planes, a CU may comprise a single coding block of samples and syntax structures used to code the coding block.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single motion vector. When video encoder 20 uses uni-prediction to generate the predictive blocks for a PU, the PU may have two motion vectors.

After video encoder 20 generates predictive blocks (e.g., luma, Cb and Cr blocks) for one or more PUs of a CU, video encoder 20 may generate a residual block for the CU. For instance, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the residual blocks of a CU into transform blocks. For instance, video encoder 20 may use quad-tree partitioning to decompose luma, Cb, and Cr residual blocks of a CU into luma, Cb, and Cr transform blocks. A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures, or pictures encoded using separate color planes, a TU may comprise a single transform block and syntax structures used to transform the transform block samples. A TU size may be the size of a transform block of a TU.

Video encoder 20 may apply one or more transforms to a transform block of a TU to generate a coefficient block for the TU. For instance, video encoder 20 may apply one or more transforms to a luma transform block of a TU to generate a luma coefficient block for the TU. A coefficient block may be a two-dimensional array of transform coefficients. A transform coefficient may be a scalar quantity. In addition, video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video decoder 30 may receive a bitstream generated by video encoder 20. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize transform coefficient blocks associated with TUs of the current CU. Video decoder 30 may perform inverse transforms on the transform coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

As indicated above, a video coder, such as video encoder 20 or video decoder 30, may use intra prediction to generate a predictive block for a current PU. When a video coder uses intra prediction to generate a predictive block for a current PU, the video coder may determine values of samples in the predictive block using a set of reference samples. For instance, in HEVC intra prediction, already reconstructed samples from the top and left side neighboring blocks may be used for prediction. These reconstructed samples may be referred to as reference samples.

FIG. 2 illustrates reference samples of a block for HEVC intra prediction. In other words, FIG. 2 is a conceptual diagram illustrating a block of size M (height)×N (width). In FIG. 2, M indicates rows and N indicates columns. Furthermore, in FIG. 2, the samples of a block are denoted by $P_{i,j}$, where $0 \le i \le (M-1)$ and $0 \le j \le (N-1)$. In this disclosure, the term "samples" can refer to the original pixel values of an input component (e.g., R, G, or B in an RGB picture, Y, Cb, or Cr, in YCbCr pictures, etc.) or sample values of a component after applying a color transform to the input components. In the example of FIG. 2, the reference pixels are denoted by $P_{-1,j}$, where $-1 \le j < 2N$ and $P_{i,-1}$, where $-1 \le i < 2M$.

As shown in the example of FIG. 2, the reference samples may include a set of reference samples left of the current PU and a set of reference sample above the current PU. This disclosure may refer to the set of reference samples above the current PU as the top predictor. This disclosure may refer to the set of reference samples left of the current PU as the left predictor. In other words, in HEVC intra prediction, already reconstructed samples from the top and left side neighboring blocks are used for prediction (the "top" neighboring block may also be called the "above" neighboring block). These samples are referred to as reference samples. In some examples, if reference pixels are not available, a video coder using HEVC may use a specific padding process to generate missing reference samples.

Figure 3:
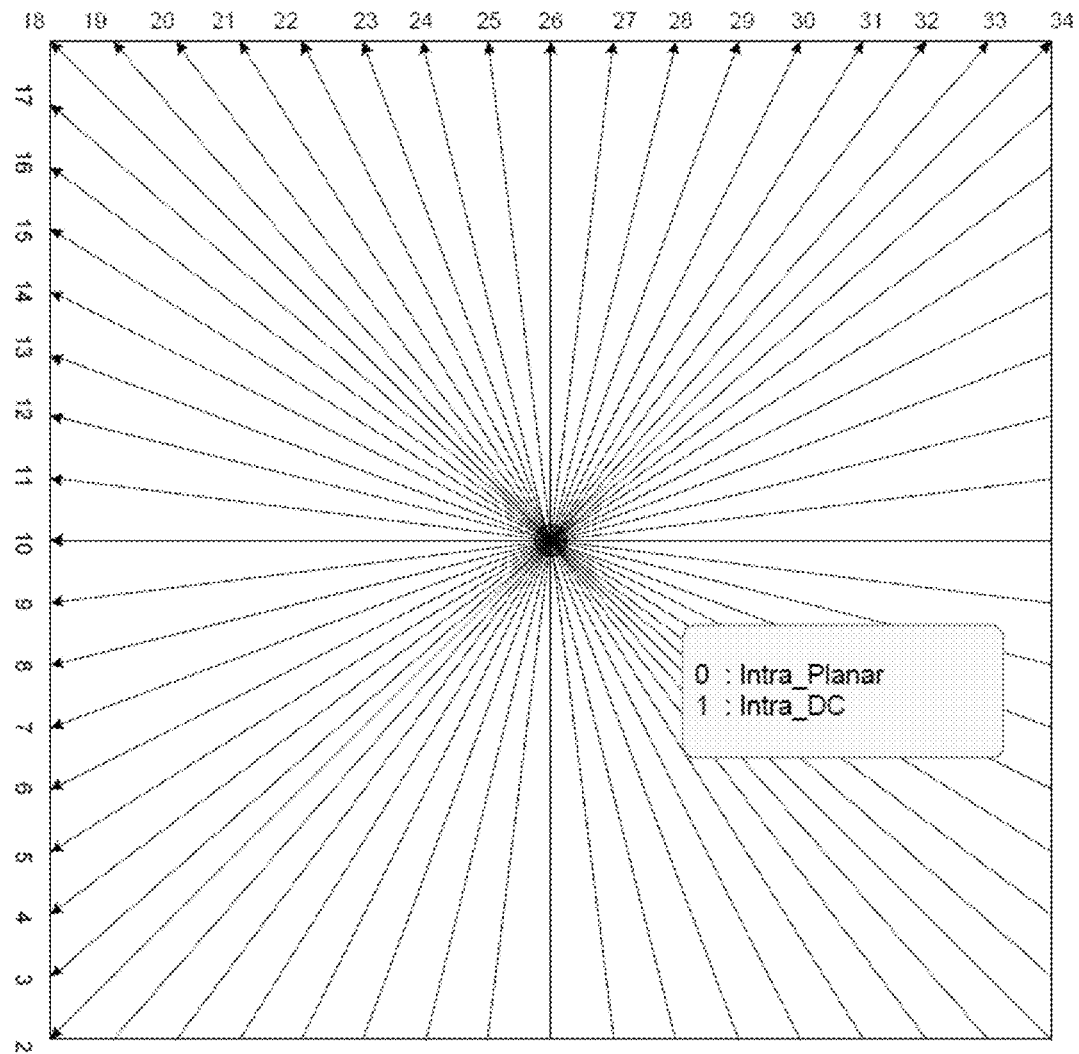
FIG. 3 is a conceptual diagram illustrating example intra prediction mode directions.

When a video coder uses intra prediction to generate a predictive block, the video coder may generate the predictive block according to an intra prediction mode from a plurality of available intra prediction modes. The intra prediction modes may include a plurality of directional (i.e., angular) intra prediction modes. For instance, in some versions of HEVC, there are 33 directional intra prediction modes. Each of the directional intra prediction modes corresponds to a different direction. FIG. 3 is a conceptual diagram illustrating example intra prediction mode directions. When the video coder generates a predictive block according to a directional intra prediction mode, the video coder may, for each respective sample of the predictive block, assign to the respective sample a value of a reference sample (or a weighted combination of reference samples) that is aligned with the respective sample in a direction corresponding to the directional intra prediction mode. When a video coder uses a directional (i.e., angular) intra prediction mode to generate a predictive block for a current block, the video coder may be said to be performing angular intra prediction.

Furthermore, in some versions of HEVC, the intra prediction modes include a DC intra prediction mode. In such versions of HEVC, when the video coder uses DC intra prediction to generate a predictive block, the video coder may determine a mean value of the reference samples. The video coder may then determine that each sample in the predictive block has the determined mean value. Thus, when the video coder uses DC intra prediction to generate a predictive block, all samples of the predictive block have the same value. For example, assume that a padding process has been completed so that all the reference samples are available. In this example, with regard to the 4×4 block shown in the example of FIG. 2, the DC prediction may be formed as:

$$(\Sigma_{i=0}^{3} P_{i,-1} + \Sigma_{j=0}^{3} P_{-1,j} + 4) >> 3, \quad (1)$$

where >> denotes a bitwise right shift operation.

In some versions of HEVC, the intra prediction modes include a planar intra prediction mode. When a video coder generates a predictive block for a PU using the planar intra prediction mode, the video coder may determine a set of neighboring samples, p[x][y], with x=−1, y=−1 . . . nTbs*2−1 and x=0 . . . nTBS*2−1, y=−1, where nTbS is the size of the current PU. Furthermore, predSamples[x][y] may denote the value of a sample at position x, y of the prediction block. The video coder may determine the samples of the predictive block as follows:

$$\text{predSamples}[x][y] = ((nTbS-1-x)*p[-1][y]+(x+1)*p[nTbS][-1]+(nTbs-1-y)*p[x][-1]+(y+1)*p[-1][nTbS]+nTbS)>>(\text{Log }2(nTbS)+1) \quad (2)$$

In general terms, when planar intra prediction mode is used, the value of a sample of the predictive block is an average of two linear interpolations of the value. In the first linear interpolation, as values of x increase from left to right across a row of the predictive block, a weight accorded to a reference sample left of the row decreases while a weight accorded to a reference sample above and right of a top-right corner of the predictive block increases. In the second linear interpolation, as values of y increase down a column of the predictive block, a weight accorded to a reference sample above the column diminishes while a weight accorded to a sample below and left of a bottom-left corner of the predictive block increases.

In the example of FIG. 2, planar intra prediction may use samples $P_{-1,j}$, where 0≤j≤(N−1), and $P_{M,-1}$ to generate a bi-linear prediction in the vertical direction. Similarly, samples $P_{i,-1}$, where 0≤i≤(M−1), and $P_{-1,N}$ may be used to generate a bi-linear prediction in the horizontal direction. Finally, in this example, the horizontal and vertical predictions may be averaged (or possibly combined with another mathematical operation). For example, let the planar predicted values be denoted by $T_{i,j}$ and assume that the block is square, that is, M=N. In this example, $T_{i,j}$ may be determined as:

$$T_{i,j}^{V} = (M-i)*P_{-1,j} + i*P_{M,-1},$$

$$T_{i,j}^{H} = (N-j)*P_{i,-1} + j*P_{-1,N} \text{ and}$$

$$T_{i,j} = (T_{i,j}^{V} + T_{i,j}^{H} + N) >> (\log_2 N + 1). \quad (3)$$

In this example, * denotes product, >> denotes a bitwise right shift operation and superscripts H and V denote predictions in the horizontal and vertical directions, respectively.

In some cases, video encoder 20 and video decoder 30 implement a lossless coding mode as described herein. Typically, when video encoder 20 encodes a block, video encoder 20 transforms (e.g., using a discrete cosine transform) and quantizes residual data (i.e., prediction error) for the block. In other words, the prediction error is transformed and quantized. However, when video encoder 20 encodes a block (e.g., a CU) using lossless coding, video encoder 20 may not apply a transform or quantization to residual data for the block. In other words, in lossless coding mode (e.g., for a CU or an entire picture), the transform and quantization steps may be skipped. Instead, video encoder 20 may treat the sample values of the residual data in the same manner as quantized transform coefficients. For instance, video encoder 20 may entropy encode syntax elements representing sample values of the residual data and include the resulting data in a bitstream. Thus, the residual data does not undergo any loss of information due to transformation or quantization.

Similarly, in some instances where video decoder 30 decodes a block (e.g., a CU) that has been encoded using lossless encoding, video decoder 30 may not apply inverse quantization or inverse transforms to the residual data for the block. Instead, video decoder 30 may entropy decode syntax elements representing sample values of the residual data and then reconstruct sample values of the block based at least in part on sample values of the residual data.

Several example techniques of this disclosure relate to lossless encoding. As described herein, instead of using reference samples from neighboring blocks for prediction, samples from a current block can be used for improved prediction. For instance, several example techniques of this disclosure describe modifications that may be applicable to an intra DC prediction mode for lossless coding in the HEVC standard. Furthermore, several example techniques of this disclosure describe modifications that may be applicable to an intra planar prediction mode for lossless coding in the HEVC standard. The techniques of this disclosure may also be applicable to other types of prediction, and may also be applicable to other coding standards.

In lossless coding, instead of using reference samples from neighboring blocks for prediction, samples from the current block can be used for improved prediction. For instance, techniques for angular intra prediction for lossy coding modes as well as lossless coding modes when transform is skipped are set forth in Lan et al., "Intra and inter coding tools for screen contents," Joint Collaborative Team on Video Coding (JCT-VC) of ITU-T SG 16 WP3 and ISO/IEC JTC1/SC29/WG11, 5$^{th}$ Meeting, Geneva, CH, 16-23 Mar. 2011, document JCTVC-E145 (hereinafter, "JCTVC-E145"). Furthermore, for lossless coding, transform and quantization steps are skipped, so it may be possible to improve upon the process for determining samples of a predictive block when using the intra DC mode.

In accordance with one or more techniques of this disclosure, for calculation of predictive block, it may be assumed that the samples are being processed in a raster scan along rows. However, in other examples, the same techniques can be extended to raster scan along columns (or even to diagonal or zig-zag scans, but losing some potential of parallelization of the techniques). When no transform or quantization is applied to the prediction error in lossless mode, it can be assumed that after entropy decoding of the prediction error (i.e., residual), the original sample can be reconstructed losslessly. Hence, in the context of lossless coding, the term "original sample" or "original sample value" may refer to either actual original sample values or reconstructed sample values (i.e., non-residual samples). Due to the raster scan along rows, all the samples from previous rows as well as all the samples to the left of the current sample from the current row are available for DC prediction. One or more techniques of this disclosure take advantage of this to improve intra prediction using the DC intra prediction mode.

This disclosure describes several example intra prediction modes. The intra prediction modes of this disclosure can replace the planar intra prediction mode or can be understood as planar intra prediction modes. Thus, the intra prediction modes of this disclosure may replace the current planar mode in HEVC for lossless coding. Details described in the examples of this disclosure may be combined with one or more details of other examples of this disclosure. That is, the details may be combined in any of a wide variety of different ways to achieve still other examples.

In accordance with some examples of this disclosure where a video coder (e.g., video encoder 20 or video decoder 30) generates a predictive block using a DC intra prediction mode, the video coder may process samples of a predictive block in a raster scan order. When the video coder processes a sample of the predictive block, the video coder may use a causal neighborhood of the sample of the predictive block to form a DC prediction value for the sample. In general, a causal neighborhood of a sample in a predictive block is a set of reconstructed samples (e.g., non-residual, non-predictive samples) that correspond to samples in the predictive block that have already been determined. For examples, when using a raster scanning order along rows starting from a top left sample of the predictive block, the causal neighborhood of a sample in the predictive block may include reconstructed samples that correspond to locations above and left of the sample. In one such example, when a video coder generates a predictive block using a DC intra prediction mode, the video coder calculates the DC prediction value, $DC_{i,j}$, for a current sample $P_{i,j}$, where $0 \leq i \leq (M-1)$ and $0 \leq j \leq (N-1)$, as:

$$DC_{i,j}=(P_{i,j-1}+P_{i-1,j}+1)>>1. \quad (4)$$

or similarly, $$DC_{i,j}(P_{i,j-1}+P_{i-1,j})>>1. \quad (5)$$

Thus, in equations (4) and (5), for each respective sample in a predictive block, video encoder 20 may determine a DC intra prediction value (i.e., $DC_{i,k}$) for the respective sample as an average of a reconstructed value of a sample above the respective sample (i.e., $P_{i,j-1}$) and a reconstructed value of a sample left of the respective sample (i.e., $P_{i-1,j}$). Because video encoder 20 is using lossless coding, the reconstructed value of the sample left of the respective sample and the reconstructed value of the sample above respective sample are same as the original values of the sample left of the respective sample and the original value of the sample above the respective sample. Similarly, in equations (4) and (5), for each respective sample in a predictive block, video decoder 30 may determine a DC intra prediction value (i.e., $DC_{i,k}$) for the respective sample as an average of a reconstructed value of a sample above the respective sample (i.e., $P_{i,j-1}$) and a reconstructed value of a sample left of the respective sample (i.e., $P_{i-1,j}$). Because video decoder 30 is using lossless coding, the reconstructed value of the sample above the respective sample and the reconstructed value of the sample left of the respective sample are the same as the original value of the sample above the respective sample and the original value of the sample left of the respective sample.

Due to the raster scan and the padding process for reference samples, reconstructed samples $P_{i,j-1}$ and $P_{i-1,j}$ may always be available. In other words, a sample above the current sample and a reference sample left of the current sample may always be available. Furthermore, due to the non-linear nature of the right shifting operation used in calculating the DC prediction value $DC_{i,j}$, it may be difficult for video decoder 30 to process multiple samples in parallel. For example, $DC_{i,j+1}$ can be represented as $$DC_{i,j+1}=(P_{i,j}+P_{i-1,j+1}+1)>>1, \text{ or}$$

$$DC_{i,j+1}=((R_{i,j}+((P_{i,j-1}+P_{i-1,j}+1)>>1)+P_{i-1,j+1}+1)>>1,$$

In the equations above, $R_{i,j}$ is the prediction residual for sample at location (i,j). Because the right bit-shift is non-linear process, there may be no way to calculate $DC_{i,j+1}$ before finishing the calculation of $DC_{i,j}$. For instance, it may be difficult for video decoder 30 to process multiple samples of the predictive block in parallel.

When video decoder 30 decodes a coded representation of a current block that is coded using lossless coding, video decoder 30 may obtain, from a bitstream, syntax elements indicating residual sample values of the current block. Thus, when the current block is coded using lossless coding, video decoder 30 does not need apply inverse quantization or an inverse transform to determine the residual sample values of the current block. Obtaining the syntax elements from the bitstream may involve entropy decoding the syntax elements. Accordingly, when the current block is coded using lossless or lossy coding, it can be assumed that prediction residuals (i.e., the prediction error) of the current block have already been entropy decoded.

Thus, when a current block is coded using lossless or lossy coding, the prediction residuals are available for use in determining the reconstructed values of samples that video decoder 30 uses in determining the DC prediction values for samples of a predictive block for the current block. Assuming that the prediction residuals have already been entropy decoded, it may be possible to pipeline the processing of samples in different rows with a one sample delay. Thus, in accordance with one or more techniques of this disclosure, video decoder 30 may start processing of a second row of samples after one sample from the first row has been reconstructed. In this way, video decoder 30 may process multiple rows of samples in parallel. Hence, as part of generating a predictive block, a video coder may pipeline processing of samples in different rows of the predictive block, wherein a one cycle delay for DC prediction exists between rows of the predictive block.

In another example, a video coder (e.g., video encoder 20 or video decoder 30) may calculate a DC prediction value $DC_{i,j}$, where $0 \leq i \leq (M-1)$ and $0 \leq j \leq (N-1)$, as:

$$DC_{i,j} = (P_{i,j-1} + P_{i-1,j} - P_{i-1,j-1}) \quad (6)$$

Thus, in this example, for each respective sample of a predictive block, video encoder 20 may determine a DC prediction value (i.e. $DC_{i,j}$) for the respective sample as a sum of a reconstructed value of a sample above the respective sample (i.e., $P_{i,j-1}$) and a reconstructed value of a sample left of the respective sample (i.e., $P_{i-1,j}$), minus an original value of a sample immediately above and left of the respective sample (i.e., $P_{i-1,j-1}$). Similarly, for each respective sample of a predictive block, video decoder 30 may determine a DC prediction value (i.e. $DC_{i,j}$) for the respective sample as a sum of a reconstructed value of a sample above the respective sample (i.e., $P_{i,j-1}$) and a reconstructed value of a sample left of the respective sample (i.e., $P_{i-1,j}$), minus a reconstructed value of a sample immediately above and left of the respective sample (i.e., $P_{i-1,j-1}$). Because lossless coding is being used, the reconstructed value of the samples are the same as the original values of the samples.

In this example, it may be simpler to process multiple sample values in a row by using additional logic. For example, a video coder can calculate $DC_{i,j+1}$ for a current sample $P_{i,j}$ of a predictive block without waiting for $P_{i,j}$ as follows. $DC_{i,j+1}$ can be expressed as:

$$DC_{i,j+1} = ((P_{i,j-1} + P_{i-1,j} - P_{i-1,j-1}) + r_{i,j} + P_{i-1,j+1} - P_{i-1,j}) \quad (7)$$

Equation (7) may be rewritten as follows:

$$DC_{i,j+1} = \Sigma_{n=0}^{j} r_{i,j-n} + P_{i-1,j+1} + P_{i,-1} + P_{i-1,-1}. \quad (8)$$

In equations (7) and (8), $r_{i,j}$ is the prediction error residual for sample $P_{i,j}$. Thus, in this example, the calculation of a DC intra prediction value for a particular sample at location (i,j+1) (i.e., $DC_{i,j+1}$) is not dependent on the reconstructed values of the samples to the left of the particular sample. Rather, the calculation of the DC intra prediction value $DC_{i,j+1}$ for a particular sample may depend on the reconstructed value for the sample directly above, as well as the residual values for all the samples to the left of the current sample, and reference samples in the same row and the row above. This may allow video decoder 30 (as well as video encoder 20) to calculate the DC prediction values for all the samples in a row of a block in parallel assuming that the residuals for the entire row have already been decoded.

Because lossless coding is being used, the reconstructed value of the samples (i.e., $P_{i,j-1}$, $P_{i-1,j}$, and $P_{i-1,j-1}$) are the same as the original values of the samples. As further described elsewhere in this disclosure, this technique may be applied to lossy coding. In that case, to maintain parallelization, it is necessary to use unclipped reconstructed value for the sample to the left for DC prediction. The reconstructed samples from the row above may be clipped or unclipped. For example, for an 8-bit video sequence, the reconstructed samples are clipped to the interval [0, 255].

In another example, left, top-left, top and top-right samples are used in determining DC intra prediction values. In this example, a video coder may calculate a DC prediction value $DC_{i,j}$ for a current sample $P_{i,j}$ of a predictive block, where $0 \leq i \leq (M-1)$ and $0 \leq j \leq (N-1)$, as:

$$DC_{i,j} = (P_{i,j-1} + P_{i-1,j} + P_{i-1,j-1} + P_{i-1,j+1} + 2) >> 2, \quad (9)$$

or similarly, $$DC_{i,j} = (P_{i,j-1} + P_{i-1,j} + P_{i-1,j-1} + P_{i-1,j+1}) >> 2. \quad (10)$$

Thus, in the examples of equations (9) and (10), for each respective sample of a predictive block, a DC intra prediction value for the respective sample (i.e., $DC_{i,j}$) is an average of the reconstructed sample above the respective sample (i.e., $P_{i,j-1}$), the reconstructed sample left of the respective sample (i.e., $P_{i-1,j}$), the reconstructed sample above and left of the respective sample (i.e., $P_{i-1,j-1}$), and the reconstructed sample above and right of the respective sample (i.e., $P_{i-1,j+1}$). Because lossless coding is being used, the reconstructed values of the samples (i.e., $P_{i,j-1}$, $P_{i-1,j}$, $P_{i-1,j-1}$, and $P_{i-1,j+1}$) are the same as the original values of the samples.

In examples using equations (9) or (10) to determine DC intra prediction values, for the samples in the last column (j=(N-1), i>0), the top-right sample is not available. To overcome this, a video coder may assume that the top and top-right samples (i.e., $P_{i-1,j}$ and $P_{i-1,j+1}$, respectively) have the same value. In another example where a video coder uses equations (9) or (10) to determine DC intra prediction values, the video coder may modify the DC prediction to use only available samples. In some examples, a sample may be unavailable if the sample is not within the boundaries of a current slice or picture, or has not yet been coded.

Furthermore, in accordance with another example of this disclosure, a video coder may perform DC intra prediction on a block size smaller than the TU size. For example, irrespective of the TU size, a video coder may perform the DC intra prediction on 2×2 blocks. The video coder may process the 2×2 blocks of a predictive block in a raster scan order. In this example, for samples $P_{2i,2j}$, $P_{2i,2j+1}$, $P_{2i+1,2j}$, and $P_{2i+1,2j+1}$, the video coder calculates the DC intra prediction values as:

$$(P_{2i-1,2j} + P_{2i-1,2j+1} + P_{2i,2j-1} + P_{2i+1,2j-1} + 2) >> 2, \quad (11)$$

or similarly, $$(P_{2i-1,2j} + P_{2i-1,2j+1} + P_{2i,2j-1} + P_{2i+1,2j-1}) >> 2. \quad (12)$$

In this example, $0 \leq i \leq ((M/2)-1)$ and $0 \leq j \leq ((N/2)-1)$, where M is the height of the block and N is the width of the block. Furthermore, in this example, it is assumed that M and N are both even. In this example, the video coder can process four samples in parallel. In this example, the video coder may be able to determine the DC intra prediction values of each of the four samples of a 2×2 block in parallel. In similar examples, the video coder may use 4×4 blocks or 8×8 blocks instead of 2×2 blocks.

In accordance with another example of this disclosure, the correlation between the residuals after performing normal DC prediction is exploited. For example, let $r_{i,j}$, wherein $0 \leq i \leq (M-1)$ and $0 \leq j \leq (N-1)$, be the prediction residuals after performing DC intra prediction as specified in HEVC (e.g., HEVC Working Draft 10). For instance, $r_{i,j}$ may be a prediction residual value after performing DC intra prediction as described in equation (1) above, for a 4×4 block In this example, a video coder may then generate intermediate values $s_{i,j}$, where $0 \leq i \leq (M-1)$ and $0 \leq j \leq (N-1)$. The video coder may generate the intermediate values $s_{i,j}$ as:

$$s_{i,j} = r_{i,2j}, s_{i,(j+(N/2))} = r_{i,2j} - r_{i,2j+1} \quad (13)$$

In equation (13), above, $0 \leq i \leq (M-1)$, $0 \leq j \leq ((N/2)-1)$.

The video coder may then generate modified residual values $t_{i,j}$, where $0 \leq i \leq (M-1)$ and $0 \leq j \leq (N-1)$, as follows:

$$t_{i,j} = s_{2i,j}, t_{(i+(M/2)),j} = s_{2i,j} - s_{2i+1,j} \quad (14)$$

In equation (14), $0 \leq i \leq ((M/2)-1)$ and $0 \leq j \leq (N-1)$.

The video encoder may entropy encode the modified residuals, $t_{i,j}$, as described in regular HEVC (e.g., HEVC Working Draft 10). On the decoder side (e.g., at video decoder 30), this process is reversed. For example, video decoder 30 may determine, $$s_{2i,j}=t_{i,j}, s_{2i+1,j}=t_{i,j}-t_{(i+(M/2)),j}, \quad (15)$$

where $0 \le i \le ((M/2)-1)$ and $0 \le j \le (N-1)$. Video decoder 30 may also determine, $$r_{i,2j}=s_{i,j}, r_{i,2j+1}=s_{i,j}-s_{i,(j+(N/2)),j}, \quad (16)$$

where $0 \le i \le ((M-1)$ and $0 \le j \le ((N/2)-1)$. This example assumes that M and N are both even.

In another example of this disclosure, a potentially better predictor can be used instead of taking simple difference. For instance, a video coder may determine $s_{i,j}$ as follows:

$$s_{i,j}=r_{i,2j+1}, s_{i,(j+(N/2))}=P_{i,2j}-((P_{i,2j-1}+P_{i,2j+1}+1)>>1) \quad (17)$$

$$t_{i,j}=s_{2i+1,j}, t_{(i+(M/2)),j}=s_{2i,j}-((s_{2i+1}+s_{2i+1,j}+1)>>1) \quad (18)$$

In equation (17), above, $0 \le i < M$, $0 \le j < (N/2)$. In equation (18), above, $0 \le i < M/2$, $0 \le j < N$.

The techniques described in various other examples of this disclosure can be applied for improving the DC intra prediction mode in lossy coding when the transform is skipped. In other words, various other examples of this disclosure may be applied for improving the DC intra prediction mode when a video encoder does not apply a transform to residual samples of a transform block, but does quantize the residual samples of the transform block. For example, in the example described above, a causal neighborhood is used for calculating the DC prediction value for the current sample. In this example, instead of using original sample values for calculating the DC prediction value as is done in case of lossless coding, reconstructed (quantized) sample values in the causal neighborhood may be used. Because application of the transform is skipped, the reconstructed values in the causal neighborhood are available. It should be noted that to retain parallelization benefits, the clipping operation is not applied to reconstructed values from the current row until the processing for the entire row is complete. For the row above, either clipped or unclipped reconstructed values may be used.

Similarly, as described above, a TU is divided into smaller blocks (e.g., 2×2 blocks) and a DC prediction value is calculated for each smaller block. Instead of using original sample values for calculating the DC prediction value as is done in the case of lossless coding, reconstructed (quantized) sample values may be used in the case of lossy coding where the transform is skipped.

Techniques of lossy coding are described above in this disclosure. In accordance with some such techniques, let $P_{i,j}$, where $0 \le i \le (M-1)$ and $0 \le j \le (N-1)$, denote original sample values. Furthermore, let $Q(P_{i,j})$ denote a quantized version of $P_{i,j}$. Then, in accordance with an additional example of this disclosure that uses lossy coding, a video coder may calculate the DC prediction value $DC_{i,j}$ as:

$$DC_{i,j}=(Q(P_{i,j-1})+Q(P_{i-1,j})-Q(P_{i-1,j-1})) \quad (\text{Equ. DC1})$$

Note that equation DC1 is similar to equation (6), above, except that the sample values (i.e., $P_{i,j-1}$, $P_{i-1,j}$, and $P_{i-1,j-1}$) are quantized and then de-quantized. This disclosure may refer to such samples as quantized samples or quantized versions of original samples. Thus, in equation DC1, for each respective sample of a predictive block, the video coder may calculate a DC prediction value for the respective sample as a sum of a quantized version of the original sample above the respective sample (i.e., $Q(P_{i,j-1})$ and a quantized version of the original sample left of the respective sample (i.e., $Q(P_{i-1,j})$, minus a quantized version of the original sample above and left of the respective sample (i.e., $Q(P_{i-1,j-1})$). In equation DC1, terms of the form $Q(P_{i,j})$ are reconstructed samples. The video coder may then calculate the prediction residual as $r_{i,j}=P_{i,j}-DC_{i,j}$. In other words, the residual value $r_{i,j}$ is equal to the sample value $P_{i,j}$ minus the corresponding DC intra prediction value $DC_{i,j}$. The reconstructed residual after quantization and dequantization is denoted by $Q(r_{i,j})$.

The example described in the previous paragraph may have some desirable throughput properties on the decoder side. For example, it may be possible for video decoder 30 to calculate the reconstructed sample values for all the samples in a row (or column) of a block simultaneously. For instance, video decoder 30 may obtain the reconstructed sample values as:

$$Q(P_{i,j})=Q(r_{i,j})+DC_{i,j}, \text{ or}$$

$$Q(P_{i,j})=(\Sigma_{n=0}^{j}Q(r_{i,j-n}))+Q(P_{i-1,j})+Q(P_{i,-1})+Q(P_{i-1,-1}) \quad (\text{Equ. DC2})$$

In equation DC2, $Q(P_{i-1,j})$ denotes a reconstructed sample which may be appropriately clipped. For example, to appropriately clip a reconstructed value with an input bit depth of 8, the values of $Q(P_{i-1,j})$ are clipped between 0 and 255.

Furthermore, in some examples, it may be possible to use non-clipped versions of $Q(P_{i-1,j})$. The other values, $Q(P_{i-1,-1})$ and $Q(P_{i,-1})$ belong to previously reconstructed blocks and are already clipped. In such examples, the reconstructed sample $Q(P_{i-1,j})$ in equation DC2 is unclipped but can be clipped appropriately without affecting throughput. The prediction specified in equation DC1 is only approximate if the video decoder uses equation DC2 for reconstruction. The prediction in equation DC1 is only approximate because instead of $Q(P_{i,j-1})$, which is a clipped version, an unclipped version is used. In such a case, the unclipped version of $Q(P_{i,j-1})$ may be used on the encoder side as well to generate the DC prediction to avoid a drift between the encoder and the decoder. It is possible to use the clipped version, but then the samples may have to be reconstructed one by one, thereby affecting throughput. This is because, in that case, equation DC1 may have to be used for reconstruction. This means that the reconstruction of a sample may depend on the completion of reconstruction of a sample to the left of the sample. It has been described in this disclosure how a row of samples can be reconstructed in parallel. A similar process can be followed for reconstructing all the samples in a column in parallel. If less parallelism is desired, the summation term may be broken up into smaller chunks, thereby potentially reducing throughput but reducing the average number of additional operations needed for reconstructing a sample.

Thus, in at least some of the lossy coding examples described above, a video coder may generate a predictive block. As part of generating the predictive block, the video coder may use at least one of a first reconstructed sample (e.g., $Q(P_{i-1,j})$) and a second reconstructed sample (e.g., $Q(P_{i,j-1})$) for DC prediction of a current sample of the predictive block. The first reconstructed sample may correspond to a sample left of the current sample in the current row of the predictive block. The second reconstructed sample may correspond to a sample in a row of the predictive block above the current row. The video coder may reconstruct a coding block what was coded using lossy coding by adding samples of the predictive block to corresponding residual samples.

Furthermore, in at least some of the lossy coding examples described above, the video coder may determine a reconstructed value $Q(P_{i,j-1})$ corresponding to a sample above the current sample. In addition, the video coder may determine a reconstructed value $Q(P_{i-1,j})$ corresponding to a sample left of the current sample. The video coder may also determine a reconstructed value $Q(P_{i-1,j-1})$ corresponding to a sample left and above the current sample. The video coder may calculate a DC prediction value $DC_{i,j}$ for the current sample $P_{i,j}$ as:

$$DC_{i,j}=(Q(P_{i,j-1})+Q(P_{i-1,j})-Q(P_{i-1,j-1})).$$

In at least some of the lossy coding examples described above, the video coder may, for each respective reconstructed value from among $Q(P_{i,j-1})$, $Q(P_{i-1,j})$, and $Q(P_{i-1,j-1})$, determine the respective reconstructed value in one of the following ways. First, the video coder may determine the respective reconstructed value as a dequantized residual value for a given sample (e.g., $Q(r_{i,j})$) plus a DC prediction value for the corresponding sample (e.g., $DC_{i,j}$). Second, as described in equation DC2, the video coder may determine the respective reconstructed value as a sum of dequantized residual values for samples above the given sample (e.g., $\Sigma_{n=0}^{j}Q(r_{i,j-n})$), plus a reconstructed value corresponding to a sample left of the given sample (e.g., $Q(P_{i-1,j})$), plus a reconstructed value corresponding to a reference sample above a topmost sample of a column of the predictive block containing the given sample (e.g., $Q(P_{i,-1})$), plus a reconstructed value corresponding to a reference sample above a topmost sample of a column of the predictive block left of the given sample (e.g., $Q(P_{i-1,-1})$). In this example, the given sample corresponds to the respective reconstructed value. In some such examples, the video coder may clip the reconstructed value corresponding to the sample left of the given sample.

Another example of this disclosure proposes a modification to the prediction process for the planar mode. Looking at the equations for the planar mode (e.g., equation (2)), the vertical prediction may be more accurate if the original samples from the last row are used for performing vertical prediction instead of using $P_{M,-1}$. Similarly, the horizontal prediction may be more accurate if the original samples from the last column are used for performing horizontal prediction instead of using $P_{-1,N}$. The use of the original samples in intra planar mode is a basic idea behind one or more examples of this disclosure.

For instance, a video encoder (e.g., video encoder 20) may use HEVC planar prediction (e.g., planar prediction as described in HEVC Working Draft 10) for the last row and column, that is, $T_{i,j}$, where i=(M−1) or j=(N−1). The video coder may subtract the prediction values from the original sample values to generate residuals for the last row and column. That is, the video encoder may determine $r_{i,j}$, where i=(M−1) or j=(N−1). The video encoder may then generate the prediction values $T_{i,j}$, where 0≤i≤(M−2) and 0≤j≤(N−2), as follows:

$$T_{i,j}^V=(M-i)*P_{-1,j}+i*P_{M-1,j},$$

$$T_{i,j}^H=(N-j)*P_{i,-1}+j*P_{i,N-1} \text{ and}$$

$$T_{i,j}=(T_{i,j}^V+T_{i,j}^H+N)>>(\log_2 N+1). \quad (19)$$

This example assumes that M=N. However, extension of this concept to rectangular blocks is straightforward. The video encoder may generate the remaining residuals, $r_{i,j}$, where 0≤i≤(M−2) and 0≤j≤(N−2), by subtracting the prediction values from the original sample values. The video encoder may entropy encode the entire block of residuals, $r_{i,j}$, where 0≤i≤(M−1) and 0≤j≤(N−1), as in HEVC (e.g., HEVC Working Draft 10).

In this example, on the decoder side, a video decoder (e.g., video decoder 30) may entropy decode the entire block of prediction residuals to generate residual values $r_{i,j}$, where 0≤i≤(M−1) and 0≤j≤(N−1). The video decoder then may perform HEVC planar prediction for samples in the last row and column of the block. That is, the video coder may determine $T_{i,j}$, where i=(M−1) or j=(N−1), as specified in HEVC (e.g., HEVC Working Draft 10). For instance, the video coder may determine $T_{i,j}$ using equation (3), above. Furthermore, in this example, the video decoder adds residual values for the last row and column to the above prediction values to reconstruct the original sample values for the last row and column. After that, the video decoder generates the prediction values $T_{i,j}$, where 0≤i≤(M−2) and 0≤j≤(N−2), exactly as on the encoder side above. The video decoder adds residual values $r_{i,j}$, where 0≤i≤(M−2) and 0≤j≤(N−2), to the prediction values to reconstruct the sample values for the remaining sample positions in the block.

In another example of this disclosure, a video encoder (such as video encoder 20) uses HEVC planar prediction (e.g., planar prediction as described in HEVC Working Draft 10) for the element on the last row and column, that is, $T_{i,j}$, where i=(M−1) and j=(N−1). In this example, the video encoder subtracts a prediction value for a position from the original sample value for the position to generate a residual value for that position. The video encoder may then predict the elements of the last row and column bilinearly as:

$$T_{M-1,j}=((N-j)*P_{M-1,-1}+j*P_{M-1,N-1})>>(\log_2 N),$$

$$T_{i,N-1}=((M-i)*P_{-1,N-1}*P_{M-1,N-1})>>(\log_2 M). \quad (20)$$

Furthermore, in this example, the video encoder generates the prediction values $T_{i,j}$, where 0≤i≤(M−2) and 0≤j≤(N−2), as follows:

$$T_{i,j}^V=(M-i)*P_{-1,j}+i*P_{M-1,j},$$

$$T_{i,j}^H=(N-j)*P_{i,-1}+j*P_{i,N-1} \text{ and}$$

$$T_{i,j}=(T_{i,j}^V+T_{i,j}^H+N)>>(\log_2 N+1). \quad (21)$$

In this example, the video encoder generates residual values $r_{i,j}$, where 0≤i≤(M−1) and 0≤j≤(N−1) by subtracting the prediction values from the original sample values. Furthermore, in this example, the video encoder entropy encodes the entire block of residuals, $r_{i,j}$, where 0≤i≤(M−1) and 0≤j≤(N−1) as in HEVC (e.g., HEVC Working Draft 10).

Another example of this disclosure provides a refinement on the previous examples. In this example, the residue distribution due to the prediction techniques of this disclosure tends to be the reverse of the common one in video compression when a transform is employed. Commonly, the residue has higher values at lower frequencies, and lower expected values at higher frequencies. For the residue coming from the examples above, the last row and column tend to have larger values. An approach to improve performance while taking advantage of the entropy coding method designed for the transform residue is to rotate the residue coming from the prediction in the examples provided above. That is, the residue is rotated 180 degrees, so the top-left part becomes the bottom-right, and vice versa. Then, this rotated residue is entropy coded. Correspondingly, at the decoder, the residue is obtained and then rotated 180 degrees.

In other examples of this disclosure, the planar prediction process is modified as follows. For the first row and column, the prediction is performed as in the case of HEVC planar mode (e.g., planar mode as described in HEVC Working Draft 10) to generate $T_{i,j}$ and $r_{i,j}$, i=0 or j=0. In this example, instead of using the HEVC method (e.g., the method described in HEVC Working Draft 10, equation (3), etc.) for generating the prediction for the first row and column, other methods are used. For instance, $P_{0,0}$ can be predicted as $(P_{-1,0}+P_{0,-1}+1)>>1$. The remaining samples in the first column can be predicted using the left sample in the same row. Similarly, the remaining samples in the first row can be predicted using the above sample in the same column. For the remaining positions, the planar prediction, $T_{i,j}$, where $1 \le i \le (M-1)$ and $1 \le j \le (N-1)$, is generated as follows:

$$T_{i,j}^V = P_{i-1,j} + w_v * (P_{i-1,j} - P_{i-2,j}),$$

$$T_{i,j}^H = P_{i,j-1} + w_h * (P_{i,j-1} - P_{i,j-2}) \text{ and}$$

$$T_{i,j} = (T_{i,j}^V + T_{i,j}^H + 1) >> 1. \tag{22}$$

In equation (22), $w_v$ and $w_h$ are weights. In some examples, a value of 0.5 is used for both $w_v$ and $w_h$ since the value of 0.5 can be implemented as a bit-shift. The remaining residuals (i.e., $r_{i,j}$, where $1 \le i \le (M-1)$ and $1 \le j \le (N-1)$, are generated by subtracting the prediction values from the original sample values. The entire block of residuals (i.e., $r_{i,j}$, where $0 \le i \le (M-1)$ and $0 \le j \le (N-1)$), may be entropy coded as in HEVC (e.g., HEVC Working Draft 10).

In this example, on the decoder side, a video decoder (e.g., video decoder 30) may entropy decode the entire block of prediction residuals to generate residual values (i.e., $r_{i,j}$, where $0 \le i \le (M-1)$ and $0 \le j \le (N-1)$). Then, the video decoder performs planar prediction for samples in the first row and column (i.e., $T_{i,j}$, where i=0 or j=0) as specified in HEVC (e.g., HEVC Working Draft 10) or as described above, by any other method used by the video encoder. Furthermore, in this example, the video decoder adds the residual values for the first row and column to the above prediction values to reconstruct the original sample values for the first row and column. Subsequently, the video decoder generates the prediction values (i.e., $T_{i,j}$, where $1 \le i \le (M-1)$ and $1 \le j \le (N-1)$) exactly as on the encoder side above. In this example, the video decoder adds residual values (i.e., $r_{i,j}$, where $1 \le i \le (M-1)$ and $1 \le j \le (N-1)$) to the prediction values to reconstruct the sample values for the remaining positions in the block.

The paragraphs above describe a different way of performing planar prediction for lossless coding. In an additional example of this disclosure, the rightmost column and bottom row are predicted using a planar prediction procedure as described in the HEVC (e.g., HEVC Working Draft 10). In this example, the original sample values for the rightmost column and the bottom row are then used to perform planar or angular prediction for remaining samples of the block. In the case of lossy coding when the transform is skipped, instead of using original sample values for the rightmost column and the bottom row, reconstructed (quantized) sample values may be used for performing planar or angular prediction on the remaining samples.

In HEVC (e.g., HEVC Working Draft 10), the DC prediction values for the first row and column are filtered (DC prediction filtering). Similarly, for horizontal and vertical intra prediction modes, the first row and column of the prediction values, respectively, are filtered (gradient filtering). When the methods described above are applied to lossy coding for DC, horizontal or vertical intra prediction modes, and when the transform is skipped, the DC prediction filtering or gradient filtering may be skipped.

Figure 4:
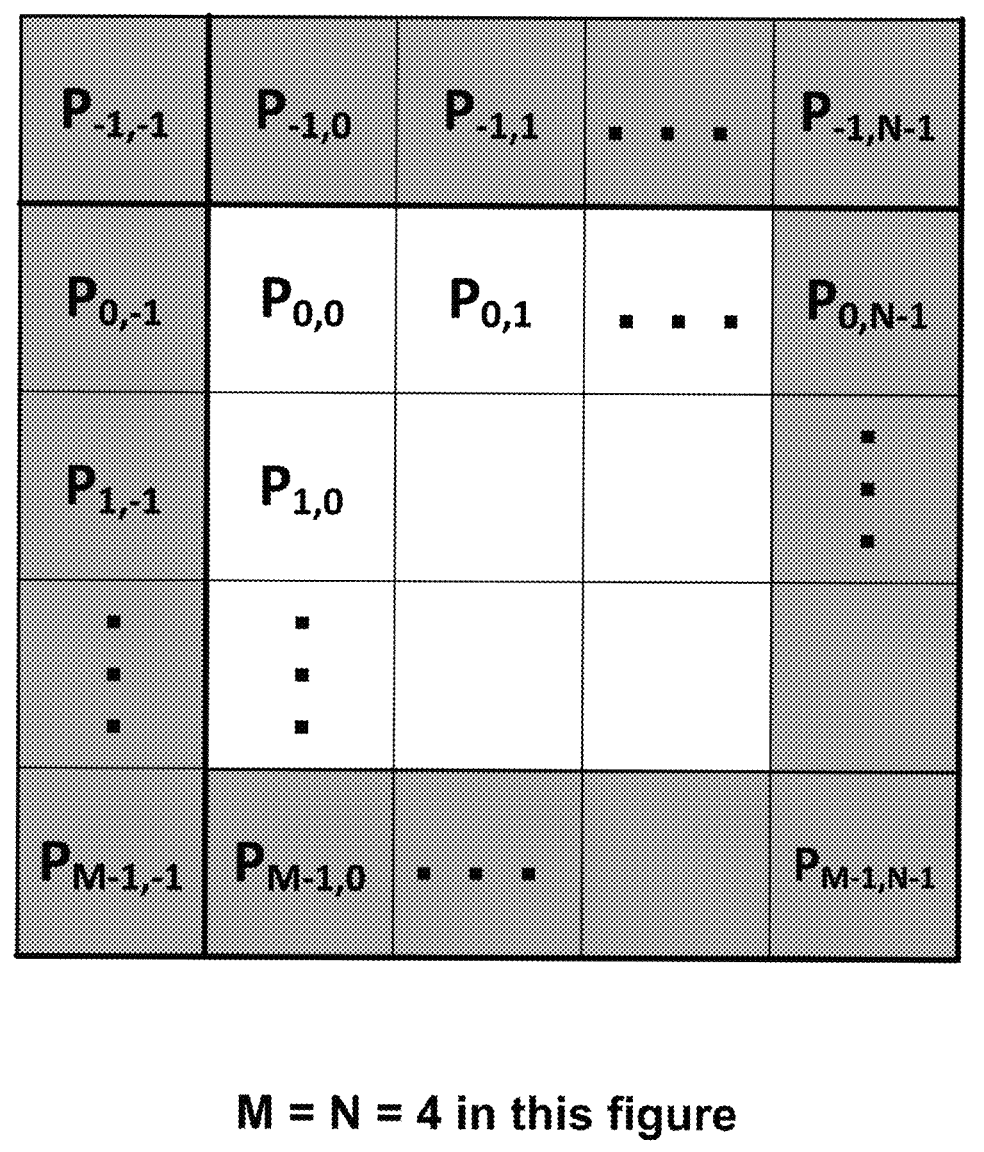

In another example of this disclosure, instead of changing the planar prediction mode, the same concept is applied to angular intra prediction modes. For each angular mode, the last row and column is predicted as specified in HEVC (e.g., HEVC Working Draft 10, equation (3), etc.). Then, the original sample values for the last row and column are used to perform intra prediction in addition to the reference samples. FIG. 4 shows the samples which are used for prediction. The shaded positions in FIG. 4 are the positions used as reference samples for performing the prediction. If, for a specific prediction direction and a specific position, reference samples $P_{-1,j}$, where $N \le j \le 2N$ (or their bilinear interpolation), would have been used as prediction value, then the original sample values from the right column (i.e., $P_{i,N-1}$, $0 \le i \le M-1$)) are used instead. If the position where the prediction angle intercepts the rightmost column is a fraction, bilinear interpolation or any other suitable interpolation method may be used. As an example, consider a 4×4 block. For intra prediction mode 34, for sample (2, 2), the corresponding reference sample would be $P_{-1,6}$. Thus, for mode 34, the HEVC prediction would be $T_{2,2}=P_{-1,5}$. Instead, in this example, $T_{2,2}=P_{1,3}$.

Similarly, if for a specific prediction direction and a specific position, reference samples $P_{i,-1}$, $M \le i \le 2M$ (or their bilinear interpolation) would have been used as prediction values, then the original sample values from the bottom row (i.e., $P_{M-1,j}$, $0 \le j \le N-1$) are used instead. If the position where the prediction angle intercepts the bottom row is a fraction, bilinear interpolation or another suitable interpolation technique may be used. As an example, consider a 4×4 block. In this example, for intra prediction mode 2, for sample (2, 1), the corresponding reference sample is $P_{4,-1}$. Thus, the HEVC prediction for mode 2 would be $T_{2,1}=P_{4,-1}$. Instead, in this example, $T_{2,1}=P_{3,0}$.

In some additional examples of this disclosure, video encoder 20 and video decoder 30 may perform coding that uses one or more original sample values within a block of video data to perform prediction of other sample values within the block. The original sample values may correspond to a last row and a last column of the block (e.g., the bottom row and the right most column of the block). As another example, original sample values may correspond to a first row and a first column of the block (e.g., the top row and the left most column). FIG. 4 illustrates one example of sample values used to perform prediction of other sample values. In this example, the video coder may perform a lossless coding mode, and the lossless coding mode may comprise a planar coding mode, an angular intra coding mode, or another mode. In some examples, the techniques may further include a rotate operation on set of residual values generated by the prediction, followed by entropy coding with respect to the rotated set of residual values.

Methods of differential pulse code modulation (DPCM) are proposed in Lee et al., "AHG7: Residual DPCM for HEVC lossless coding," Joint Collaborative Team on Video Coding (JCT-VC) of ITU-T SG 16 WP 3 and ISO/IEC JTC 1/SC 29/WG 11, 12$^{th}$ Meeting, Geneva, CH, 14-23 Jan. 2013, document no. JCTVC-L0117 (hereinafter, "JCTVC-L0117"). JCTVC-L0117 proposed an improvement to intra prediction for horizontal (e.g., intra prediction mode 10) and vertical (e.g., intra prediction mode 26) modes in HEVC for lossless coding. This improvement was denoted by residual DPCM. In JCTVC-L0117, residual DPCM is applied when a CU is being coded losslessly. The basic idea of residual DPCM is to use the upper row pixel for predicting the current pixel for vertical mode and to use the left column pixel for predicting the current pixel for vertical mode.

Figures 5A, 5B:
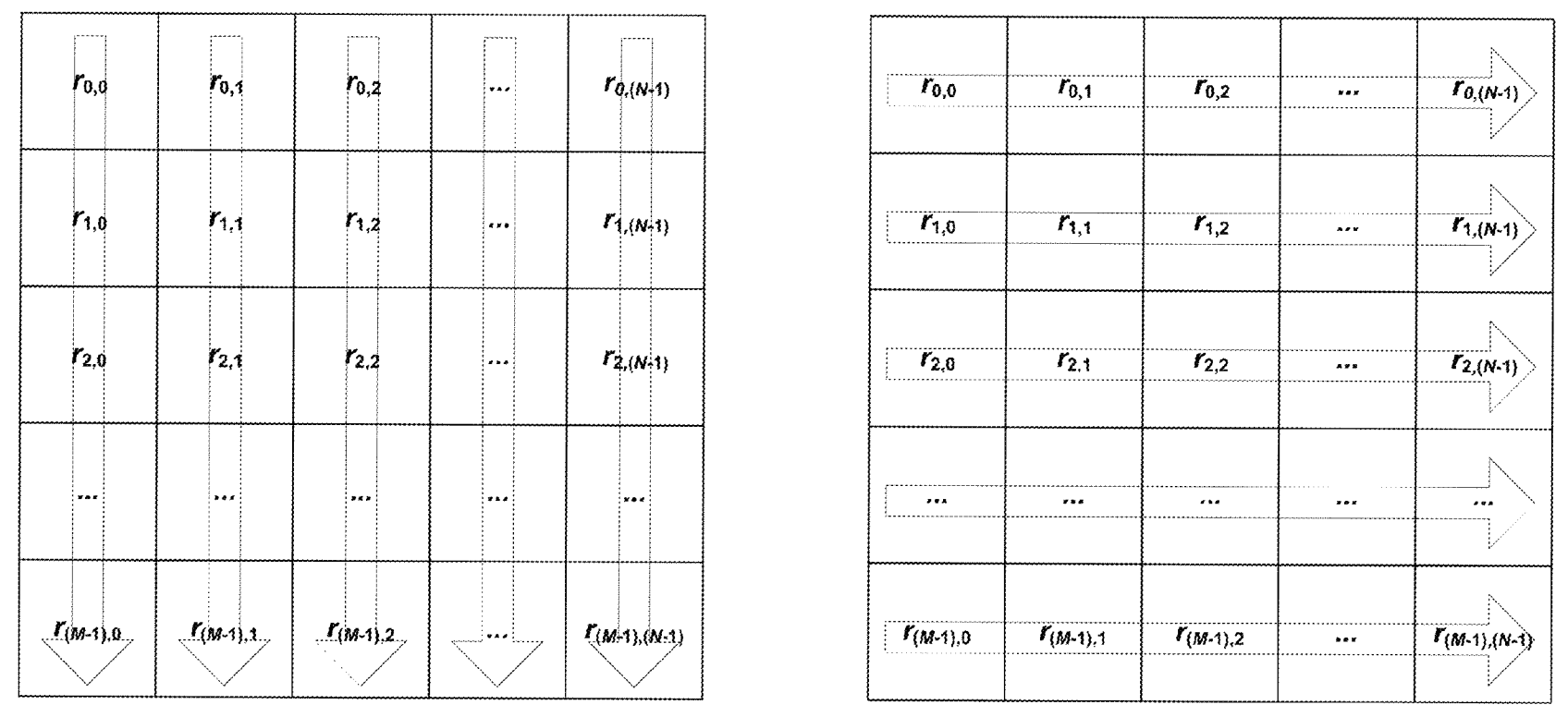

Residual DPCM, as described in JCTVC-L0117, can be described as follows. Consider a block of size M (rows)×N (cols). Let $r_{i,j}$, where $0 \le i \le (M-1)$ and $0 \le j \le (N-1)$, be the prediction residual after performing intra prediction as specified in HEVC Working Draft 10. This is shown in FIGS. 5A and 5B. The block could represent any component (e.g. luma, chroma, R, G, B, etc.). In the method proposed in JCTVC-L0117, the residual DPCM is applied to the residual samples, so that the modified M×N array $\tilde{R}$ with elements $\tilde{r}_{i,j}$ is obtained as follows when the intra prediction mode is vertical:

$$\tilde{r}_{i,j} = \begin{cases} r_{i,j}, & i = 0, 0 \le j \le (N-1) \\ r_{i,j} - r_{(i-1),j}, & 1 \le i \le (M-1), 0 \le j \le (N-1) \end{cases}, \quad (23)$$

When the intra prediction mode is horizontal, $\tilde{r}_{i,j}$ is obtained as follows:

$$\tilde{r}_{i,j} = \begin{cases} r_{i,j}, & 0 \le i \le (M-1), j = 0 \\ r_{i,j} - r_{i,(j-1)}, & 0 \le i \le (M-1), 1 \le j \le (N-1) \end{cases}. \quad (24)$$

The modified residual samples of $\tilde{R}$ are signaled to the video decoder, instead of the original residual samples R. This may be equivalent to using $P_{i-1,j}$ as a prediction for $P_{i,j}$ for the vertical prediction mode and using $P_{i,j-1}$ as a prediction for $P_{i,j}$ for the horizontal prediction mode.

Furthermore, in the method proposed in JCTVC-L0117, at the decoder side, when the intra prediction mode is a vertical mode, the original residual samples can be reconstructed after the modified residual samples are parsed as follows:

$$r_{i,j} = \sum_{k=0}^{i} \tilde{r}_{k,j}, 0 \le i \le (M-1), 0 \le j \le (N-1), \quad (25)$$

When the intra prediction mode is a horizontal mode, the original residual samples can be reconstructed after the modified residual samples are parsed as follows:

$$r_{i,j} = \sum_{k=0}^{j} \tilde{r}_{i,k}, 0 \le i \le (M-1), 0 \le j \le (N-1). \quad (26)$$

Furthermore, this disclosure discusses methods for extending the residual DPCM techniques proposed in JCTVC-L0117 for horizontal and vertical intra prediction modes to other angular intra prediction modes for lossless coding. Because the coding is lossless, the original neighboring samples (in causal coding order) as well as the corresponding prediction residuals are available for prediction (because transform and quantization are skipped).

In a first example, the residual DPCM technique may be extended to other angular intra prediction modes. FIG. 3 shows the intra prediction directions for different angular prediction modes (from 2 to 34). Now consider a mode between 22 and 30. For each of these modes, the prediction direction can be considered to be close to vertical (near-vertical). The numbers 22 and 30 are just examples. Other ranges (e.g., intra prediction modes between 24 and 28) may be chosen as well. Now consider that the residual $r_{i,j}$, where $0 \le i \le (M-1)$ and $0 \le j \le (N-1)$, is calculated as specified in HEVC (e.g., HEVC Working Draft 10). That is, the prediction is performed according to the angular mode and is subtracted from the original sample values to get the residual $r_{i,j}$. The residual DPCM may be applied to the residual samples exactly as in JCTVC-L0117 to obtain the modified M×N array $\tilde{R}$ with elements $\tilde{r}_{i,j}$ as follows:

$$\tilde{r}_{i,j} = \begin{cases} r_{i,j}, & i = 0, 0 \le j \le (N-1) \\ r_{i,j} - r_{(i-1),j}, & 1 \le i \le (M-1), 0 \le j \le (N-1) \end{cases} \quad (27)$$

Similarly, in this first example, consider a directional intra prediction mode between 6 and 14. For each of these intra prediction modes, the prediction direction can be considered to be close to horizontal (i.e., near-horizontal). The numbers 6 and 14 are just examples. In other examples, other ranges (e.g., intra prediction modes between 8 and 12) may be used. Now, consider that the residual $r_{i,j}$, where $0 \le i \le (M-1)$ and $0 \le j \le (N-1)$ is calculated as specified in HEVC (e.g., HEVC Working Draft 10). That is, the prediction is performed according to the angular mode and the prediction is subtracted from the original sample values to determine the residual $r_{i,j}$. The residual DPCM is applied to the residual samples exactly as in JCTVC-L0117 to obtain the modified M×N array $\tilde{R}$ with elements $\tilde{r}_{i,j}$ as follows:

$$\tilde{r}_{i,j} = \begin{cases} r_{i,j}, & 0 \le i \le (M-1), j = 0 \\ r_{i,j} - r_{i,(j-1)}, & 0 \le i \le (M-1), 1 \le j \le (N-1) \end{cases}. \quad (28)$$

As in the case of JCTVC-L0117, the modified residual samples of $\tilde{R}$ are signaled to the decoder.

Furthermore, in this first example, at the decoder side, the original residual samples can be reconstructed after the modified residual samples are parsed as follows. When the intra prediction mode is near-vertical (e.g., modes 22 to 30, inclusive), the original residual samples can be reconstructed as:

$$r_{i,j} = \sum_{k=0}^{i} \tilde{r}_{k,j}, 0 \le i \le (M-1), 0 \le j \le (N-1), \quad (29)$$

When the intra prediction mode is near-horizontal (e.g., modes 6 to 14, inclusive), the original residual samples can be reconstructed as:

$$r_{i,j} = \sum_{k=0}^{j} \tilde{r}_{i,k}, 0 \le i \le (M-1), 0 \le j \le (N-1). \quad (30)$$

Once the residual $r_{i,j}$ has been calculated, the residual $r_{i,j}$ is added to the prediction performed according to the angular mode to obtain the original samples. When obtaining the prediction for horizontal and vertical modes it may be possible to enable or disable the addition of a gradient term to the prediction for the first column (for vertical mode) or the first row (for horizontal mode).

In a second example where residual DPCM techniques are extended to angular intra prediction modes for lossless coding, for intra prediction mode 18 or intra prediction modes with prediction directions close to the diagonal down-right prediction direction of intra prediction mode 18 (see FIG. 3), the residual may be modified in the following way. First, the residual $r_{i,j}$, where $0 \leq i \leq (M-1)$ and $0 \leq j \leq (N-1)$, may be calculated as specified in HEVC Working Draft 10. That is, the prediction may be performed according to the angular mode and the prediction may be subtracted from the original sample values to get the residual $r_{i,j}$. Then, a modified M×N array $\tilde{R}$ with elements $\tilde{r}_{i,j}$ may be determined as follows:

$$\tilde{r}_{i,j} = \begin{cases} r_{i,j}, & i = 0, 0 \leq j \leq (N-1) \\ r_{i,j}, & 1 \leq i \leq (M-1), j = 0 \\ r_{i,j} - r_{i-1,j-1}, & 1 \leq i \leq (M-1), 1 \leq j \leq (N-1) \end{cases} \quad (31)$$

In this second example, the modified residual samples of $\tilde{R}$ are signaled to the decoder (e.g., video decoder 30). At the decoder side, the video decoder may reconstruct original residual samples after the video decoder parses the modified residual samples as follows. When the intra prediction direction is close to diagonal down-right prediction direction, the video decoder may reconstruct the original residual samples as:

$$r_{i,j} = \begin{cases} \tilde{r}_{i,j}, & i = 0, 0 \leq j \leq (N-1) \\ \tilde{r}_{i,j}, & 1 \leq i \leq (M-1), j = 0 \\ \tilde{r}_{i,j} + r_{i-1,j-1}, & 1 \leq i \leq (M-1), 1 \leq j \leq (N-1) \end{cases} \quad (32)$$

Furthermore, in this second example, once the residual $r_{i,j}$ been calculated, $r_{i,j}$ be added to the prediction performed according to the angular mode to obtain the original samples. In calculating residual $r_{i,j}$, $r_{i-1,j-1}$ may need to be available. This may always be true if the true residuals are calculated row-by-row or column-by-column. Thus, it may be possible to calculate the true residual $r_{i,j}$ for all the samples in a row (or column) in parallel.

In a third example where residual DPCM techniques are extended to angular intra prediction modes for lossless coding, for intra prediction mode 34 or intra prediction modes with prediction directions close to the diagonal down-left prediction direction of intra prediction mode 34 (see FIG. 3), the residual may be modified in the following way. First, the residual $r_{i,j}$, where $0 \leq i \leq (M-1)$ and $0 \leq j \leq (N-1)$, may be calculated as specified in HEVC (e.g., HEVC Working Draft 10). That is, the prediction may be performed according to the angular mode and the prediction may be subtracted from the original sample values to determine the residual $r_{i,j}$. Then, a modified M×N array $\tilde{R}$ with elements $\tilde{r}_{i,j}$ may be determined as follows:

$$\tilde{r}_{i,j} = \begin{cases} r_{i,j}, & i = 0, 0 \leq j \leq (N-1) \\ r_{i,j}, & 1 \leq i \leq (M-1), j = (N-1) \\ r_{i,j} - r_{i-1,j+1}, & 1 \leq i \leq (M-1), 0 \leq j \leq (N-2) \end{cases} \quad (33)$$

Furthermore, in this third example, the modified residual samples of $\tilde{R}$ may be signaled to a video decoder (e.g., video decoder 30). At the decoder side, the video decoder may reconstruct original residual samples after the video decoder parses the modified residual samples as follows. When the intra prediction direction is close to diagonal down-left prediction direction (mode 34), the video decoder may reconstruct the original residual samples using the following equation:

$$r_{i,j} = \begin{cases} \tilde{r}_{i,j}, & i = 0, 0 \leq j \leq (N-1) \\ \tilde{r}_{i,j}, & 1 \leq i \leq (M-1), j = (N-1) \\ \tilde{r}_{i,j} + r_{i-1,j+1}, & 1 \leq i \leq (M-1), 0 \leq j \leq (N-2) \end{cases} \quad (34)$$

In this third example, once the residual $r_{i,j}$ has been calculated, $r_{i,j}$ may be added to the prediction performed according to the angular mode to obtain the original samples. In calculating residual $r_{i,j}$, $r_{i-1,j+1}$ may need to be available. This may always be true if the true residuals are calculated row-by-row. Thus, it may be possible to calculate the true residual $r_{i,j}$ for all the samples in a row in parallel.

In a fourth example where residual DPCM techniques are extended to angular intra prediction modes for lossless coding, for intra prediction mode 2 or intra prediction modes with prediction directions close to the diagonal up-right prediction direction of mode 2 (see FIG. 3), the residual may be modified in the following way. First, the residual $r_{i,j}$, where $0 \leq i \leq (M-1)$ and $0 \leq j \leq (N-1)$ may be calculated as specified in HEVC (e.g., HEVC Working Draft 10). That is, the prediction may be performed according to the angular mode and the prediction may be subtracted from the original sample values to determine the residual $r_{i,j}$. Then, a modified M×N array $\tilde{R}$ with elements $\tilde{r}_{i,j}$ may be determined as follows:

$$\tilde{r}_{i,j} = \begin{cases} r_{i,j}, & i = (M-1), 0 \leq j \leq (N-1) \\ r_{i,j}, & 0 \leq i \leq (M-2), j = 0 \\ r_{i,j} - r_{i+1,j-1}, & 0 \leq i \leq (M-2), 1 \leq j \leq (N-1) \end{cases} \quad (35)$$

In this fourth example, the modified residual samples of $\tilde{R}$ may be signaled to a video decoder (e.g., video decoder 30). At the decoder side, the video decoder may reconstruct the original residual samples after the video decoder parses the modified residual samples as follows. When the intra prediction direction is close to diagonal up-right prediction direction (mode 2), the video decoder may reconstruct the original residual samples according to the following equation:

$$r_{i,j} = \begin{cases} \tilde{r}_{i,j}, & i = (M-1), 0 \leq j \leq (N-1) \\ \tilde{r}_{i,j}, & 0 \leq i \leq (M-2), j = 0 \\ \tilde{r}_{i,j} + r_{i+1,j-1}, & 0 \leq i \leq (M-2), 1 \leq j \leq (N-1) \end{cases} \quad (36)$$

Furthermore, in this fourth example, once residual $r_{i,j}$ has been calculated, the residual $\tilde{r}_{i,j}$ may be added to the prediction performed according to the angular mode to obtain the original samples. In calculating residual $r_{i,j}$, $r_{i+1,j-1}$ may need to be available. This may always be true if the true residuals are calculated column-by-column. Thus, it may be possible to calculate the true residual $r_{i,j}$ for all the samples in a column in parallel. The first, second, third, and fourth examples where residual DPCM techniques are extended to angular intra prediction modes for lossless coding may be employed simultaneously provided that the range of prediction modes for each embodiment do not overlap.

As described in a fifth example where residual DPCM techniques are extended to angular intra prediction modes for lossless coding, in the residual DPCM method proposed in JCTVC-L0117, for vertical mode, the residual for the first row is not modified. A similar observation is true for the horizontal mode. In that case, the residual for the first column is not modified. A similar observation is true for the near-vertical and near-horizontal modes in case of the first example where residual DPCM techniques are extended to angular intra prediction modes for lossless coding. The fifth example where residual DPCM techniques are extended to angular intra prediction modes for lossless coding proposes to extend the concept of residual DPCM to the first row for a vertical or near-vertical intra prediction mode and to the first column for a horizontal or near-horizontal intra prediction mode. Consider a vertical or near-vertical mode. In this case, first, the residual $r_{i,j}$, where $0 \le i \le (M-1)$ and $0 \le j \le (N-1)$ may be calculated as specified in HEVC (e.g., HEVC Working Draft 10). That is, the prediction may be performed according to the angular mode and the prediction may be subtracted from the original sample values to determine the residual $r_{i,j}$. Then, a modified M×N array $\tilde{R}$ with elements $\tilde{r}_{i,j}$ may be determined as follows:

$$\tilde{r}_{i,j} = r_{i,j} - r_{(i-1),j}, 0 \le i \le (M-1), 0 \le j \le (N-1). \quad (37)$$

In equation (37), $r_{-1,j}$ refers to the residual from the upper block. If the upper block is not available or if the upper block belongs to a different LCU, it may not be possible to not perform residual DPCM on the first row.

In this fifth example, the modified residual samples of $\tilde{R}$ may be signaled to the video decoder. At the decoder side, the video decoder may reconstruct the original residual samples after the video decoder parses the modified residual samples as follows. When the intra prediction mode is vertical or near-vertical, the original residual samples may be reconstructed as follows:

$$r_{i,j} = r_{-1,j} + \sum_{k=0}^{i} \tilde{r}_{k,j}, 0 \le i \le (M-1), 0 \le j \le (N-1). \quad (38)$$

A similar strategy may be used for horizontal and near-horizontal modes where:

$$\tilde{r}_{i,j} = r_{i,j} - r_{i,(j-1)}, 0 \le i \le (M-1), 0 \le j \le (N-1), \text{ and} \quad (39)$$

$$r_{i,j} = r_{i,-1} + \sum_{k=0}^{j} \tilde{r}_{i,k}, 0 \le i \le (M-1), 0 \le j \le (N-1). \quad (40)$$

This approach may be extended in a similar manner to the second, third, and fourth examples where residual DPCM techniques are extended to angular intra prediction modes for lossless coding as described above.

In a sixth example where residual DPCM techniques are extended to angular intra prediction modes for lossless coding, the residual DPCM method proposed in JCTVC-L0117 can also be applied to the DC intra mode (e.g., mode 1 in HEVC) and to the planar mode (e.g., mode 0 in HEVC). For example, the vertical (or horizontal) residue prediction may be applied after the DC intra prediction is done. Furthermore, the vertical and horizontal residue prediction may both be applied: first apply the vertical (horizontal) DCPM and then apply the horizontal (vertical) DPCM to the output of the first DCPM.

A seventh example where residual DPCM techniques are extended to angular intra prediction modes for lossless coding is similar to the sixth example where residual DPCM techniques are extended to angular intra prediction modes for lossless coding in that two or more DPCMs can be applied on the residue. For instance, the two diagonal DPCMs described in the third and fourth examples where residual DPCM techniques are extended to angular intra prediction modes for lossless coding to the planar mode, and then the horizontal and vertical DPCM.

Various techniques described in this disclosure may also be extended to lossy intra coding when transform is skipped. For example, in HEVC (e.g., HEVC Working Draft 10), the transform may be skipped for 4×4 blocks. In this disclosure, the term "transform skip block" applies to a block for which application of the transform is skipped. However, the proposed techniques described above where residual DPCM techniques are extended to angular intra prediction modes for lossless coding may be used for higher block sizes if transform is skipped. For example, JCTVC-E145 discussed one way to extend these techniques to lossy intra coding when the transform is skipped. In general, the idea proposed in JCTVC-E145 is that instead of using the reference samples for intra prediction as shown in FIG. 2, reconstructed sample values from causal neighbors can be used to perform intra prediction. However, this can be computationally costly as the prediction process has to be repeated for each sample. Furthermore, it is unclear as to how this would work for DC and planar intra prediction modes.

One or more techniques of this disclosure are related to residual DPCM for lossy coding. For instance, in some examples of this disclosure, near-horizontal and near-vertical intra prediction modes for a block for which transform is skipped are considered. In this disclosure, a near-vertical mode may be defined as an intra prediction mode where the prediction direction is near vertical. Examples of near-vertical modes may be all intra prediction modes between 22 and 30 as shown in FIG. 3. Similarly, a near-horizontal mode may be defined as an intra prediction mode where the prediction direction is near horizontal. Examples of near-horizontal intra prediction modes may be all intra prediction modes between 6 and 14 as shown in FIG. 3. Furthermore, consider a block of size M (rows)×N (cols). Let $r_{i,j}$, where $0 \le i \le (M-1)$ and $0 \le j \le (N-1)$, be the prediction residual after performing intra prediction as specified in HEVC (e.g., HEVC Working Draft 10). This is shown in FIGS. 5A and 5B. The block may represent any component (e.g. luma, chroma, R, G, B, etc.).

Specifically, FIG. 5A shows a residual DPCM direction for near-vertical modes. FIG. 5B shows a residual DPCM direction for near-horizontal modes. Each respective square in FIGS. 5A and 5B corresponds to a respective residual sample $r_{i,j}$. The vertical arrows in each column of FIG. 5A show the residual DPCM direction for the near-vertical modes. The horizontal arrows in each row of FIG. 5B show the residual DPCM direction for the near-horizontal modes. A DPCM direction is a direction (e.g., horizontal or vertical) along with a video coder processes samples when applying residual DPCM.

Furthermore, consider a near-vertical mode and let $Q(r_{i,j})$, where $0 \le i \le (M-1)$ and $0 \le j \le (N-1)$, denote the quantized version of residual $r_{i,j}$. The block of residual values may be denoted as R. In other words, residual $r_{i,j}$ undergone quantization and inverse quantization. The residual DPCM may be applied to the residual samples to obtain an M×N array $\tilde{R}$, as follows. The modified M×N array $\tilde{R}$ with elements $\tilde{r}_{i,j}$ may be obtained as follows when the intra prediction mode is vertical:

$$\tilde{r}_{i,j} = \begin{cases} r_{i,j}, & i = 0, 0 \le j \le (N-1) \\ r_{i,j} - Q(r_{(i-1),j}), & 1 \le i \le (M-1), 0 \le j \le (N-1) \end{cases}, \quad (41)$$

When the intra prediction mode is horizontal, $\tilde{r}_{i,j}$ may be obtained as:

$$\tilde{r}_{i,j} = \begin{cases} r_{i,j}, & 0 \le i \le (M-1), j = 0 \\ r_{i,j} - Q(r_{i,(j-1)}) & 0 \le i \le (M-1), 1 \le j \le (N-1) \end{cases}. \quad (42)$$

Thus, in the example above, when the intra prediction mode is vertical or near-vertical, the modified residual values in the leftmost column of $\tilde{R}$ are equal to corresponding residual values in the leftmost column of R. For each respective residual value (i.e., $r_{i,j}$) in each column of R to the right of the leftmost column of $\tilde{R}$, video encoder 20 may set a corresponding modified residual value $\tilde{r}_{i,j}$ equal to the respective residual value (i.e., $r_{i,j}$) minus a reconstructed residual value corresponding to a residual value occurring immediately left of the respective residual value (i.e., $Q(r_{(i-1),j})$). Similarly, when the intra prediction mode is horizontal or near-horizontal, the modified residual values in the top row of $\tilde{R}$ are equal to corresponding residual values in the top row of R. However, for each respective residual value (i.e., $r_{i,j}$) in each row of R below the top row of R, video encoder 20 may set the corresponding modified residual value (i.e., $\tilde{r}_{i,j}$) equal to the respective residual value (i.e., $r_{i,j}$) minus a reconstructed residual value corresponding to a residual value occurring immediately above the respective residual value (i.e., $Q(r_{i,(j-1)})$).

Furthermore, in this example, the modified residual sample, $\tilde{r}_{i,j}$ is quantized to produce a quantized version of the modified residual sample, $Q(\tilde{r}_{i,j})$. When the intra prediction mode is vertical, the reconstructed residual sample $Q(r_{i,j})$ is calculated as:

$$Q(r_{i,j}) = \begin{cases} Q(\tilde{r}_{i,j}), & i = 0, 0 \le j \le (N-1), \\ Q(\tilde{r}_{i,j}) + Q(r_{i-1,j}) & 1 \le i \le (M-1), 0 \le j \le (N-1) \end{cases}. \quad (43)$$

This may also be written as:

$$Q(r_{i,j}) = \sum_{k=0}^{i} Q(\tilde{r}_{k,j}), 0 \le i \le (M-1), 0 \le j \le (N-1).$$

Similarly, when the mode is horizontal, the reconstructed residual sample $Q(r_{i,j})$ is calculated as:

$$Q(r_{i,j}) = \begin{cases} Q(\tilde{r}_{i,j}), & 0 \le i \le (M-1), j = 0, \\ Q(\tilde{r}_{i,j}) + Q(r_{i,j-1}) & 0 \le i \le (M-1), 1 \le j \le (N-1) \end{cases}. \quad (44)$$

This can also be written as:

$$Q(r_{i,j}) = \sum_{k=0}^{j} Q(\tilde{r}_{i,k}), 0 \le i \le (M-1), 0 \le j \le (N-1).$$

Thus, when the intra prediction mode is vertical or near-vertical, the reconstructed residual values corresponding to residual values in a leftmost column of R are equal to corresponding quantized versions of modified residual values in the leftmost column of $\tilde{R}$. However, for each respective residual value in each column of R to the right of the leftmost column of R, video encoder 20 sets the corresponding reconstructed residual value equal to the sum of the quantized version of the corresponding modified residual value in $\tilde{R}$ (i.e., $Q(\tilde{r}_{i,j})$) and the reconstructed residual value corresponding to the residual value occurring immediately to the left of the respective residual value (i.e., $Q(r_{i-1,j})$). Similarly, when the intra prediction mode is horizontal or near horizontal, the reconstructed residual values corresponding to residual values in the top row of R are equal to corresponding quantized versions of modified residual values in the top row of $\tilde{R}$. However, for each respective residual value of R in each row of R below the top row of R, video encoder 20 may set the corresponding reconstructed residual value equal to a sum of the quantized version of the corresponding modified residual value in $\tilde{R}$ (i.e., $Q(\tilde{r}_{i,j})$) and a reconstructed residual value corresponding to the residual value in R occurring immediately above the respective residual value (i.e., $Q(r_{i,j-1})$).

On the decoder side, calculations (43), and (44) are repeated to produce the reconstructed residual sample $Q(r_{i,j})$, where $0 \le i \le (M-1)$ and $0 \le j \le (N-1)$. Video decoder 30 may add reconstructed residual sample values to the original prediction values to produce reconstructed sample values. For example, video decoder 30 may add the reconstructed residual samples $Q(r_{i,j})$ to corresponding samples of a predictive block to reconstruct sample values of a current block (e.g., a current CU). The process of determining reconstructed residual values from residual values that are encoded using DPCM may be referred to herein as "inverse RDPCM." Normally, both video encoder 20 and video decoder 30 clip the reconstructed samples to an appropriate bitdepth. However, in this case, the clipping operation is performed after the inverse RDPCM process to reconstruct quantized residuals.

The examples above may be extended in a straightforward manner to diagonal directions as well. For instance, in one example, when the intra prediction direction is close to a diagonal down-right direction (e.g., intra prediction mode 18), $\tilde{r}_{i,j}$ may be determined as:

$$\tilde{r}_{i,j} = \begin{cases} r_{i,j}, & i = 0, 0 \le j \le (N-1) \\ r_{i,j}, & 1 \le i \le (M-1), j = 0 \\ r_{i,j} - Q(r_{i-1,j-1}), & 1 \le i \le (M-1), 1 \le j \le (N-1) \end{cases}. \quad (45)$$

The reconstructed residual sample $Q(r_{i,j})$ may be determined as:

$$Q(r_{i,j}) = \begin{cases} Q(\tilde{r}_{i,j}), & i = 0, 0 \le j \le (N-1) \\ Q(\tilde{r}_{i,j}), & 1 \le i \le (M-1), j = 0 \\ Q(\tilde{r}_{i,j}) + Q(r_{i-1,j-1}), & 1 \le i \le (M-1), 1 \le j \le (N-1) \end{cases}. \quad (46)$$

Other near-diagonal modes (e.g., modes near down-left (mode 34) and near up-right (mode 2)) can be treated similarly.

Furthermore, in some examples, instead of applying DPCM to reconstructed residuals, the DPCM may be applied to bit-shifted versions of the reconstructed residuals. For example, for transform skip blocks, video decoder 30 may perform, for each sample, a dequantization operation, a left shift by 7, and then a right shift (e.g., after adding an offset) by (20-bit depth). In this context, bit depth may refer to the number of bits used to represent a sample value or a transform coefficient. In a dequantization operation, there is a right shift by bdShift after adding an offset.

For example, section 8.6.2 of JCTVC-M1005_v2 (i.e., a draft of the range extension specification for HEVC) describes a scaling and transformation process that determines an array of residual samples based on an array of transform coefficient levels of a transform block of a TU. In section 8.6.2 of JCTVC-M1005_v2, the array of transform coefficient levels may contain residual sample values if the transform and quantization is not applied to the transform block. A portion of section 8.6.2 of JCTVC-M1005_v2 is reproduced below.

The (nTbS)×(nTbS) array of residual samples r is derived as follows:
If cu_transquant_bypass_flag is equal to 1, the (nTbS)× (nTbS) array r is set equal to the (nTbS)×(nTbS) array of transform coefficients TransCoeffLevel[xTbY][yTbY][cIdx].
Otherwise, the following ordered steps apply:
1. The scaling process for transform coefficients as specified in subclause 8.6.3 is invoked with the transform block location (xTbY, yTbY), the size of the transform block nTbS, the color component variable cIdx, and the quantization parameter qP as inputs, and the output is an (nTbS)×(nTbS) array of scaled transform coefficients d.
2. The (nTbS)×(nTbS) array of residual samples r is derived as follows:
If transform_skip_flag[xTbY][yTbY][cIdx] is equal to 1, the residual sample array values r[x][y] with x=0 . . . nTbS−1, y=0 . . . nTbS−1 are derived as follows:

$$r[x][y]=(d[x][y]<<7) \tag{8-267}$$

Otherwise (transform_skip_flag[xTbY][yTbY] [cIdx] is equal to 0), the transformation process for scaled transform coefficients as specified in subclause 8.6.4 is invoked with the transform block location (xTbY, yTbY), the size of the transform block nTbS, the color component variable cIdx, and the (nTbS)×(nTbS) array of scaled transform coefficients d as inputs, and the output is an (nTbS)×(nTbS) array of residual samples r.
3. The variable bdShift is derived as follows:

$$bdShift=(cIdx==0)?20-BitDepth_Y:20-BitDepth_C \tag{8-268}$$

4. The residual sample values r[x][y] with x=0 . . . nTbS−1, y=0 . . . nTbS−1 are modified as follows:

$$r[x][y]=(r[x][y]+(1<<(bdShift-1)))>>bdShift \tag{8-269}$$

As shown above, section 8.6.2 of JCTVC-M1005_v2 specifies that section 8.6.3 of JCTVC-M1005_v2 is invoked if the transform and quantization is applied to the transform block. Section 8.6.3 of JCTVC-M1005_v2 describes a scaling process for transform coefficients. Section 8.6.3 of JCTVC-M1005_v2 is reproduced below.
Inputs to this process are:
a luma location (xTbY, yTbY) specifying the top-left sample of the current luma transform block relative to the top-left luma sample of the current picture,
a variable nTbS specifying the size of the current transform block,
a variable cIdx specifying the colour component of the current block,
a variable qP specifying the quantization parameter.
Output of this process is the (nTbS)×(nTbS) array d of scaled transform coefficients with elements d[x][y].

The variable bdShift is derived as follows:
If cIdx is equal to 0, $$bdShift=BitDepth_Y+Log\ 2(nTbS)-5 \tag{8-270}$$

Otherwise, $$bdShift=BitDepth_C+Log\ 2(nTbS)-5 \tag{8-271}$$

The list levelScale[ ] is specified as levelScale[k]={40, 45, 51, 57, 64, 72} with k=0.5.
For the derivation of the scaled transform coefficients d[x][y] with x=0 . . . nTbS−1, y=0 . . . nTbS−1, the following applies:
The scaling factor m[x][y] is derived as follows:
If scaling_list_enabled_flag is equal to 0, $$m[x][y]=16 \tag{8-272}$$

Otherwise (scaling_list_enabled_flag is equal to 1), $$m[x][y]=ScalingFactor[sizeId][matrixId][x][y] \tag{8-273}$$

Where sizeId is specified in Table 7-3 for the size of the quantization matrix equal to (nTbS)×(nTbS) and matrixId is specified in Table 7-4 for sizeId, CuPredMode[xTbY][yTbY], and cIdx, respectively.
The scaled transform coefficient d[x][y] is derived as follows:

$$d[x][y]=Clip3(-32768,32767,((TransCoeffLevel\\ [xTbY][yTbY][cIdx][x][y]*m[x][y]*levelScale\\ [qP\%6]<<(qP/6))+(1<<(bdShift-1)))>>bdShift) \tag{8-274}$$

As indicated in section 8.6.3 of JCTVC-M1005_v2, video decoder 30 may determine a scaled transform coefficient, d[x][y], using equation 8-274 of JCTVC-M1005_v2. In equation 8-274, the Clip3( . . . ) function is defined as:

$$Clip3(x, y, z) = \begin{cases} x; & z < x \\ y; & z > y \\ z; & \text{otherwise} \end{cases}.$$

In accordance with one or more techniques of this disclosure, instead of applying the inverse DPCM to the reconstructed residuals, the inverse DPCM may be applied to the dequantized sample values before applying the left-shift. Similarly, instead of an inverse transform, a left shift by 7 may be applied after dequantization. For instance, an array of residual samples r[x][y] with x=0 . . . nTbs−1, y=0 . . . nTbS−1 may be derived as shown in equation 8-267 of JCTVC-M1005_v2.

In some examples, the inverse DPCM is applied to samples after dequantization or after left shift by 7. Similarly, a right shift by (20 bit depth) after adding an offset is applied at the very end of the process to reconstruct the residuals. For instance, the residual samples r[x][y], with x=0 . . . nTbS−1 and y=0 . . . nTbS−1, may be modified as shown in equation 8-269 of JCTVC-M1005_v2.

In that case, the inverse DPCM may be applied after right shifting by an amount less than (20-bit depth) to retain better precision, before applying the remaining right shift so that the overall right shift amounts to (20-bit depth).

In some instances, video encoder 20 does not apply a transform to residual samples of a transform block, but does quantize the residual samples of the transform block. In other words, video encoder 20 may apply a form of lossy coding in which the transform is skipped. In such instances, video decoder 30 may determine, from syntax elements in a bitstream, quantized residual samples of the transform block and dequantize the quantized residual samples of the transform block to reconstruct the residual samples of the transform block without applying an inverse transform to the transform block.

Alternatively, gradient filtering may be modified as described herein using reconstructed (quantized) sample values instead of original sample values. In HEVC (e.g., HEVC Working Draft 10), when obtaining the prediction for horizontal and vertical modes, a gradient term is added to the prediction for the first column (for vertical mode) or the first row (for horizontal mode). This may be referred to as gradient filtering. The addition of the gradient term could be enabled or disabled when using residual DPCM. This disclosure proposes improvements to the gradient filtering for horizontal and vertical intra prediction modes when residual prediction is used.

For instance, consider that residual DPCM as proposed in JCTVC-L0117 is being used. In HEVC Working Draft 10, for luma components and for block sizes less than 32, for the vertical intra prediction mode, the prediction for sample $P_{i,0}$, $0 \leq i \leq M-1$ is given by:

$\text{Clip}(P_{-1,0}+((P_{i,-1}-P_{-1,-1})>>1))$,

In the equation above, >> represents a bitwise right-shift and the Clip operation clips the prediction values to the range of sample values. Because in residual DPCM, for vertical intra prediction mode, the prediction for sample $P_{i,j}$ is $P_{i-1,j}$, the gradient term for the samples in the first column is modified as $((P_{i,-1}-P_{i-1,-1})>>1)$. Accordingly, the prediction for sample $P_{i,0}, 0 \leq i \leq M-1$ is:

$\text{Clip}(P_{i-1,0}+((P_{i,-1}-P_{i-1,-1})>>1))$.

Furthermore, the gradient filtering may be extended to other columns for vertical intra prediction mode as follows. Because the left and left-top original samples are available in lossless mode, the gradient term may be added to the prediction for any column in the vertical intra prediction mode. Thus, for vertical intra prediction mode, the prediction for sample $P_{i,j}$, $0 \leq i \leq M-1, 0 \leq j \leq N-1$ may be modified to:

$\text{Clip}(P_{i-1,j}+((P_{i,j-1}-P_{i-1,j-1})>>1))$.

The modified gradient filtering for vertical intra prediction mode may be applied to any component and any block size.

This concept may be extended to horizontal intra prediction mode as well. In HEVC Working Draft 10, for luma components and for block sizes less than 32, for the horizontal intra prediction mode, the prediction for sample $P_{0,j}$, $0 \leq j \leq N-1$ is given by:

$\text{Clip}(P_{0,-1}+((P_{-1,j}-P_{-1,-1})>>1))$,

In the equation above, >> represents a bitwise right-shift and the Clip operation clips the prediction values to the range of sample values. Because in residual DPCM, for horizontal intra prediction mode, the prediction for sample $P_{i,j}$ is $P_{i,j-1}$, the gradient term for the samples in the first row may be modified to $((P_{-1,j}-P_{-1,j-1})>>1)$. The prediction for sample $P_{0,j}$, $0 \leq j \leq N-1$ may be determined by:

$\text{Clip}(P_{0,j-1}+((P_{-1,j}-P_{-1,j-1})>>1))$.

The gradient filtering may be extended to other columns for horizontal intra prediction mode as follows. Because the top and left-top original samples are always available in lossless mode, the gradient term may be added to the prediction for any row in the horizontal intra prediction mode. Thus, for horizontal intra prediction mode, the prediction for sample, $0 \leq i \leq M-1$, $0 \leq j \leq N-1$ may be given by:

$\text{Clip}(P_{i,j-1}+((P_{i-1,j}-P_{i-1,j-1})>>1))$.

As described in section 7.3.2.3 of JCTVC-M1005_v2, a PPS may include a sign data hiding enabled syntax element (e.g., sign_data_hiding_enabled_flag). Furthermore, as shown in section 7.3.8.11 of JCTVC-M1005_v2, when the sign data hiding enabled syntax element has a particular value (e.g., 1), syntax elements (e.g., coeff_sign_flag syntax elements) indicating positive/negative signs of transform coefficients may be omitted from a TU. Thus, video encoder 20 may signal, in a bitstream, an explicit indication (e.g., a sign_data_hiding_enabled_flag) that sign data hiding is enabled for a current picture and hence a current block within the current picture. Likewise, video decoder 30 may obtain, from a bitstream, an explicit indication (e.g., a sign_data_hiding_enabled_flag) that sign data hiding is enabled for a current picture and hence a current block in the current picture. Section 7.3.8.11 of JCTVC-M1005_v2 is reproduced below.

| | Descriptor |
|---|---|
| residual_coding( x0, y0, log2TrafoSize, cIdx ) { | |
|   if( transform_skip_enabled_flag && !cu_transquant_bypass_flag && | |
|     ( log2TrafoSize == 2 ) ) | |
|     transform_skip_flag[ x0 ][ y0 ][ cIdx ] | ae(v) |
|   last_sig_coeff_x_prefix | ae(v) |
|   last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |
|   lastScanPos = 16 | |
|   lastSubBlock = ( 1 << ( log2TrafoSize − 2 ) ) * ( 1 << ( | |
|                   log2TrafoSize − 2 ) ) − 1 | |
|   do { | |
|     if( lastScanPos == 0 ) { | |
|       lastScanPos = 16 | |
|       lastSubBlock−− | |
|     } | |
|     lastScanPos−− | |
|     xS = ScanOrder[ log2TrafoSize − 2 ][ scanIdx ][ lastSubBlock ][ 0 ] | |
|     yS = ScanOrder[ log2TrafoSize − 2 ][ scanIdx ][ lastSubBlock ][ 1 ] | |
|     xC = ( xS << 2 ) + ScanOrder[ 2 ][ scanIdx ][ lastScanPos ][ 0 ] | |
|     yC = ( yS << 2 ) + ScanOrder[ 2 ][ scanIdx ][ lastScanPos ][ 1 ] | |
|   } while( ( xC != LastSignificantCoeffX ) \| \| ( yC != | |
|                   LastSignificantCoeffY ) ) | |
|   for( i = lastSubBlock; i >= 0; i−− ) { | |
|     xS = ScanOrder[ log2TrafoSize − 2 ][ scanIdx ][ i ][ 0 ] | |

|  | Descriptor |
|---|---|
| ```
        yS = ScanOrder[ log2TrafoSize − 2 ][ scanIdx ][ i ][ 1 ]
        inferSbDcSigCoeffFlag = 0
        if( ( i < lastSubBlock ) && ( i > 0 ) ) {
            coded_sub_block_flag[ xS ][ yS ]
            inferSbDcSigCoeffFlag = 1
        }
        for( n = ( i == lastSubBlock ) ? lastScanPos − 1 : 15; n >= 0; n−− ) {
            xC = ( xS << 2 ) + ScanOrder[ 2 ][ scanIdx ][ n ][ 0 ]
            yC = ( yS << 2 ) + ScanOrder[ 2 ][ scanIdx ][ n ][ 1 ]
            if( coded_sub_block_flag[ xS ][ yS ] && ( n > 0 | |
!inferSbDcSigCoeffFlag ) ) {
                sig_coeff_flag[ xC ][ yC ]
                if( sig_coeff_flag[ xC ][ yC ] )
                    inferSbDcSigCoeffFlag = 0
            }
        }
        firstSigScanPos = 16
        lastSigScanPos = −1
        numGreater1Flag = 0
        lastGreater1ScanPos = −1
        for( n = 15; n >= 0; n−− ) {
            xC = ( xS << 2 ) + ScanOrder[ 2 ][ scanIdx ][ n ][ 0 ]
            yC = ( yS << 2 ) + ScanOrder[ 2 ][ scanIdx ][ n ][ 1 ]
            if( sig_coeff_flag[ xC ][ yC ] ) {
                if( numGreater1Flag < 8 ) {
                    coeff_abs_level_greater1_flag[ n ]
                    numGreater1Flag++
                    if( coeff_abs_level_greater1_flag[ n ] && lastGreater1ScanPos
== −1 )
                        lastGreater1ScanPos = n
                }
                if( lastSigScanPos == −1 )
                    lastSigScanPos = n
                firstSigScanPos = n
            }
        }
        signHidden = ( lastSigScanPos − firstSigScanPos > 3 &&
!cu_transquant_bypass_flag )
        if( lastGreater1ScanPos != −1 )
            coeff_abs_level_greater2_flag[ lastGreater1ScanPos ]
        for( n = 15; n >= 0; n−− ) {
            xC = ( xS << 2 ) + ScanOrder[ 2 ][ scanIdx ][ n ][ 0 ]
            yC = ( yS << 2 ) + ScanOrder[ 2 ][ scanIdx ][ n ][ 1 ]
            if( sig_coeff_flag[ xC ][ yC ] &&
                ( !sign_data_hiding_enabled_flag | | !signHidden | | (n !=
firstSigScanPos ) ) )
                coeff_sign_flag[ n ]
        }
        numSigCoeff = 0
        sumAbsLevel = 0
        for( n = 15; n >= 0; n−− ) {
            xC = ( xS << 2 ) + ScanOrder[ 2 ][ scanIdx ][ n ][ 0 ]
            yC = ( yS << 2 ) + ScanOrder[ 2 ][ scanIdx ][ n ][ 1 ]
            if( sig_coeff_flag[ xC ][ yC ] ) {
                baseLevel = 1 + coeff_abs_level_greater1_flag[ n ] +
                        coeff_abs_level_greater2_flag[ n ]
                if( baseLevel == ( ( numSigCoeff < 8 ) ?
                        ( (n == lastGreater1ScanPos) ? 3 : 2 ) : 1 ) )
                    coeff_abs_level_remaining[ n ]
                TransCoeffLevel[ x0 ][ y0 ][ cIdx ][ xC ][ yC ] =
                    ( coeff_abs_level_remaining[ n ] + baseLevel ) * ( 1 − 2 *
coeff_sign_flag[ n ] )
                if( sign_data_hiding_enabled_flag && signHidden ) {
                    sumAbsLevel += ( coeff_abs_level_remaining[ n ] + baseLevel )
                    if( ( n == firstSigScanPos ) && ( ( sumAbsLevel % 2 ) == 1 )
)
                        TransCoeffLevel[ x0 ][ y0 ][ cIdx ][ xC ][ yC ] =
                            −TransCoeffLevel[ x0 ][ y0 ][ cIdx ][ xC ][ yC ]
                }
                numSigCoeff++
            }
        }
    }
}
``` | ae(v)<br><br><br><br><br><br>ae(v)<br><br><br><br><br><br><br><br><br><br><br><br><br>ae(v)<br><br><br><br><br><br><br><br><br><br><br><br><br>ae(v)<br><br><br><br><br><br><br>ae(v)<br><br><br><br>ae(v) |

As specified in section 7.4.3.3 of JCTVC-M1005_v2, sign_data_hiding_enabled_flag equal to 0 specifies that sign bit hiding (i.e., sign data hiding) is disabled. sign_data_hiding_enabled_flag equal to 1 specifies that sign bit hiding is enabled. This disclosure may use the terms "sign bit hiding" and "sign data hiding" interchangeably. Furthermore, a video coder may organize syntax elements representing transform coefficients according to a sub-block scanning order. In the sub-block scanning order, the video coder divides a transform coefficient block into sub-blocks, each being 4 transform coefficients wide and 4 transform coefficients high. The video coder may determine a sign hidden variable (i.e., signHidden) for each of the sub-blocks. When the difference in positions between a first significant (i.e., non-zero) transform coefficient in a 4×4 sub-block of a transform coefficient block and a last significant transform coefficient in the 4×4 sub-block of the transform coefficient block is greater than 3 (i.e., lastSignScanPos−firstSigScanPos>3) and the transform and quantization steps are not bypassed (i.e., skipped) for the current CU (i.e., !cu_transquant_bypass_flag), the video coder may determine that the sign hidden variable (i.e., signHidden) for the 4×4 sub-block is equal to 1. If the transform is skipped or bypassed, the transform coefficients are actually prediction residuals.

For each respective transform coefficient in the 4×4 sub-block, a sign syntax element (e.g., coeff_sign_flag[n]) for the respective transform coefficient is signaled in the bitstream if the respective transform coefficient is significant (i.e., non-zero) and if the sign_data_hiding_enabled_flag specifies that sign bit hiding is not enabled, the sign hidden variable for the 4×4 sub-block is not equal to 1, or the respective transform coefficient is not the first significant transform coefficient in the 4×4 sub-block. For instance, the sign of a significant transform coefficient is not signaled if the sign_data_hiding_enabled_flag indicates that sign bit hiding is enabled, the difference in position between the first significant coefficient of the 4×4 sub-block and the last significant coefficient of the 4×4 sub-block is greater than 3, the 4×4 sub-block was not generated using transform and quantization bypass coding (e.g. lossless coding), and the respective transform coefficient is the first significant transform coefficient of the 4×4 sub-block.

As specified in section 7.4.3.3 of JCTVC-M1005_v2, coeff_sign_flag[n] specifies the sign of a transform coefficient level for the scanning position n as follows. If coeff_sign_flag[n] is equal to 0, the corresponding transform coefficient level has a positive value. Otherwise (coeff_sign_flag[n] is equal to 1), the corresponding transform coefficient level has a negative value. When coeff_sign_flag[n] is not present, coeff_sign_flag[n] is inferred to be equal to 0.

When sign data hiding is enabled, video encoder 20 may embed data indicating the sign of a transform coefficient/residual sample in the value of the transform coefficient/residual sample value itself. For instance, video encoder 20 may modify one or more bits representing a transform coefficient/residual sample such that the parity information can be used by video decoder 30 to determine whether the first significant coefficient in a 4×4 subblock is positive or negative. For example, if the sum of absolute values of transform coefficients in a 4×4 subblock is even, the sign is inferred to be positive, otherwise the sign is inferred to be negative. Typically, video encoder 20 may change a least significant bit of the representation of one of the quantized transform coefficient/residual samples in a 4×4 subblock. Consequently, a user may not be able to perceive any loss of visual quality due to video encoder 20 modifying a bit of representation of the transform coefficient/residual sample to indicate the sign of the transform coefficient/residual sample.

When using the described techniques of this disclosure for lossy coding, it may be difficult for a video encoder to implement sign data hiding for blocks to which the described techniques are applied. These are intra blocks for which transform is skipped and the modes are planar and/or DC and/or the modes for which residual DPCM is applied. Errors may be introduced by video encoder 20 changing values of bits in the representation of the transform coefficient/residual sample to indicate the sign of the transform coefficient/residual sample. Furthermore, using these techniques, the error in one modified residual sample can propagate to subsequent residual samples. Such errors may be compounded when residual DPCM is applied because residual DPCM may rely on video decoder 30 adding together multiple transform coefficients/residual samples to determine transform coefficients/residual samples. Thus, sign data hiding may actually result in degradation of performance. In such cases, sign data hiding may be normatively disabled. This means that even though it is indicated in a bitstream (or as a default choice) that sign data hiding is being used, sign data hiding is disabled for certain blocks.

In one example, a video coder may disable sign data hiding for a block if the video coder does not apply a transform to the block, if the block is intra predicted using a planar intra prediction mode or a DC intra prediction mode, or if the block is intra predicted using an intra prediction mode for with residual DPCM is applied. For instance, in some examples, sign data hiding may be disabled when transform is skipped and the block is intra-coded and the intra mode is planar intra prediction. Moreover, in some examples, sign data hiding may be disabled when transform is skipped and the block is intra-coded and the intra mode is DC intra prediction. Furthermore, in some examples, sign data hiding may be disabled when transform is skipped and the block is intra-coded and the intra mode is a mode for which residual DPCM is applied.

For example, video encoder 20 may determine that sign data hiding is disabled for a current block if the current block is generated using lossy coding without application of a transform (e.g., a discrete cosine transform, directional transform, or other transform) to residual data and the current block is intra predicted using an intra prediction mode in which residual DPCM is used. When sign data hiding is disabled for the current block, video encoder 20 may include, in the bitstream, for each respective significant value in the current block, a respective syntax element indicating whether the respective significant value is positive or negative. Similarly, in this example, video decoder 30 may determine that sign data hiding is disabled for the current block if the current block is generated using lossy coding without application of a transform (e.g., a discrete cosine transform, directional transform, or other transform) to residual data and the current block is intra predicted using an intra prediction mode in which residual DPCM is used. In such examples, when sign data hiding is disabled for the current block, video decoder 30 obtains, from the bitstream, for each respective significant value in the block, a respective syntax element indicating whether the respective significant value is positive or negative.

In other examples, sign data hiding may be disabled for a block when transform is skipped, the block is intra-coded, or for all the transform-skip blocks. Thus, in this example, sign data hiding may be disabled regardless of which intra prediction mode is used. For instance, a video coder may determine that sign data hiding is disabled for a current block if the current block is coded without application of the transform to the residual data of the current block, and the current block is intra coded using a DC intra prediction mode or a planar intra prediction mode.

It should be noted that this disclosure has discussed techniques for residual DPCM and modifications to DC and planar. Any one or a combination of these techniques may be used.

Figure 6:
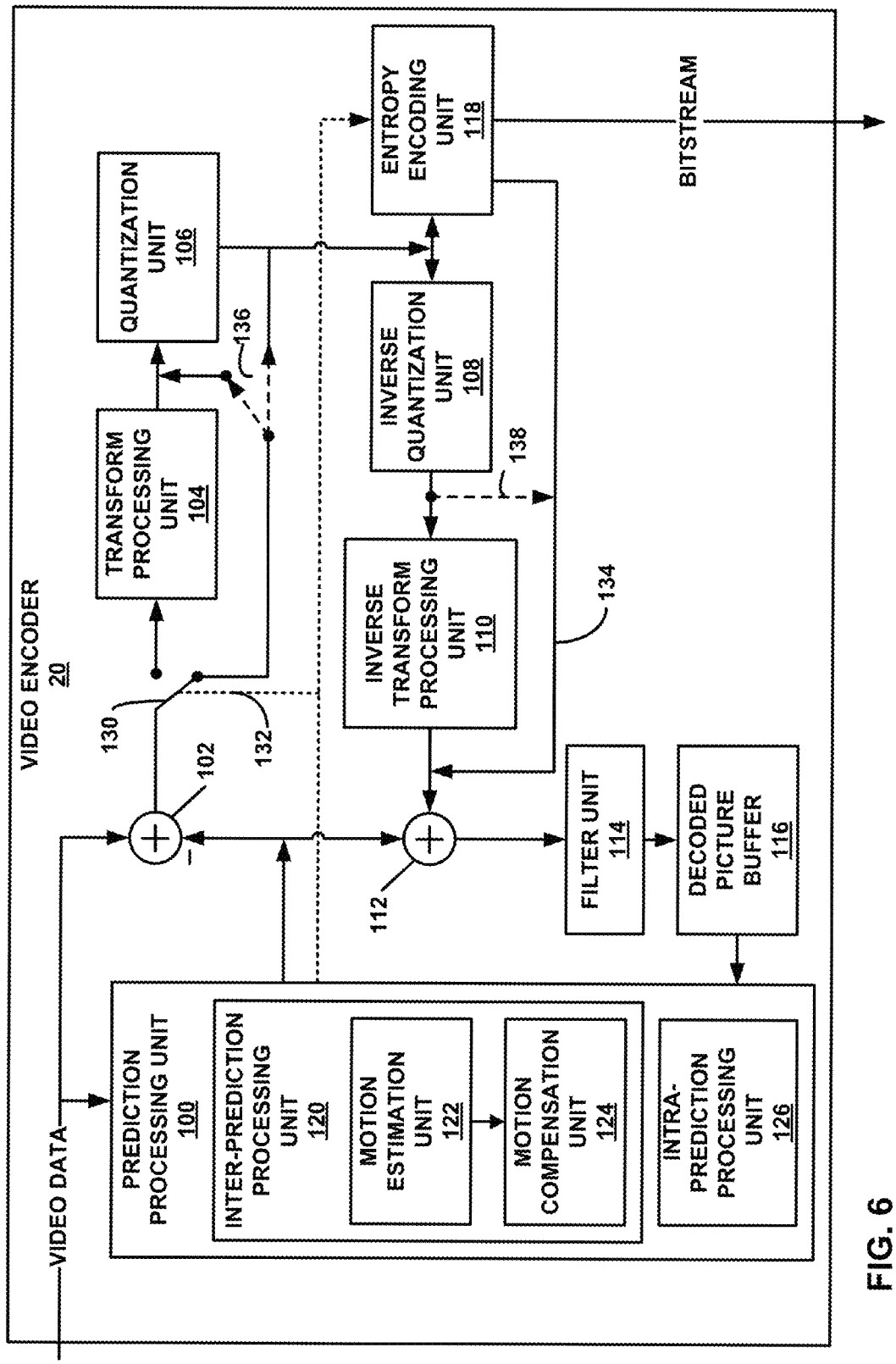
FIG. 6 is a block diagram illustrating an example video encoder that may implement the techniques of this disclosure.

FIG. 6 is a block diagram illustrating an example video encoder 20 that may implement the techniques of this disclosure. FIG. 6 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 6, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit 122 and a motion compensation unit 124. In other examples, video encoder 20 may include more, fewer, or different functional components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include a predictive sample blocks (i.e., predictive blocks) of the PU and motion information for the PU. Inter-prediction unit 121 may perform different operations for a PU of a CU depending on whether the PU is in an I slice, a P slice, or a B slice. In an I slice, all PUs are intra predicted. Hence, if the PU is in an I slice, inter-prediction unit 121 does not perform inter prediction on the PU. Thus, for blocks encoded in I-mode, the predictive block is formed using spatial prediction from previously-encoded neighboring blocks within the same frame.

If a PU is in a P slice, motion estimation unit 122 may search the reference pictures in a list of reference pictures (e.g., "RefPicList0") for a reference region for the PU. The reference region for the PU may be a region, within a reference picture, that contains samples (e.g., sample blocks) that most closely corresponds to the sample blocks of the PU. Motion estimation unit 122 may generate a reference index that indicates a position in RefPicList0 of the reference picture containing the reference region for the PU. In addition, motion estimation unit 122 may generate a motion vector that indicates a spatial displacement between a coding block of the PU and a reference location associated with the reference region. For instance, the motion vector may be a two-dimensional vector that provides an offset from the coordinates in the current decoded picture to coordinates in a reference picture. Motion estimation unit 122 may output the reference index and the motion vector as the motion information of the PU. Motion compensation unit 124 may generate the predictive sample blocks of the PU based on actual or interpolated samples at the reference location indicated by the motion vector of the PU.

If a PU is in a B slice, motion estimation unit 122 may perform uni-prediction or bi-prediction for the PU. To perform uni-prediction for the PU, motion estimation unit 122 may search the reference pictures of RefPicList0 or a second reference picture list ("RefPicList1") for a reference region for the PU. Motion estimation unit 122 may output, as the motion information of the PU, a reference index that indicates a position in RefPicList0 or RefPicList1 of the reference picture that contains the reference region, a motion vector that indicates a spatial displacement between a sample block of the PU and a reference location associated with the reference region, and one or more prediction direction indicators that indicate whether the reference picture is in RefPicList0 or RefPicList1. Motion compensation unit 124 may generate the predictive sample blocks of the PU based at least in part on actual or interpolated samples at the reference region indicated by the motion vector of the PU.

To perform bi-directional inter prediction for a PU, motion estimation unit 122 may search the reference pictures in RefPicList0 for a reference region for the PU and may also search the reference pictures in RefPicList1 for another reference region for the PU. Motion estimation unit 122 may generate reference picture indexes (i.e., reference indexes) that indicate positions in RefPicList0 and RefPicList1 of the reference pictures that contain the reference regions. In addition, motion estimation unit 122 may generate motion vectors that indicate spatial displacements between the reference location associated with the reference regions and a sample block of the PU. The motion information of the PU may include the reference indexes and the motion vectors of the PU. Motion compensation unit 124 may generate the predictive sample blocks of the PU based at least in part on actual or interpolated samples at the reference region indicated by the motion vector of the PU.

In accordance with one or more techniques of this disclosure, one or more units within prediction processing unit 100 (such as intra-prediction processing unit 126) may perform one or more of the techniques described herein as part of a video encoding process.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. To use some intra prediction modes to generate a set of predictive data for the PU, intra-prediction processing unit 126 may extend samples from sample blocks of neighboring PUs across the sample blocks of the PU in a direction associated with the intra prediction mode. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU. Moreover, as described herein, intra-prediction processing unit 126 may implement lossless coding modes and the modifications described herein to improve such coding modes. In accordance with some techniques of this disclosure, intra-prediction processing unit 126 may use one or more original sample values within a block to perform intra DC prediction of other sample values within the block.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive sample blocks of the selected predictive data may be referred to herein as the selected predictive sample blocks.

Residual generation unit 102 may generate, based on coding blocks (e.g., the luma, Cb and Cr coding blocks) of a CU and the selected predictive blocks (e.g., luma, Cb and Cr blocks) of the PUs of the CU, residual blocks (e.g., luma, Cb and Cr residual blocks) for the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

In accordance with some examples of this disclosure, the following may be performed for $0 \le i \le (M-1)$ and $0 \le j \le (N-1)$, where M is a height of a block and N is the width of a block. In such examples, the block is a residual block that includes residual values indicating differences between sample values in a predictive block generated using intra prediction and original samples values. Furthermore, in such examples, the block is a transform skip block. Residual generation unit 102 may determine a modified residual value $\tilde{r}_{i,j}$ for a residual value $r_{i,j}$. If the block is coded using a vertical intra prediction mode, $\tilde{r}_{i,j}$ is defined as:

$$\tilde{r}_{i,j} = \begin{cases} r_{i,j}, & i = 0, 0 \le j \le (N-1) \\ r_{i,j} - Q(r_{(i-1),j}), & 1 \le i \le (M-1), 0 \le j \le (N-1), \end{cases}$$

In the equation above, $Q(r_{(i-1),j})$ denotes a reconstructed residual value for a residual value $r_{i-1,j}$ one row above the residual value $r_{i,j}$. If the block is coded using a horizontal intra prediction mode, $\tilde{r}_{i,j}$ is defined as:

$$\tilde{r}_{i,j} = \begin{cases} r_{i,j}, & 0 \le i \le (M-1), j = 0 \\ r_{i,j} - Q(r_{i,(j-1)}) & 0 \le i \le (M-1), 1 \le j \le (N-1), \end{cases}$$

In the equation above, $Q(r_{i,(j-1)})$ denotes a reconstructed residual value for a residual value $r_{i,j-1}$ one column left of the residual value $r_{i,j}$. Quantization unit 106 may quantize the modified residual value $\tilde{r}_{i,j}$ to produce a quantized modified residual value $Q(\tilde{r}_{i,j})$.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

In accordance with some examples of this disclosure, entropy encoding unit 118 may determine that sign data hiding is disabled for a current block if the current block is generated without application of a transform to residual data and the current block is intra predicted using an intra prediction mode in which residual DPCM is used. When sign data hiding is disabled for the current block, entropy encoding unit 118 may include, in the bitstream, a syntax element indicating whether a value in the current block is positive or negative.

Element 130 in FIG. 6 may represent a switch (or a conceptual switch) for selecting between lossless coding and lossy coding. Control signal 132 may represent a signal from prediction processing unit 100 that determines the lossless or lossy coding and element 134 may represent a decoding loop that bypasses the inverse transform and inverse quantization processes. In some examples, lossless coding eliminates transforms and quantization. In other examples, lossless coding performs transforms and eliminates only the quantization process. In still other examples, lossless coding may be implemented with the use of transforms and quantitation, but the quantization parameter may be selected so as to avoid any quantization data loss. These and other examples are within the scope of this disclosure.

Elements 136 and 138 represent switches (or conceptual switches) that may be used to implement a transform skipping mode. In transform skipping modes, the residual data is not transformed by transform processing unit 104 but is quantized by quantization unit 106. Thus, the dash lines of element 136 represent two possible data paths. In one data, the residual data is quantized by quantization unit 106 and in the other data path the residual data is not quantized by quantization unit 106. Similarly, in the decoding loop of video encoder 20, the residual data is inverse quantized by inverse quantization unit 108 but is not transformed by inverse transform processing unit 110. Thus, the dash lines of element 138 represent an alternate data path where the residual data is inverse quantized by inverse quantization unit 108 but is not transformed by inverse transform processing unit 110.

Figure 7:
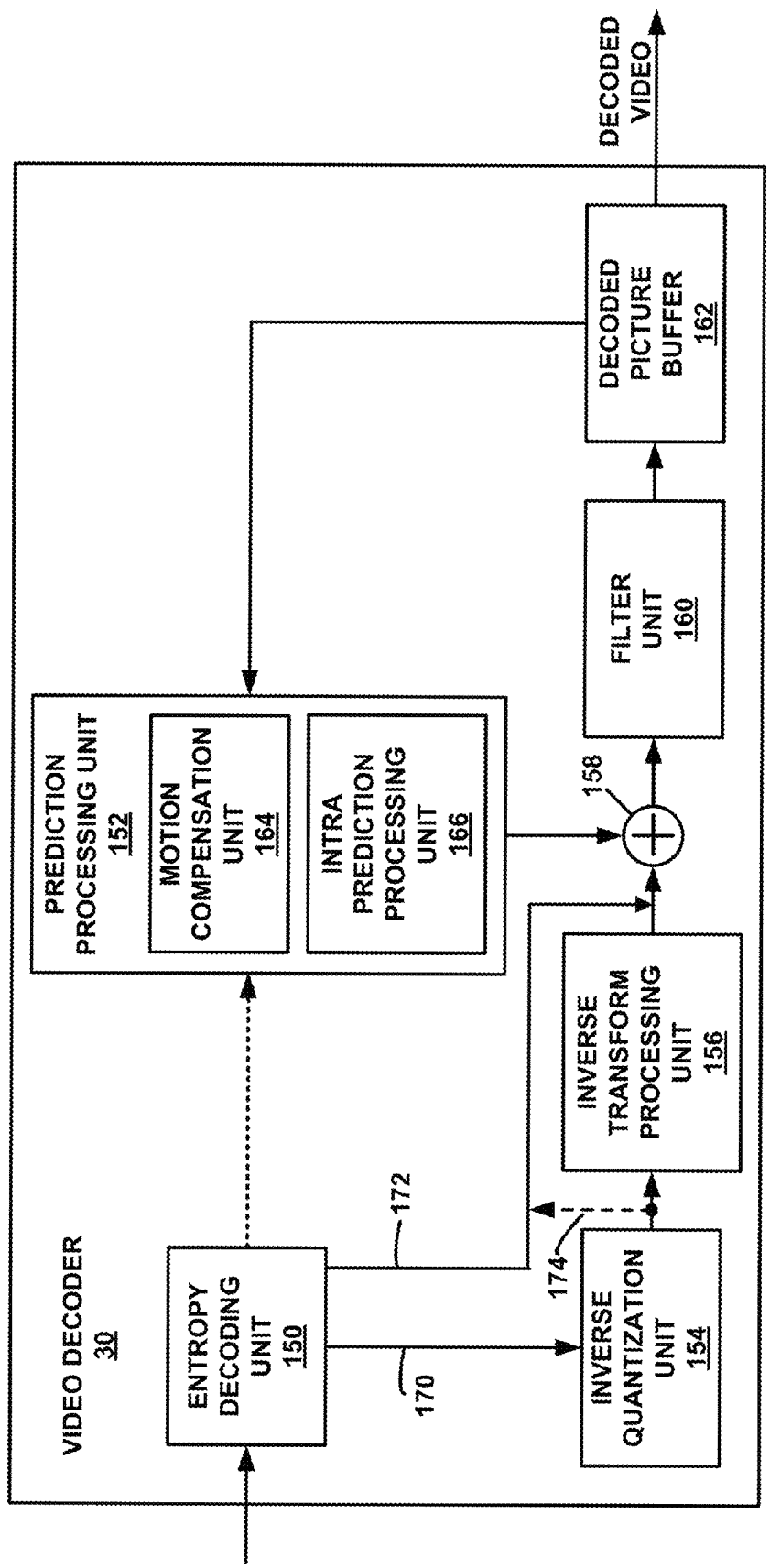
FIG. 7 is a block diagram illustrating an example video decoder that may implement the techniques of this disclosure.

FIG. 7 is a block diagram illustrating an example video decoder 30 that is configured to implement the techniques of this disclosure. FIG. 7 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 7, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Video decoder 30 may receive a bitstream. Entropy decoding unit 150 may parse the bitstream to decode syntax elements from the bitstream. Entropy decoding unit 150 may entropy decode entropy-encoded syntax elements in the bitstream. Prediction processing unit 152, inverse quantization unit 154, inverse transform processing unit 156, reconstruction unit 158, and filter unit 160 may generate decoded video data based on the syntax elements extracted from the bitstream.

The bitstream may comprise a series of NAL units. The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In accordance with some examples of this disclosure, entropy decoding unit 150 determines that sign data hiding is disabled for a current block if the current block is generated without application of a transform to residual data and the current block is intra predicted using an intra prediction mode in which residual DPCM is used. In such examples, when sign data hiding is disabled for the current block, entropy decoding unit 150 obtains, from the bitstream, for each respective significant value in the block, a respective syntax element indicating whether the respective significant value is positive or negative.

In addition to decoding (i.e., obtaining) syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent the original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive blocks (e.g., predictive luma, Cb and Cr blocks) for the PU based on the prediction blocks of spatially-neighboring PUs. Intra-prediction processing unit 166 may determine the intra prediction mode for the PU based on one or more syntax elements decoded from the bitstream. In accordance with some techniques of this disclosure, intra-prediction processing unit 166 may use one or more original sample values within a block to perform intra DC prediction of other sample values within the block. That is, intra-prediction processing unit 166 may generate a predictive block. As part of generating the predictive block, intra-prediction processing unit 166 may use at least one of a losslessly reconstructed sample to left of a current sample in a current row of a predictive block and a losslessly reconstructed sample for a row of the predictive block above the current row for DC prediction of the current sample Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive blocks (e.g., luma, Cb and Cr blocks) for the PU. In accordance with one or more techniques of this disclosure, one or more units within prediction processing unit 152 (such as intra prediction processing unit 166) may perform techniques described herein as part of a video decoding process.

Reconstruction unit 158 may use the transform block (e.g., luma, Cb and Cr transform blocks) associated with TUs of a CU and the predictive blocks (e.g., luma, Cb and Cr predictive blocks) of the PUs of the CU, i.e., either intra-prediction data or inter-prediction data, as applicable, to reconstruct the coding blocks (e.g., luma, Cb and Cr coding blocks) of the CU. For example, reconstruction unit 158 may add samples of the luma, Cb and Cr transform blocks to corresponding samples of the predictive luma, Cb and Cr blocks to reconstruct the luma, Cb and Cr coding blocks of the CU.

In accordance with some examples of this disclosure, entropy decoding unit 150 may generate a block of residual values. This block may be a transform skip block. Furthermore, the block may be a residual block that includes residual values indicating differences between original sample values and sample values in a predictive block generated using intra prediction. Furthermore, for 0≤i≤(M−1) and 0≤j≤(N−1), where M is a height of the block and N is the width of the block, inverse quantization unit 154 may calculate a reconstructed residual value $Q(r_{i,j})$ for a residual value $r_{i,j}$ in the block. If the block is coded using a vertical intra prediction mode (or, in some examples, a near-vertical intra prediction mode), $Q(r_{i,j})$ is defined as:

$$Q(r_{i,j}) = \begin{cases} Q(\tilde{r}_{i,j}), & i=0, 0 \le j \le (N-1), \\ Q(\tilde{r}_{i,j}) + Q(r_{i-1,j}) & 1 \le i \le (M-1), 0 \le j \le (N-1) \end{cases}.$$

In the equation above, $Q(\tilde{r}_{i,j})$ denotes a quantized version of a modified residual value $\tilde{r}_{i,j}$, the modified residual value is a modified version of the residual value $r_{i,j}$, and $Q(r_{i-1,j})$ is a reconstructed residual value for (i.e., corresponding to) a residual value one row above the residual value $r_{i,j}$. Entropy decoding unit 150 may have previously determined $Q(r_{i-1,j})$ in the same manner that entropy decoding unit 150 determines $Q(r_{i,j})$. If the block is coded using a horizontal intra prediction mode, $Q(r_{i,j})$ is defined as:

$$Q(r_{i,j}) = \begin{cases} Q(\tilde{r}_{i,j}), & 0 \le i \le (M-1), j=0, \\ Q(\tilde{r}_{i,j}) + Q(r_{i,j-1}) & 0 \le i \le (M-1), 1 \le j \le (N-1) \end{cases}.$$

In the equation above, $Q(r_{i,j-1})$ is a reconstructed residual value for a residual value one column left of the residual value $r_{i,j}$. Entropy decoding unit 150 may have previously determined $Q(r_{i,j-1})$ in the same manner that entropy decoding unit 150 determines $Q(r_{i,j})$. Reconstruction unit 158 may add the reconstructed residual value $Q(r_{i,j})$ to a prediction value to reconstruct a sample value.

Filter unit 160 may perform a deblocking operation to reduce blocking artifacts associated with the coding blocks (e.g., the luma, Cb and Cr coding blocks) of the CU. Video decoder 30 may store the coding blocks (e.g., luma, Cb and Cr coding blocks) of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks (e.g., luma, Cb and Cr blocks) in decoded picture buffer 162, intra prediction or inter prediction operations on PUs of other CUs. In this way, video decoder 30 may extract, from the bitstream, transform coefficient levels of the significant luma coefficient block, inverse quantize the transform coefficient levels, apply a transform to the transform coefficient levels to generate a transform block, generate, based at least in part on the transform block, a coding block, and output the coding block for display.

Element 170 may represent a normal coding path for lossy compression, and element 172 may represent a bypass coding path that bypasses the inverse transform and inverse quantization processes. These different paths are merely exemplary and lossless coding may be performed without any bypass. In some examples, lossless coding eliminates transforms and quantization. In other examples, lossless coding performs transforms and eliminates only the quantization process. In still other examples, lossless coding may be implemented with the use of transforms and quantitation, but the quantization parameter may be selected so as to avoid any quantization data loss. Element 174 represents an example of a path that may be used for a transform skipping mode. In a transform skipping mode, the residual data may be inverse quantized by inverse quantization unit 154, but the inverse transforming of inverse transform processing unit 156 may be skipped. These and other examples are within the scope of this disclosure.

Figures 8A, 8B:
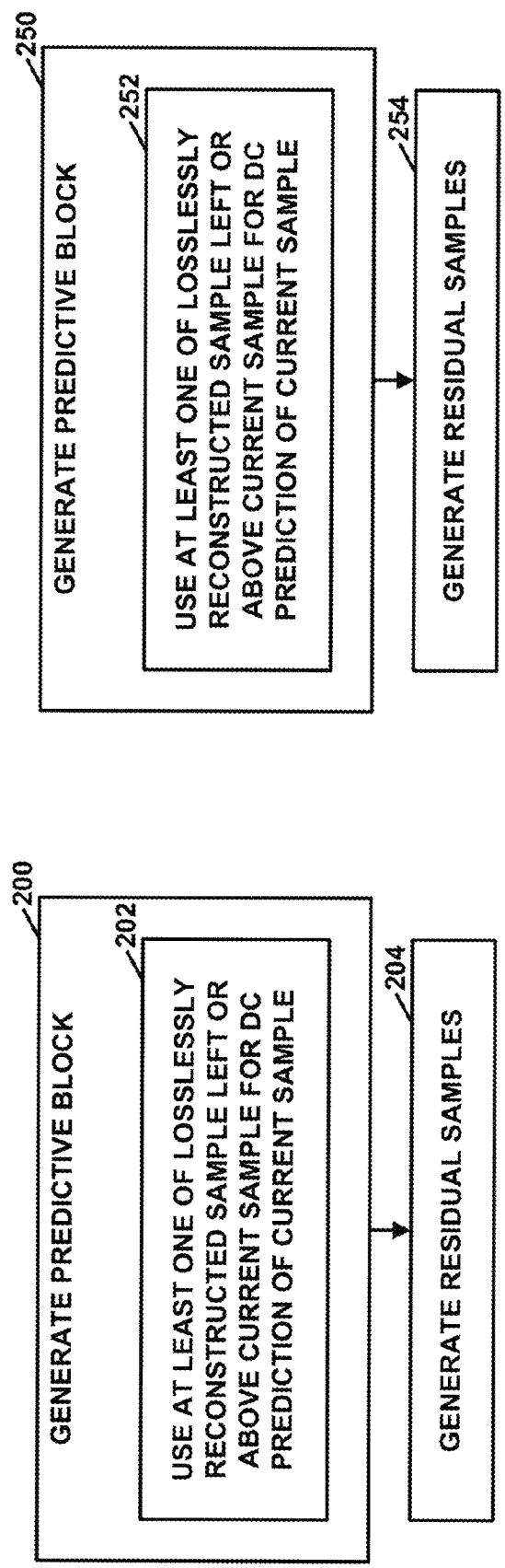
FIG. 8A is a flowchart illustrating an example operation of a video encoder, in accordance with one or more techniques of this disclosure.
FIG. 8B is a flowchart illustrating an example operation of a video encoder, in accordance with one or more techniques of this disclosure.

FIG. 8A is a flowchart illustrating an example operation of video encoder 20, in accordance with one or more techniques of this disclosure. In other examples of this disclosure, operations similar to the operation of FIG. 8A may include more, fewer, or different actions. Furthermore, in some examples, one or more actions of the operation of FIG. 8A may be omitted or rearranged. For instance, in FIG. 8A and FIG. 8B, dashed lines indicate actions not performed in some examples.

In the example of FIG. 8A, video encoder 20 may generate a predictive block (200). As part of generating the predictive block, video encoder 20 may use at least one of: a losslessly reconstructed sample to left of a current sample in a current row of a predictive block and a losslessly reconstructed sample for a row of the predictive block above the current row for DC prediction of the current sample (202). In some examples, video decoder 30 processes samples in the predictive block in a horizontal raster scan order, a vertical raster scan order, a diagonal scan order, or a zig-zag scan order. In such examples, processing the samples in the predictive block may comprise determining DC predictions for the samples as well as reconstructing the samples losslessly. Furthermore, in the example of FIG. 8A, video encoder 20 may generate residual samples that have values equal to a difference between a sample in a coding block and a corresponding sample in the predictive block FIG. 8B is a flowchart illustrating an example operation of video decoder 30, in accordance with one or more techniques of this disclosure. In other examples of this disclosure, operations similar to the operation of FIG. 8B may include more, fewer, or different actions. Furthermore, in some examples, one or more actions of the operation of FIG. 8B may be omitted or rearranged.

In the example of FIG. 8B, video decoder 30 may generate a predictive block (250). As part of generating the predictive block, video decoder 30 may use at least one of a losslessly reconstructed sample to left of a current sample in a current row of a predictive block and a losslessly reconstructed sample for a row of the predictive block above the current row for DC prediction of the current sample (252). In some examples, video decoder 30 processes samples in the predictive block in a horizontal raster scan order, a vertical raster scan order, a diagonal scan order, or a zig-zag scan order. In such examples, processing the samples in the predictive block may comprise determining DC predictions for the samples. Furthermore, in the example of FIG. 8B, video decoder 30 may reconstruct a coding block by adding samples of the predictive block to corresponding residual samples (254).

Figure 9A:
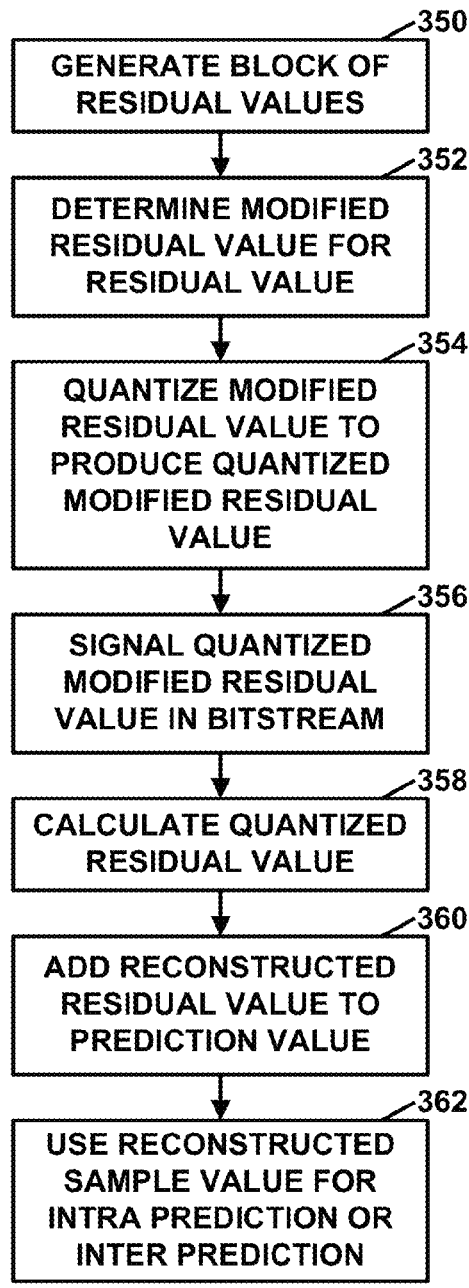
FIG. 9A is a flowchart illustrating an example operation of a video decoder, in accordance with one or more techniques of this disclosure.

FIG. 9A is a flowchart illustrating an example operation of video encoder 20, in accordance with one or more techniques of this disclosure. In other examples of this disclosure, operations similar to the operation of FIG. 9A may include more, fewer, or different actions. Furthermore, in some examples, one or more actions of the operation of FIG. 9A may be omitted or rearranged. The example of FIG. 9A is explained with reference to components shown in FIG. 6. However, the operation of FIG. 9A may be performed by components and types of video encoders other than that shown in FIG. 6.

As indicated in the example of FIG. 9A, residual generation unit 102 of video encoder 20 may generate a block of residual values (350). In this example, the block of residual values is a transform skip block. The block may be a residual block that includes residual values indicating differences between original sample values and sample values in a predictive block generated using intra prediction. The video coder may perform the remaining actions of FIG. 9A for each location (i,j) of the block, where $0 \le i \le (M-1)$ and $0 \le j \le (N-1)$, M is a height of a block, and N is the width of the block.

Furthermore, residual generation unit 102 of video encoder 20 may determine a modified residual value $\tilde{r}_{i,j}$ for a residual value $r_{i,j}$ in the block (352). If the block is coded using a vertical intra prediction mode, or in some examples, an intra prediction mode between 22 and 30 as defined in HEVC Working Draft 10, $\tilde{r}_{i,j}$ is defined as:

$$\tilde{r}_{i,j} = \begin{cases} r_{i,j}, & i = 0, 0 \le j \le (N-1) \\ r_{i,j} - Q(r_{(i-1),j}), & 1 \le i \le (M-1), 0 \le j \le (N-1) \end{cases},$$

$Q(r_{(i-1),j})$ denotes a reconstructed residual value for (i.e., corresponding to) a residual value $r_{i-1,j}$. If the block is coded using a horizontal intra prediction mode, or, in some examples, an intra prediction mode between 6 and 14, $\tilde{r}_{i,j}$ is defined as:

$$\tilde{r}_{i,j} = \begin{cases} r_{i,j}, & 0 \le i \le (M-1), j = 0 \\ r_{i,j} - Q(r_{i,(j-1)}) & 0 \le i \le (M-1), 1 \le j \le (N-1) \end{cases},$$

$Q(r_{i,(j-1)})$ denotes a reconstructed residual value for a residual value $r_{i,j-1}$.

In addition, quantization unit 106 of video encoder 20 may quantize the modified residual value $\tilde{r}_{i,j}$ to produce a quantized modified residual value $Q(\tilde{r}_{i,j})$ (354). Video encoder 20 may signal the quantized modified residual value $Q(\tilde{r}_{i,j})$ in a bitstream (356). For example, video encoder 20 may generate one or more syntax elements indicating the quantized modified residual value $Q(\tilde{r}_{i,j})$. In this example, entropy encoding unit 118 of video encoder 20 may entropy encode the one or more syntax elements and include the resulting data in the bitstream.

Furthermore, in the example of FIG. 9A, video encoder 20 may calculate a reconstructed residual value $Q(r_{i,j})$ (358). In some examples, video encoder 20 may calculate the reconstructed residual value $Q(r_{i,j})$ as part of a feedback loop to determine reconstructed sample values for use in further intra prediction or inter prediction. If the block is coded using the vertical intra prediction mode (or in some examples, a near vertical intra prediction mode), the reconstructed residual value $Q(r_{i,j})$ may be defined as:

$$Q(r_{i,j}) = \begin{cases} Q(\tilde{r}_{i,j}), & i = 0, 0 \le j \le (N-1), \\ Q(\tilde{r}_{i,j}) + Q(r_{i-1,j}) & 1 \le i \le (M-1), 0 \le j \le (N-1) \end{cases},$$

If the block is coded using the horizontal intra prediction mode (or in some examples, a near horizontal intra prediction mode), $Q(r_{i,j})$ may be defined as:

$$Q(r_{i,j}) = \begin{cases} Q(\tilde{r}_{i,j}), & 0 \le i \le (M-1), j = 0, \\ Q(\tilde{r}_{i,j}) + Q(r_{i,j-1}) & 0 \le i \le (M-1), 1 \le j \le (N-1) \end{cases}.$$

Because the block is a transform skip block, inverse transform processing unit 110 does not apply an inverse transform to the residual value $r_{i,j}$. Hence, reconstruction unit 112 of video encoder 20 may add the reconstructed residual value $Q(r_{i,j})$ to a prediction value to determine a reconstructed sample value (360). The prediction value may be a sample in a predictive block. Prediction processing unit 100 of video encoder 20 may use the reconstructed sample value for intra prediction or inter prediction of other blocks (362).

Figure 9B:
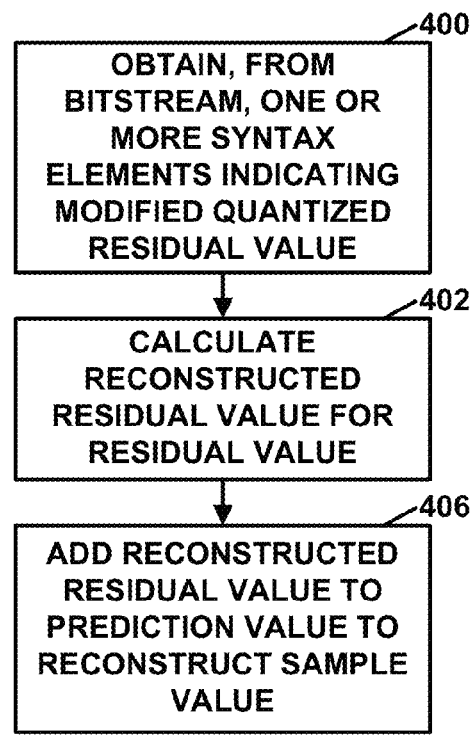
FIG. 9B is a flowchart illustrating an example operation of a video decoder, in accordance with one or more techniques of this disclosure.

FIG. 9B is a flowchart illustrating an example operation of video decoder 30, in accordance with one or more techniques of this disclosure. In other examples of this disclosure, operations similar to the operation of FIG. 9B may include more, fewer, or different actions. Furthermore, in some examples, one or more actions of the operation of FIG. 9B may be omitted or rearranged. The example of FIG. 9B is explained with reference to components shown in FIG. 7. However, the operation of FIG. 9B may be performed by components and types of video decoders other than that shown in FIG. 7.

Video decoder 30 may perform the operation of FIG. 9B for each location (i,j) of a transform skip block, where $0 \leq i \leq (M-1)$ and $0 \leq j \leq (N-1)$, M is a height of a block, and N is the width of the block. The block may be a residual block that includes residual values indicating differences between original sample values and sample values in a predictive block generated using intra prediction. As indicated in the example of FIG. 9A, entropy decoding unit 150 of video decoder 30 may obtain, from a bitstream, one or more syntax elements indicating a modified quantized residual value $Q(\tilde{r}_{i,j})$ (400). Entropy decoding unit 150 may entropy decode some or all of the one or more syntax elements.

Furthermore, in the example of FIG. 9B, inverse quantization unit 154 of video decoder 30 may calculate a reconstructed residual value $Q(r_{i,j})$ for a residual value $r_{i,j}$ (402). In some examples, the residual value $r_{i,j}$ is a bit-shifted residual value as described elsewhere in this disclosure. If the block is coded using a vertical intra prediction mode, $Q(r_{i,j})$ is defined as:

$$Q(r_{i,j}) = \begin{cases} Q(\tilde{r}_{i,j}), & i = 0, 0 \leq j \leq (N-1), \\ Q(\tilde{r}_{i,j}) + Q(r_{i-1,j}) & 1 \leq i \leq (M-1), 0 \leq j \leq (N-1) \end{cases}.$$

$Q(\tilde{r}_{i,j})$ denotes a quantized version of a modified residual value $\tilde{r}_{i,j}$, the modified residual value is a modified version of the residual value $r_{i,j}$, and $Q(r_{i-1,j})$ is a reconstructed residual value for a residual value one row above the residual value $r_{i,j}$. If the block is coded using a horizontal intra prediction mode, $Q(r_{i,j})$ is defined as:

$$Q(r_{i,j}) = \begin{cases} Q(\tilde{r}_{i,j}), & 0 \leq i \leq (M-1), j = 0, \\ Q(\tilde{r}_{i,j}) + Q(r_{i,j-1}) & 0 \leq i \leq (M-1), 1 \leq j \leq (N-1) \end{cases}.$$

$Q(r_{i,j-1})$ is a reconstructed residual value for a residual value one column left of the residual value $r_{i,j}$.

If the block is coded using the vertical intra prediction mode, the modified residual value $\tilde{r}_{i,j}$ is defined as:

$$\tilde{r}_{i,j} = \begin{cases} r_{i,j}, & i = 0, 0 \leq j \leq (N-1) \\ r_{i,j} - Q(r_{(i-1),j}), & 1 \leq i \leq (M-1), 0 \leq j \leq (N-1) \end{cases}.$$

If the block is coded using the horizontal intra prediction mode, the modified residual value $\tilde{r}_{i,j}$ is defined as:

$$\tilde{r}_{i,j} = \begin{cases} r_{i,j}, & 0 \leq i \leq (M-1), j = 0 \\ r_{i,j} - Q(r_{i,(j-1)}) & 0 \leq i \leq (M-1), 1 \leq j \leq (N-1) \end{cases}.$$

Because the block is a transform skip block, inverse transform processing unit 156 does not apply an inverse transform to the reconstructed residual value $Q(r_{i,j})$. Reconstruction unit 158 of video decoder 30 may add the reconstructed residual value $Q(r_{i,j})$ to a prediction value to reconstruct a sample value (406). The prediction value may be a sample in a predictive block.

Figure 10B:
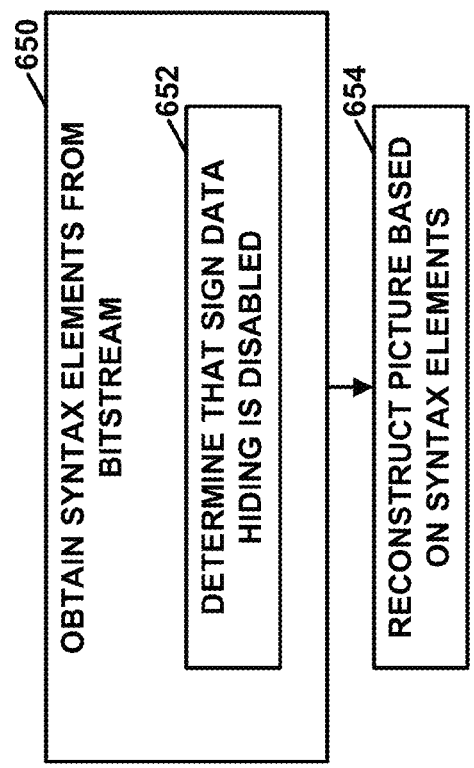
FIG. 10B is a flowchart illustrating an example video decoder operation for sign data hiding, in accordance with one or more techniques of this disclosure.
Figure 10A:
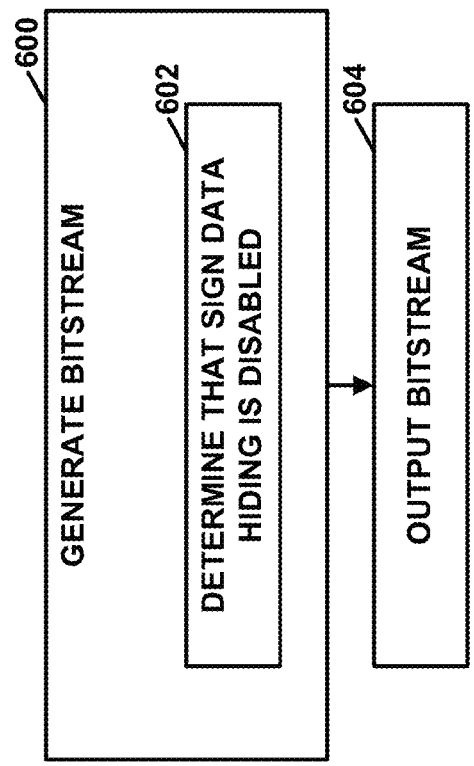
FIG. 10A is a flowchart illustrating an example video encoder operation for sign data hiding, in accordance with one or more techniques of this disclosure.

FIG. 10A is a flowchart illustrating an example video encoder operation for sign data hiding, in accordance with one or more techniques of this disclosure. In other examples of this disclosure, operations similar to the operation of FIG. 10A may include more, fewer, or different actions. Furthermore, in some examples, one or more actions of the operation of FIG. 10A may be omitted or rearranged.

In the example of FIG. 10A, video encoder 20 generates a bitstream that includes a sequence of bits that forms a coded representation of video data (600). As part of generating the bitstream, video encoder 20 may determine that sign data hiding is disabled for a current block if the current block is generated without application of a transform to residual data and the current block is intra predicted using an intra prediction mode in which a residual DPCM technique is used (602). In the context of FIG. 10A, the current block may be a 4×4 sub-block of a block of residual samples to which the residual DPCM technique has been applied. Subsequently, in the example of FIG. 10A, video encoder 20 may output the bitstream (604).

In some examples, when sign data hiding is disabled for the current block, video encoder 20 may signal, in the bitstream, for each respective significant residual value in the current block, a syntax element indicating whether the respective significant residual value is positive or negative. In such examples, when sign data hiding is not disabled for the current block, video encoder 20 may not signal, in the bitstream, a syntax element indicating whether a value of at least one significant residual value or transform coefficient in the current block is positive or negative.

FIG. 10B is a flowchart illustrating an example video decoder operation for sign data hiding, in accordance with one or more techniques of this disclosure. In other examples of this disclosure, operations similar to the operation of FIG. 10B may include more, fewer, or different actions. Furthermore, in some examples, one or more actions of the operation of FIG. 10B may be omitted or rearranged.

In the example of FIG. 10B, video decoder 30 obtains syntax elements from a bitstream that includes a sequence of bits that forms a coded representation of video data (650). As part of obtaining the syntax elements from the bitstream, video decoder 30 may determine that sign data hiding is disabled for a current block if the current block is generated without application of a transform to residual data and the current block is intra predicted using an intra prediction mode in which a residual DPCM technique is used (652). In the context of FIG. 10B, the current block may be a 4×4 sub-block of a block of residual samples to which the residual DPCM technique has been applied. Subsequently, in the example of FIG. 10B, video decoder 30 may reconstruct a picture of the video data based at least in part on the syntax elements obtained from the bitstream (654).

In some examples, when sign data hiding is disabled for the current block, video decoder 30 may obtain, from the bitstream, for each respective significant residual value in the current block, a syntax element indicating whether the respective significant residual value is positive or negative. In such examples, when sign data hiding is not disabled for the current block, video decoder 30 may not obtain from the bitstream a syntax element indicating whether a value of a significant residual value in the current block is positive or negative.

The following paragraphs provide a first series of examples in accordance with one or more techniques of this disclosure.

Example 1

A method of coding video data, the method comprising: using one or more original sample values within a block of video data to perform intra DC prediction of other sample values within the block.

Example 2

The method of example 1, wherein using one or more original sample values within the block to perform prediction of other sample values within the block comprises: using original sample values that occur earlier in a scan order to predict sample values that occur later in the scan order.

Example 3

The method of example 1, wherein using one or more original sample values within the block to perform prediction of other sample values within the block comprises: using original sample values of a previously scanned row to predict sample values of a subsequently scanned row.

Example 4

The method of example 1, wherein using one or more original sample values within the block to perform prediction of other sample values within the block comprises: using original sample values that correspond to causal neighbors of a sample to predict sample values for the sample.

Example 5

The method of any of examples 1-4, wherein a DC prediction value $DC_{i,j}$, for a current sample $P_{i,j}$, $0 \le i \le (M-1)$, $0 \le j \le (N-1)$ is calculated as $DC_{i,j}=(P_{i,j-1}+P_{i-1,j}+1)>>1$.

Example 6

The method of any of examples 1-4, wherein a DC prediction value $DC_{i,j}$, for a current sample $P_{i,j}$, $0 \le i \le (M-1)$, $0 \le j \le (N-1)$ is calculated as $DC_{i,j}=(P_{i,j-1}+P_{i-1,j})>>1$.

Example 7

The method of any of examples 1-6, further comprising: performing DC prediction in a pipelined manner.

Example 8

The method of example 7, wherein a one cycle delay for DC prediction exists between rows of the block.

Example 9

The method of any of examples 1-4, wherein a DC prediction value $DC_{i,j}$, $0 \le i \le (M-1)$, $0 \le j \le (N-1)$ is calculated as $DC_{i,j}=(P_{i,j-1}+P_{i-1,j}-P_{i-1,j-1})$.

Example 10

The method of example 9, wherein $DC_{i,j+1}$ can be calculated without waiting for $P_{i,j}$ as $DC_{i,j+1}=((P_{i,j-1}+P_{i-1,j}-P_{i-1,j-1})+r_{i,j}+P_{i-1,j+1}-P_{i-1,j})$, where $r_{i,j}$ is the prediction error residual for sample $P_{i,j}$.

Example 11

The method of any of examples 1-4, wherein available ones of a left sample, a top-left sample, and a top right sample are used for the DC prediction.

Example 12

The method of example 11, wherein a DC prediction value $DC_{i,j}$, $0 \le i \le (M-1)$, $0 \le j \le (N-1)$ is calculated as one of: $DC_{i,j}=(P_{i,j-1}+P_{i-1,j}+P_{i-1,j-1}+P_{i-1,j+1}+2)>>2$, or $DC_{i,j}=(P_{i,j-1}+P_{i-1,j}+P_{i-1,j-1}+P_{i-1,j+1})>>2$.

Example 13

The method of example 12, wherein for samples in a last column ($j=(N-1)$, $i>0$), a top-right sample is not available and top and top-right samples ($P_{i-1,j}$ and $P_{i-1,j+1}$) have the same value.

Example 14

The method of example 13, wherein the top-right sample is not used for the DC prediction.

Example 15

A method of coding video data, the method comprising: performing DC prediction on a block size that is smaller than a transform unit (TU) size.

Example 16

The method of example 15, wherein irrespective of the TU size, the DC prediction is performed on a 2×2 block size, wherein at least some TU sizes are larger than the 2×2 block size.

Example 17

The method of example 15 or 16, wherein for samples $P_{2i,2j}$, $P_{2i,2j+1}$, $P_{2i+1,2j}$, and $P_{2i+1,2j+1}$, DC prediction values are calculated as one of: $(P_{2i-1,2j}+P_{2i-1,2j+1}+P_{2i,2j-1}+P_{2i+1,2j-1}+2)>>2$ or $(P_{2i-1,2j}+P_{2i-1,2j+1}+P_{2i,2j-1}+P_{2i+1,2j-1})>>2$, wherein, $0 \le i \le ((M/2)-1)$, $0 \le j \le ((N/2)-1)$.

Example 18

The method of example 17, wherein M and N are both even.

Example 19

The method of example 18, wherein four samples can be processed in parallel.

Example 20

A method of coding video data, the method comprising: performing DC prediction on a 2×2 block size regardless of a size of a transform unit (TU).

Example 21

A method of coding video data, the method comprising: exploiting a correlation between residuals after performing a normal DC prediction.

Example 22

The method of example 21, wherein $r_{i,j}$, $0 \le i \le (M-1)$, $0 \le j \le (N-1)$ represents prediction residuals after performing DC prediction as specified according to an HEVC standard, the method further comprising: generating intermediate values $s_{i,j}$, $0 \le i \le (M-1)$, $0 \le j \le (N-1)$ according to: $s_{i,j} = r_{i,2j}$, $s_{i,(j+(N/2))} = r_{i,2j} - r_{i,2j+1}$, $0 \le i \le (M-1)$, $0 \le j \le ((N/2)-1)$.

Example 23

The method of example 22, the method further comprising: generating modified residuals, $t_{i,j}$, $0 \le i \le (M-1)$, $0 \le j \le (N-1)$ according to: $t_{i,j} = s_{2i,j}$, $t_{(i+(M/2)),j} = s_{2i,j} - s_{2i+1,j}$, $0 \le i \le ((M/2)-1)$, $0 \le j \le (N-1)$.

Example 24

The method of example 23, wherein the modified residuals, $t_{i,j}$, are entropy-coded.

Example 25

The method of example 21, wherein the method is performed during decoding and wherein:

$s_{2i,j} = t_{i,j}, s_{2i+1,j} = t_{i,j} - t_{(i+(M/2)),j}, 0 \le i \le ((M/2)-1), 0 \le j \le (N-1)$ and $r_{i,2j} = s_{i,j}, r_{i,2j+1} = s_{i,j} - s_{i,(j+(N/2))}, 0 \le i \le (M-1), 0 \le j \le ((N/2)-1)$.

Example 26

The method of example 25, wherein the M and N are both even.

Example 27

The method of example 21, wherein:

$s_{i,j} = r_{i,2j+1}, s_{i,(j+(N/2))} = P_{i,2j} - ((P_{i,2j-1} + P_{i,2j+1} + 1) >> 1)$, $0 \le i < M, 0 \le j < (N/2)$, $t_{i,j} = s_{2i+1,j}, t_{(i+(M/2)),j} = s_{2i,j} - ((s_{2i+1,j} + s_{2i+1,j} + 1) >> 1)$, $0 \le i < M/2, 0 \le j < N$.

Example 28

The method any combination of examples 1-27.

Example 29

The method of any of examples 1-24 and 27 or combinations thereof, wherein the method is performed by an encoder and wherein coding refers to encoding.

Example 30

The method of any of examples 1-21 and 25-27 or combinations thereof, wherein the method is performed by a decoder and wherein coding refers to decoding.

Example 31

A system configured to perform the method of any of examples 1-27 or combinations thereof.

Example 32

A non-transitory computer readable storage medium storing instructions that when executed cause one or more processors to perform the method of any of examples 1-27 or combinations thereof.

Example 33

A video encoding device configured to perform the method of any of examples 1-24 and 27 or combinations thereof.

Example 34

A video decoding device configured to perform the method of any of examples 1-21 and 25-27 or combinations thereof.

Example 35

A video encoding device comprising means for performing the steps of the method of any of examples 1-24 and 27 or combinations thereof.

Example 36

A video decoding device comprising means for performing the steps of the method of any of examples 1-21 and 25-27 or combinations thereof.

The following paragraphs provide a second series of examples in accordance with one or more techniques of this disclosure.

Example 1

A method of coding video data, the method comprising: using one or more original sample values within a block of video data to perform prediction of other sample values within the block.

Example 2

The method of example 1, wherein using one or more original sample values within the block to perform prediction of other sample values within the block comprises: using original sample values corresponding to a last row and a last column of the block to perform prediction of the other sample values.

Example 3

The method of example 1, wherein using one or more original sample values within the block to perform prediction of other sample values within the block comprises:

using original sample values corresponding to a first row and a first column of the block to perform prediction of the other sample values.

Example 4

The method of any of examples 1-3, wherein FIG. 4 illustrates the samples locations of the sample values used for to perform prediction of other sample values.

Example 5

The method of any of examples 1-4, wherein the method is performed for a lossless coding mode.

Example 6

The method of any of examples 1-5, wherein the method is performed for a planar coding mode.

Example 7

The method of any of examples 1-5, wherein the method is performed for an angular intra coding mode.

Example 8

The method of any of examples 1-7, the method further comprising: performing a rotate operation on set of residual values generated by the prediction; and performing entropy coding with respect to the rotated set of residual values.

Example 9

The method of example 8, wherein the set of residual values are transformed values.

Example 10

The method of any of examples 1-9, further comprising performing a prediction process to code the original sample values.

Example 11

The method of any combination of examples 1-10.

Example 12

The method of any of examples 1-10 or combinations thereof, wherein the method is performed by an encoder and wherein coding refers to encoding.

Example 13

The method of any of examples 1-10 or combinations thereof, wherein the method is performed by a decoder and wherein coding refers to decoding.

Example 14

A system configured to perform the method of any of examples 1-10 or combinations thereof.

Example 15

A non-transitory computer readable storage medium storing instructions that when executed cause one or more processors to perform the method of any of examples 1-10 or combinations thereof.

Example 16

A video encoding device configured to perform the method of any of examples 1-10 or combinations thereof.

Example 17

A video decoding device configured to perform the method of any of examples 1-10 or combinations thereof.

Example 18

A video encoding device comprising means for performing the steps of the method of any of examples 1-10 or combinations thereof.

Example 19

A video decoding device comprising means for performing the steps of the method of any of examples 1-10 or combinations thereof.

Example 20

Any device or method described in this disclosure.

The following paragraphs provide a third series of examples in accordance with one or more techniques of this disclosure.

Example 1

A method of coding video data, the method comprising: determining a modified array of residual samples; determining for a modified residual sample a dequantized version of the residual sample; and adding the dequantized version of the residual sample to a prediction value to determine a reconstructed value.

Example 2

The method of example 1, further comprising: coding the dequantized residual values using DPCM.

Example 3

The method of example 1, further comprising: coding a bit-shifted version of the dequantized residual values using DPCM.

Example 4

The method of any of examples 1-3, wherein the method is performed for a near vertical intra-prediction mode.

Example 5

The method of any of examples 1-3, wherein the method is performed for a near horizontal intra-prediction mode.

Example 6

The method of any of examples 1-5, further comprising: disabling sign data hiding.

Example 7

The method of any of examples 1-5, further comprising: disabling sign data hiding based on block type.

Example 8

The method of any of examples 1-5, further comprising: selectively disabling sign data hiding.

Example 9

The method of any of examples 1-8, further comprising any technique described in this disclosure.

Example 10

A method of coding video data, the method comprising: determining a modified array of residual samples; determining for a modified residual sample a quantized version of the residual sample; and signaling in an encoded bitstream the quantized version of the residual sample.

Example 11

The method of example 10, wherein the method is performed for a near vertical intra-prediction mode.

Example 12

The method of example 10, wherein the method is performed for a near horizontal intra-prediction mode.

Example 13

The method of any of examples 10-12, further comprising any technique described in this disclosure.

Example 14

The method of any of examples 10-13 or combinations thereof, wherein the method is performed by an encoder and wherein coding refers to encoding.

Example 15

The method of any of examples 1-9 or combinations thereof, wherein the method is performed by a decoder and wherein coding refers to decoding.

Example 16

A system configured to perform the method of any of examples 1-15 or combinations thereof.

Example 17

A non-transitory computer readable storage medium storing instructions that when executed cause one or more processors to perform the method of any of examples 1-13 or combinations thereof.

Example 18

A video encoding device configured to perform the method of any of examples 10-13 or combinations thereof.

Example 19

A video decoding device configured to perform the method of any of examples 1-9 or combinations thereof.

Example 20

A video encoding device comprising means for performing the steps of the method of any of examples 10-13 or combinations thereof.

Example 21

A video decoding device comprising means for performing the steps of the method of any of examples 1-9 or combinations thereof.

Example 22

Any device or method described in this disclosure including in this disclosure.

The following paragraphs provide a fourth series of examples in accordance with one or more techniques of this disclosure.

Example 1

A method for decoding video data, the method comprising: receiving a block of video data encoded using lossless coding and intra prediction; reconstructing residual samples from the losslessly coded block of video data according to a residual differential pulse code modulation (DPCM) process; and performing intra prediction according to an intra prediction mode using the residual samples to produce reconstructed video samples, wherein the intra prediction mode is not one of a vertical intra prediction mode and a horizontal intra prediction mode.

Example 2

The method of example 1, wherein the intra prediction mode is one of a nearly-vertical intra prediction mode and a nearly-horizontal intra prediction mode.

Example 3

The method of example 2, wherein the nearly-vertical intra prediction mode is one of intra prediction modes 22 to 30, and wherein the nearly-horizontal intra prediction mode is one of intra prediction modes 6 to 14 as the intra modes are described in HEVC Working Draft 9.

Example 4

The method of example 2, wherein the residual DPCM process is a vertical residual DPCM process for nearly-vertical intra prediction modes, and wherein the residual DPCM process is a horizontal residual DPCM process for nearly-horizontal intra prediction modes.

Example 5

The method of example 1, wherein the intra prediction mode is a diagonal down-right intra prediction mode, and wherein reconstructing residual samples according to the residual DPCM process comprises reconstructing residual samples according to the equation $$r_{i,j} = \begin{cases} \tilde{r}_{i,j}, & i = 0, 0 \le j \le (N-1) \\ \tilde{r}_{i,j}, & 1 \le i \le (M-1), j = 0 \\ \tilde{r}_{i,j} + r_{i-1,j-1}, & 1 \le i \le (M-1), 1 \le j \le (N-1) \end{cases}$$

where r is a reconstructed residual sample, $\tilde{r}$ is a sample of the losslessly coded block of video data, M and N define a size of the block of video data, and i and j define a location of a sample within the block of video data.

Example 6

The method of example 1, wherein the intra prediction mode is a diagonal down-left intra prediction mode, and wherein reconstructing residual samples according to the residual DPCM process comprises reconstructing residual samples according to the equation:

$$r_{i,j} = \begin{cases} \tilde{r}_{i,j}, & i = 0, 0 \le j \le (N-1) \\ \tilde{r}_{i,j}, & 1 \le i \le (M-1), j = (N-1) \\ \tilde{r}_{i,j} + r_{i-1,j+1}, & 1 \le i \le (M-1), 0 \le j \le (N-2) \end{cases}$$

where r is a reconstructed residual sample, $\tilde{r}$ is a sample of the losslessly coded block of video data, M and N define a size of the block of video data, and i and j define a location of a sample within the block of video data.

Example 7

The method of example 1, wherein the intra prediction mode is a diagonal up-right intra prediction mode, and wherein reconstructing residual samples according to the residual DPCM process comprises reconstructing residual samples according to the equation:

$$r_{i,j} = \begin{cases} \tilde{r}_{i,j}, & i = (M-1), 0 \le j \le (N-1) \\ \tilde{r}_{i,j}, & 0 \le i \le (M-2), j = 0 \\ \tilde{r}_{i,j} + r_{i+1,j-1}, & 0 \le i \le (M-2), 1 \le j \le (N-1) \end{cases}$$

where r is a reconstructed residual sample, $\tilde{r}$ is a sample of the losslessly coded block of video data, M and N define a size of the block of video data, and i and j define a location of a sample within the block of video data.

Example 8

The method of any combination of examples 1 to 7.

Example 9

The method of example 1, wherein the intra-prediction mode is a nearly-vertical intra prediction mode, the method further comprising: not reconstructing residual samples according to the residual DPCM process for a first row of the losslessly coded block of video data.

Example 10

The method of example 1, wherein the intra prediction mode is a nearly-horizontal intra prediction mode, the method further comprising: not reconstructing residual samples according to the residual DPCM process for a first column of the losslessly coded block of video data.

Example 11

The method of example 1, wherein the intra prediction mode is one of a DC intra prediction mode and a planar intra prediction mode, and wherein reconstructing residual samples according to the residual DPCM processes comprises reconstructing residual samples according to one of a vertical residual DPCM process and a horizontal DPCM process.

Example 12

The method of example 1, wherein the intra prediction mode is one of a DC intra prediction mode and a planar intra prediction mode, and wherein reconstructing residual samples according to the residual DPCM processes comprises reconstructing residual samples according to both a vertical residual DPCM process and a horizontal DPCM process.

Example 13

The method of example 1, wherein the intra prediction mode is a planar intra prediction mode, and wherein reconstructing residual samples according to the residual DPCM processes comprises reconstructing residual samples according to a diagonal DPCM process, a horizontal DPCM process, and a vertical DPCM process.

Example 14

A method for encoding video data, the method comprising: receiving a block of video data; performing intra prediction on the block of video data according to an intra prediction mode to produce a predictive block of samples and residual samples, wherein the intra prediction mode is not one of a vertical intra prediction mode and a horizontal intra prediction mode; and generating a losslessly coded block of video data from the residual samples using a residual differential pulse code modulation (DPCM) process.

Example 15

The method of example 14, wherein the intra prediction mode is one of a nearly-vertical intra prediction mode and a nearly-horizontal intra prediction mode.

Example 16

The method of example 15, wherein the nearly-vertical intra prediction mode is one of intra prediction modes 22 to 30, and wherein the nearly-horizontal intra prediction mode is one of intra prediction modes 6 to 14.

Example 17

The method of example 15, wherein the residual DPCM process is a vertical residual DPCM process for nearly-vertical intra prediction modes, and wherein the residual DPCM process is a horizontal residual DPCM process for nearly-horizontal intra prediction modes.

Example 18

The method of example 14, wherein the intra prediction mode is a diagonal down-right intra prediction mode, and wherein generating the losslessly coded block of video data from the residual samples using the residual DPCM process comprises generating the losslessly coded block of video data according to the equation:

$$\tilde{r}_{i,j} = \begin{cases} r_{i,j}, & i = 0, 0 \le j \le (N-1) \\ r_{i,j}, & 1 \le i \le (M-1), j = 0 \\ r_{i,j} - r_{i-1,j-1}, & 1 \le i \le (M-1), 1 \le j \le (N-1) \end{cases}$$

where r is a residual sample, $\tilde{r}$ is a sample of the losslessly coded block of video data, M and N define a size of the block of video data, and i and j define a location of a sample within the block of video data.

Example 19

The method of example 14, wherein the intra prediction mode is a diagonal down-right intra prediction mode, and wherein generating the losslessly coded block of video data from the residual samples using the residual DPCM process comprises generating the losslessly coded block of video data according to the equation:

$$\tilde{r}_{i,j} = \begin{cases} r_{i,j}, & i = 0, 0 \le j \le (N-1) \\ r_{i,j}, & 1 \le i \le (M-1), j = (N-1) \\ r_{i,j} - r_{i-1,j+1}, & 1 \le i \le (M-1), 0 \le j \le (N-2) \end{cases}$$

where r is a residual sample, $\tilde{r}$ is a sample of the losslessly coded block of video data, M and N define a size of the block of video data, and i and j define a location of a sample within the block of video data.

Example 20

The method of example 14, wherein the intra prediction mode is a diagonal down-right intra prediction mode, and wherein generating the losslessly coded block of video data from the residual samples using the residual DPCM process comprises generating the losslessly coded block of video data according to the equation:

$$\tilde{r}_{i,j} = \begin{cases} r_{i,j}, & i = (M-1), 0 \le j \le (N-1) \\ r_{i,j}, & 0 \le i \le (M-2), j = 0 \\ r_{i,j} - r_{i+1,j-1}, & 0 \le i \le (M-2), 1 \le j \le (N-1) \end{cases}$$

where r is a residual sample, $\tilde{r}$ is a sample of the losslessly coded block of video data, M and N define a size of the block of video data, and i and j define a location of a sample within the block of video data.

Example 21

The method of any combination of examples 14 to 20.

Example 22

The method of example 14, wherein the intra-prediction mode is a nearly-vertical intra prediction mode, the method further comprising: not generating the losslessly coded block of video data using the residual DPCM process for a first row of the block of video data.

Example 23

The method of example 14, wherein the intra prediction mode is a nearly-horizontal intra prediction mode, the method further comprising: not generating the losslessly coded block of video data using the residual DPCM process for a first column of the block of video data.

Example 24

The method of example 14, wherein the intra prediction mode is one of a DC intra prediction mode and a planar intra prediction mode, and wherein generating the losslessly coded block of video data from the residual samples using the residual DPCM processes comprises generating the losslessly coded block of video data from the residual samples according to one of a vertical residual DPCM process and a horizontal DPCM process.

Example 25

The method of example 14, wherein the intra prediction mode is one of a DC intra prediction mode and a planar intra prediction mode, and wherein generating the losslessly coded block of video data from the residual samples using the residual DPCM processes comprises generating the losslessly coded block of video data from the residual samples according to both a vertical residual DPCM process and a horizontal DPCM process.

Example 26

The method of example 14, wherein the intra prediction mode is a planar intra prediction mode, and wherein generating the losslessly coded block of video data from the residual samples using the residual DPCM processes comprises generating the losslessly coded block of video data from the residual samples according to a diagonal DPCM process, a horizontal DPCM process, and a vertical DPCM process.

Example 27

An apparatus configured to decode video data, the apparatus comprising: means for receiving a block of video data encoded using lossless coding and intra prediction; means for reconstructing residual samples from the losslessly coded block of video data according to a residual differential pulse code modulation (DPCM) process; and means for performing intra prediction according to an intra prediction mode using the residual samples to produce reconstructed video samples, wherein the intra prediction mode is not one of a vertical intra prediction mode and a horizontal intra prediction mode.

Example 28

The apparatus of example 27, wherein the intra prediction mode is one of a nearly-vertical intra prediction mode and a nearly-horizontal intra prediction mode.

Example 29

The apparatus of example 28, wherein the nearly-vertical intra prediction mode is one of intra prediction modes 22 to 30, and wherein the nearly-horizontal intra prediction mode is one of intra prediction modes 6 to 14.

Example 30

The apparatus of example 28, wherein the residual DPCM process is a vertical residual DPCM process for nearly-vertical intra prediction modes, and wherein the residual DPCM process is a horizontal residual DPCM process for nearly-horizontal intra prediction modes.

Example 31

The apparatus of example 27, wherein the intra prediction mode is a diagonal down-right intra prediction mode, and wherein the means for reconstructing residual samples according to the residual DPCM process comprises means for reconstructing residual samples according to the equation:

$$r_{i,j} = \begin{cases} \tilde{r}_{i,j}, & i=0, 0 \le j \le (N-1) \\ \tilde{r}_{i,j}, & 1 \le i \le (M-1), j=0 \\ \tilde{r}_{i,j} + r_{i-1,j-1}, & 1 \le i \le (M-1), 1 \le j \le (N-1) \end{cases}$$

where r is a reconstructed residual sample, $\tilde{r}$ is a sample of the losslessly coded block of video data, M and N define a size of the block of video data, and i and j define a location of a sample within the block of video data.

Example 32

The apparatus of example 27, wherein the intra prediction mode is a diagonal down-left intra prediction mode, and wherein the means for reconstructing residual samples according to the residual DPCM process comprises means for reconstructing residual samples according to the equation:

$$r_{i,j} = \begin{cases} \tilde{r}_{i,j}, & i=0, 0 \le j \le (N-1) \\ \tilde{r}_{i,j}, & 1 \le i \le (M-1), j=(N-1) \\ \tilde{r}_{i,j} + r_{i-1,j+1} & 1 \le i \le (M-1), 0 \le j \le (N-2) \end{cases}$$

where r is a reconstructed residual sample, $\tilde{r}$ is a sample of the losslessly coded block of video data, M and N define a size of the block of video data, and i and j define a location of a sample within the block of video data.

Example 33

The apparatus of example 27, wherein the intra prediction mode is a diagonal up-right intra prediction mode, and wherein the means for reconstructing residual samples according to the residual DPCM process comprises means for reconstructing residual samples according to the equation:

$$r_{i,j} = \begin{cases} \tilde{r}_{i,j}, & i=(M-1), 0 \le j \le (N-1) \\ \tilde{r}_{i,j}, & 0 \le i \le (M-2), j=0 \\ \tilde{r}_{i,j} + r_{i+1,j-1}, & 0 \le i \le (M-2), 1 \le j \le (N-1) \end{cases}$$

where r is a reconstructed residual sample, $\tilde{r}$ is a sample of the losslessly coded block of video data, M and N define a size of the block of video data, and i and j define a location of a sample within the block of video data.

Example 34

The apparatus of any combination of examples 27 to 33.

Example 35

The apparatus of example 27, wherein the intra-prediction mode is a nearly-vertical intra prediction mode, the apparatus further comprising: means for not reconstructing residual samples according the residual DPCM process for a first row of the losslessly coded block of video data.

Example 36

The apparatus of example 27, wherein the intra prediction mode is a nearly-horizontal intra prediction mode, the apparatus further comprising: means for not reconstructing residual samples according the residual DPCM process for a first column of the losslessly coded block of video data.

Example 37

The apparatus of example 27, wherein the intra prediction mode is one of a DC intra prediction mode and a planar intra prediction mode, and wherein the means for reconstructing residual samples according to the residual DPCM processes comprises means for reconstructing residual samples according to one of a vertical residual DPCM process and a horizontal DPCM process.

Example 38

The apparatus of example 27, wherein the intra prediction mode is one of a DC intra prediction mode and a planar intra prediction mode, and wherein the means for reconstructing residual samples according to the residual DPCM processes comprises means for reconstructing residual samples according to both a vertical residual DPCM process and a horizontal DPCM process.

Example 39

The apparatus of example 27, wherein the intra prediction mode is a planar intra prediction mode, and wherein the means for reconstructing residual samples according to the residual DPCM processes comprises means for reconstructing residual samples according to a diagonal DPCM process, a horizontal DPCM process, and a vertical DPCM process.

Example 40

An apparatus configured to encode video data, the apparatus comprising: means for receiving a block of video data; means for performing intra prediction on the block of video data according to an intra prediction mode to produce residual samples, wherein the intra prediction mode is not one of a vertical intra prediction mode and a horizontal intra prediction mode; and means for generating a losslessly coded block of video data from the residual samples using a residual differential pulse code modulation (DPCM) process.

Example 41

The apparatus of example 40, wherein the intra prediction mode is one of a nearly-vertical intra prediction mode and a nearly-horizontal intra prediction mode.

Example 42

The apparatus of example 41, wherein the nearly-vertical intra prediction mode is one of intra prediction modes 22 to 30, and wherein the nearly-horizontal intra prediction mode is one of intra prediction modes 6 to 14.

Example 43

The apparatus of example 41, wherein the residual DPCM process is a vertical residual DPCM process for nearly-vertical intra prediction modes, and wherein the residual DPCM process is a horizontal residual DPCM process for nearly-horizontal intra prediction modes.

Example 44

The apparatus of example 40, wherein the intra prediction mode is a diagonal down-right intra prediction mode, and wherein the means for generating the losslessly coded block of video data from the residual samples using the residual DPCM process comprises means for generating the losslessly coded block of video data according to the equation:

$$\tilde{r}_{i,j} = \begin{cases} r_{i,j}, & i = 0, 0 \le j \le (N-1) \\ r_{i,j}, & 1 \le i \le (M-1), j = 0 \\ r_{i,j} - r_{i-1,j-1}, & 1 \le i \le (M-1), 1 \le j \le (N-1) \end{cases}$$

where r is a residual sample, $\tilde{r}$ is a sample of the losslessly coded block of video data, M and N define a size of the block of video data, and i and j define a location of a sample within the block of video data.

Example 45

The apparatus of example 40, wherein the intra prediction mode is a diagonal down-right intra prediction mode, and wherein the means for generating the losslessly coded block of video data from the residual samples using the residual DPCM process comprises means for generating the losslessly coded block of video data according to the equation:

$$\tilde{r}_{i,j} = \begin{cases} r_{i,j}, & i = 0, 0 \le j \le (N-1) \\ r_{i,j}, & 1 \le i \le (M-1), j = (N-1) \\ r_{i,j} - r_{i-1,j+1}, & 1 \le i \le (M-1), 0 \le j \le (N-2) \end{cases}$$

where r is a residual sample, $\tilde{r}$ is a sample of the losslessly coded block of video data, M and N define a size of the block of video data, and i and j define a location of a sample within the block of video data.

Example 46

The apparatus of example 40, wherein the intra prediction mode is a diagonal down-right intra prediction mode, and wherein the means for generating the losslessly coded block of video data from the residual samples using the residual DPCM process comprises means for generating the losslessly coded block of video data according to the equation:

$$\tilde{r}_{i,j} = \begin{cases} r_{i,j}, & i = (M-1), 0 \le j \le (N-1) \\ r_{i,j}, & 0 \le i \le (M-2), j = 0 \\ r_{i,j} - r_{i+1,j-1}, & 0 \le i \le (M-2), 1 \le j \le (N-1) \end{cases}$$

where r is a residual sample, $\tilde{r}$ is a sample of the losslessly coded block of video data, M and N define a size of the block of video data, and i and j define a location of a sample within the block of video data.

Example 47

The apparatus of any combination of examples 40 to 46.

Example 48

The apparatus of example 40, wherein the intra-prediction mode is a nearly-vertical intra prediction mode, the apparatus further comprising: means for not generating the losslessly coded block of video data using the residual DPCM process for a first row of the block of video data.

Example 49

The apparatus of example 40, wherein the intra prediction mode is a nearly-horizontal intra prediction mode, the apparatus further comprising: means for not generating the losslessly coded block of video data using the residual DPCM process for a first column of the block of video data.

Example 50

The apparatus of example 40, wherein the intra prediction mode is one of a DC intra prediction mode and a planar intra prediction mode, and wherein the means for generating the losslessly coded block of video data from the residual samples using the residual DPCM processes comprises means for generating the losslessly coded block of video data from the residual samples according to one of a vertical residual DPCM process and a horizontal DPCM process.

Example 51

The apparatus of example 40, wherein the intra prediction mode is one of a DC intra prediction mode and a planar intra prediction mode, and wherein the means for generating the losslessly coded block of video data from the residual samples using the residual DPCM processes comprises means for generating the losslessly coded block of video data from the residual samples according to both a vertical residual DPCM process and a horizontal DPCM process.

Example 52

The apparatus of example 40, wherein the intra prediction mode is a planar intra prediction mode, and wherein the means for generating the losslessly coded block of video data from the residual samples using the residual DPCM processes comprises means for generating the losslessly coded block of video data from the residual samples according to a diagonal DPCM process, a horizontal DPCM process, and a vertical DPCM process.

Example 53

A video decoder configured to perform any combination of the methods of examples 1 to 13.

Example 54

A video encoder configured to perform any combination of the methods of examples 14 to 26.

Example 55

A computer-readable storage medium storing instructions that, when executed, cause one or more processors of a device configured to decode video data to perform any combination of the methods of examples 1 to 13.

Example 56

A computer-readable storage medium storing instructions that, when executed, cause one or more processors of a device configured to encode video data to perform any combination of the methods of examples 14 to 26.

The following paragraphs provide a fifth series of examples in accordance with one or more techniques of this disclosure.

Example 1

A method of coding video data, the method comprising: generating prediction samples for horizontal intra coding of a block of video data, wherein for every column of the block of video data, the prediction samples include a gradient term.

Example 2

The method of example 1, wherein the gradient term for the prediction samples in an initial row are given by $((P_{-1,j}-P_{-1,j-1})\gg 1)$.

Example 3

The method of any of examples 1-2, wherein a prediction sample for $P_{0,j}$, $0\leq j\leq N-1$ is: $\text{Clip}(P_{0,j-1}+((P_{-1,j}-P_{-1,j-1})\gg 1))$.

Example 4

The method of any of examples 1-3, wherein the prediction samples for $P_{i,j}$, $0\leq i\leq M-1$, $0\leq j\leq N-1$ are given by $\text{Clip}(P_{i,j-1}+((P_{i-1,j}-P_{i-1,j-1})\gg 1))$.

Example 5

The method of any of examples 5-8, wherein the method is applied for lossless horizontal intra coding.

Example 6

A method of coding video data, the method comprising: generating prediction samples for vertical intra coding of a block of video data, wherein for every row of the block of video data, the prediction samples include a gradient term.

Example 7

The method of example 6, wherein the gradient term for the prediction samples in an initial column are given as $((P_{i-1}-P_{i-1,-1})\gg 1)$.

Example 8

The method of any of examples 6-7, wherein a prediction sample for $P_{i,0}$, $0\leq i\leq M$ 1 is $\text{Clip}(P_{i-1,0}+((P_{i-1}-P_{i-1,-1})\gg 1))$.

Example 9

The method of any of examples 6-8, wherein the prediction samples for $P_{i,j}$, $0\leq i\leq M-1$, $0\leq j\leq N-1$ are given by $\text{Clip}(P_{i-1,j}+((P_{i,j-1}-P_{i-1,j-1})\gg 1)$

Example 10

The method of any of examples 6-9, wherein the method is applied for lossless vertical intra coding.

Example 11

The method any combination of examples 1-10.

Example 12

The method of any of examples 1-10 or combinations thereof, wherein the method is performed by an encoder and wherein coding refers to encoding.

Example 13

The method of any of examples 1-10 or combinations thereof, wherein the method is performed by a decoder and wherein coding refers to decoding.

Example 14

A system configured to perform the method of any of examples 1-10 or combinations thereof.

Example 15

A non-transitory computer readable storage medium storing instructions that when executed cause one or more processors to perform the method of any of examples 1-10 or combinations thereof.

Example 16

A video encoding device configured to perform the method of any of examples 1-10 or combinations thereof.

Example 17

A video decoding device configured to perform the method of any of examples 1-10 or combinations thereof.

Example 18

A video encoding device comprising means for performing the steps of the method of any of examples 1-10 or combinations thereof.

Example 19

A video decoding device comprising means for performing the steps of the method of any of examples 1-10 or combinations thereof.

In one or more examples, the functions described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   receiving a bitstream that comprises an encoded representation of a picture of the video data; and
   reconstructing the picture based at least in part on syntax elements in the bitstream, wherein reconstructing the picture comprises:
   using an intra prediction mode from a plurality of intra prediction modes to generate a predictive block for a prediction unit, the plurality of intra prediction modes including intra prediction modes having prediction directions between prediction directions of intra prediction modes 22 and 30 and prediction directions between prediction directions of intra prediction modes 6 and 14 as defined in High Efficiency Video Coding (HEVC) text specification draft 10;
   generating a residual block, wherein the residual block is a block for which transform application is skipped, the residual block consists of reconstructed residual values, and generating the residual block comprises generating the reconstructed residual values in the residual block such that the reconstructed residual values in the residual block indicate differences between sample values of the predictive block for the prediction unit and reconstructed sample values, wherein, for $0 \le i \le (M-1)$ and $0 \le j \le (N-1)$, where M is a height of the residual block and N is the width of the residual block, and $Q(r_{i,j})$ is a reconstructed residual value in the residual block for a residual value $r_{i,j}$ at position (i,j):
   for each of the intra prediction modes having prediction directions between the prediction directions of intra prediction modes 22 and 30, $Q(r_{i,j})$ is defined as:

$$Q(r_{i,j}) = \begin{cases} Q(\tilde{r}_{i,j}), & i = 0, 0 \le j \le (N-1), \\ Q(\tilde{r}_{i,j}) + Q(r_{i-1,j}) & 1 \le i \le (M-1), 0 \le j \le (N-1) \end{cases},$$

$Q(\tilde{r}_{i,j})$ denotes a quantized version of a residual value $\tilde{r}_{i,j}$, the residual value $\tilde{r}_{i,j}$ is defined as:

$$\tilde{r}_{i,j} = \begin{cases} r_{i,j}, & i = 0, 0 \le j \le (N-1) \\ r_{i,j} - Q(r_{(i-1),j}), & 1 \le i \le (M-1), 0 \le j \le (N-1) \end{cases},$$

and $Q(r_{i-1,j})$ is a reconstructed residual value for a residual value one row above the residual value $r_{i,j}$, and
   for each of the intra prediction modes having prediction directions between the prediction directions of intra prediction modes 6 and 14, $Q(r_{i,j})$ is defined as:

$$Q(r_{i,j}) = \begin{cases} Q(\tilde{r}_{i,j}), & 0 \le i \le (M-1), j = 0, \\ Q(\tilde{r}_{i,j}) + Q(r_{i,j-1}) & 0 \le i \le (M-1), 1 \le j \le (N-1) \end{cases},$$

and $Q(r_{i,j-1})$ is a reconstructed residual value for a residual value one column left of the residual value $r_{i,j}$, and the residual value $\tilde{r}_{i,j}$ is defined as:

$$\tilde{r}_{i,j} = \begin{cases} r_{i,j}, & 0 \le i \le (M-1), j = 0 \\ r_{i,j} - Q(r_{i,(j-1)}) & 0 \le i \le (M-1), 1 \le j \le (N-1) \end{cases};$$

and for 0≤i≤(M-1) and 0≤j≤(N-1), adding the reconstructed residual value $Q(r_{i,j})$ to a prediction value of the predictive block to reconstruct one of the reconstructed sample values.

2. The method of claim 1, further comprising obtaining, from the bitstream, one or more syntax elements indicating the quantized residual value $Q(\tilde{r}_{i,j})$.

3. The method of claim 1, wherein for a diagonal intra prediction mode in the plurality of intra prediction modes, $Q(r_{i,j})$ is defined as:

$$Q(r_{i,j}) = \begin{cases} Q(\tilde{r}_{i,j}), & i = 0, 0 \le j \le (N-1) \\ Q(\tilde{r}_{i,j}), & 1 \le i \le (M-1), j = 0 \\ Q(\tilde{r}_{i,j}) + Q(r_{i-1,j-1}), & 1 \le i \le (M-1), 1 \le j \le (N-1) \end{cases},$$

wherein $Q(r_{i-1,j-1})$ is a reconstructed residual value for a residual value one column left of and one row above the residual value $r_{i,j}$.

4. The method of claim 3, wherein, for the diagonal intra prediction mode, the residual value $\tilde{r}_{i,j}$ is defined as:

$$\tilde{r}_{i,j} = \begin{cases} r_{i,j}, & i = 0, 0 \le j \le (N-1) \\ r_{i,j}, & 1 \le i \le (M-1), j = 0 \\ r_{i,j} - Q(r_{i-1,j-1}), & 1 \le i \le (M-1), 1 \le j \le (N-1) \end{cases},$$

wherein $Q(r_{i-1,j-1})$ is a reconstructed residual value for a residual value $r_{i-1,j-1}$ that is one column left and one row above the residual value $r_{i,j}$.

5. The method of claim 1, wherein the residual value $r_{i,j}$ is a bit-shifted residual value.

6. A method of encoding video data, the method comprising:
generating an encoded representation of a picture of the video data; and
generating a bitstream that comprises the encoded representation of the picture,
wherein generating the encoded representation of the picture comprises:
using an intra prediction mode from a plurality of intra prediction modes to generate a predictive block for a prediction unit, the plurality of intra prediction modes including intra prediction modes having prediction directions between prediction directions of intra prediction modes 22 and 30 and prediction directions between prediction directions of intra prediction modes 6 and 14 as defined in High Efficiency Video Coding (HEVC) text specification draft 10;
generating a residual block, wherein the residual block is a block for which transform application is skipped, the residual block consists of residual values, and generating the residual block comprises:
generating the residual values in the residual block such that the residual values in the residual block indicate differences between sample values of the predictive block for the prediction unit and original sample values; and
after generating the residual values:
for 0≤i≤(M-1) and 0≤j≤(N-1), where M is a height of the residual block and N is the width of the residual block:
determining a residual value $\tilde{r}_{i,j}$ for a residual value $r_{i,j}$, wherein:
for each of the intra prediction modes having prediction directions between the prediction directions of intra prediction modes 22 and 30, $\tilde{r}_{i,j}$ is defined as:

$$\tilde{r}_{i,j} = \begin{cases} r_{i,j}, & i = 0, 0 \le j \le (N-1) \\ r_{i,j} - Q(r_{(i-1),j}), & 1 \le i \le (M-1), 0 \le j \le (N-1) \end{cases},$$

$Q(r_{(i-1),j})$ denotes a reconstructed residual value for a residual value $r_{i-1,j}$ one row above the residual value $r_{i,j}$,
for each of the intra prediction modes having prediction directions between the prediction directions of intra prediction modes 6 and 14, $\tilde{r}_{i,j}$ is defined as:

$$\tilde{r}_{i,j} = \begin{cases} r_{i,j}, & 0 \le i \le (M-1), j = 0 \\ r_{i,j} - Q(r_{i,(j-1)}) & 0 \le i \le (M-1), 1 \le j \le (N-1) \end{cases},$$

and
$Q(r_{i,(j-1)})$ denotes a reconstructed residual value for a residual value $r_{i,j-1}$ one column left of the residual value $r_{i,j}$; and
quantizing the residual value $\tilde{r}_{i,j}$ to produce a quantized residual value $Q(\tilde{r}_{i,j})$.

7. The method of claim 6, wherein generating the bitstream comprises signaling the quantized residual value $Q(\tilde{r}_{i,j})$ in the bitstream.

8. The method of claim 6, wherein:
for a vertical intra prediction mode in the plurality of intra prediction modes, $Q(r_{i,j})$ is defined as:

$$Q(r_{i,j}) = \begin{cases} Q(\tilde{r}_{i,j}), & i = 0, 0 \le j \le (N-1), \\ Q(\tilde{r}_{i,j}) + Q(r_{i-1,j}) & 1 \le i \le (M-1), 0 \le j \le (N-1) \end{cases},$$

and
for a horizontal intra prediction mode in the plurality of intra prediction modes, $Q(r_{i,j})$ is defined as:

$$Q(r_{i,j}) = \begin{cases} Q(\tilde{r}_{i,j}), & 0 \le i \le (M-1), j = 0, \\ Q(\tilde{r}_{i,j}) + Q(r_{i,j-1}) & 0 \le i \le (M-1), 1 \le j \le (N-1) \end{cases}.$$

9. The method of claim 8, further comprising:
adding $Q(r_{i,j})$ to a prediction value to reconstruct a sample value; and
using the sample value for intra prediction or inter prediction of other blocks.

10. The method of claim 6, wherein for the intra prediction modes having prediction directions between the prediction directions of intra prediction modes 22 and 30, $Q(r_{i,j})$ is defined as:

$$Q(r_{i,j}) = \begin{cases} Q(\tilde{r}_{i,j}), & i = 0, 0 \le j \le (N-1), \\ Q(\tilde{r}_{i,j}) + Q(r_{i-1,j}) & 1 \le i \le (M-1), 0 \le j \le (N-1) \end{cases},$$

and
for the intra prediction modes having prediction directions between the prediction directions of intra prediction modes 6 and 14, $Q(r_{i,j})$ is defined as:

$$Q(r_{i,j}) = \begin{cases} Q(\tilde{r}_{i,j}), & 0 \le i \le (M-1), j = 0, \\ Q(\tilde{r}_{i,j}) + Q(r_{i,j-1}) & 0 \le i \le (M-1), 1 \le j \le (N-1) \end{cases}.$$

11. The method of claim 6, wherein for a diagonal intra prediction mode in the plurality of intra prediction modes, $\tilde{r}_{i,j}$ is defined as:

$$\tilde{r}_{i,j} = \begin{cases} r_{i,j}, & i = 0, 0 \le j \le (N-1) \\ r_{i,j}, & 1 \le i \le (M-1), j = 0 \\ r_{i,j} - Q(r_{i-1,j-1}), & 1 \le i \le (M-1), 1 \le j \le (N-1) \end{cases},$$

wherein $Q(r_{i-1,j-1})$ is a reconstructed residual value for a residual value $r_{i-1,j-1}$ that is one column left and one row above the residual value $r_{i,j}$.

12. The method of claim 11, wherein:
for the diagonal intra prediction mode, $Q(r_{i,j})$ is defined as:

$$Q(r_{i,j}) = \begin{cases} Q(\tilde{r}_{i,j}), & i = 0, 0 \le j \le (N-1) \\ Q(\tilde{r}_{i,j}), & 1 \le i \le (M-1), j = 0 \\ Q(\tilde{r}_{i,j}) + Q(r_{i-1,j-1}), & 1 \le i \le (M-1), 1 \le j \le (N-1) \end{cases},$$

wherein $Q(r_{i-1,j-1})$ is a reconstructed version of a residual value one column left of and one row above the residual value $r_{i,j}$.

13. The method of claim 6, wherein the residual value $r_{i,j}$ is a bit-shifted residual value.

14. A video decoding apparatus comprising:
a memory configured to store video data; and
one or more processors configured to:
receive a bitstream that comprises an encoded representation of a picture of the video data; and
use an intra prediction mode from a plurality of intra prediction modes to generate a predictive block for a prediction unit, the plurality of intra prediction modes including intra prediction modes having prediction directions between prediction directions of intra prediction modes 22 and 30 and prediction directions between prediction directions of intra prediction modes 6 and 14 as defined in High Efficiency Video Coding (HEVC) text specification draft 10;
reconstruct the picture based at least in part on syntax elements in the bitstream, wherein the one or more processors are configured such that, as part of reconstructing the picture, the one or more processors:
generate a residual block, wherein the residual block is a block for which transform application is skipped, the residual block consists of reconstructed residual values, and to generate the residual block, the one or more processors generate the reconstructed residual values in the residual block such that the reconstructed residual values in the residual block indicate differences between sample values of the predictive block for the prediction unit and reconstructed sample values, wherein, for $0 \le i \le (M-1)$ and $0 \le j \le (N-1)$, where M is a height of the residual block and N is the width of the residual block, and $Q(r_{i,j})$ is a reconstructed residual value $Q(r_{i,j})$ in the residual block for a residual value $r_{i,j}$ at position (i,j):
for each of the intra prediction modes having prediction directions between the prediction directions of intra prediction modes 22 and 30, $Q(r_{i,j})$ is defined as:

$$Q(r_{i,j}) = \begin{cases} Q(\tilde{r}_{i,j}), & i = 0, 0 \le j \le (N-1), \\ Q(\tilde{r}_{i,j}) + Q(r_{i-1,j}) & 1 \le i \le (M-1), 0 \le j \le (N-1) \end{cases},$$

and
$Q(\tilde{r}_{i,j})$ denotes a quantized version of a residual value $\tilde{r}_{i,j}$, the residual value $\tilde{r}_{i,j}$ is defined as:

$$\tilde{r}_{i,j} = \begin{cases} r_{i,j}, & i = 0, 0 \le j \le (N-1) \\ r_{i,j} - Q(r_{(i-1),j}), & 1 \le i \le (M-1), 0 \le j \le (N-1) \end{cases},$$

and $Q(r_{i-1,j})$ is a reconstructed residual value for a residual value one row above the residual value $r_{i,j}$, and
for each of the intra prediction modes having prediction directions between the prediction directions of intra prediction modes 6 and 14, $Q(r_{i,j})$ is defined as:

$$Q(r_{i,j}) = \begin{cases} Q(\tilde{r}_{i,j}), & 0 \le i \le (M-1), j = 0, \\ Q(\tilde{r}_{i,j}) + Q(r_{i,j-1}) & 0 \le i \le (M-1), 1 \le j \le (N-1) \end{cases},$$

$Q(r_{i,j-1})$ is a reconstructed residual value for a residual value one column left of the residual value $r_{i,j}$, and the residual value $\tilde{r}_{i,j}$ is defined as:

$$\tilde{r}_{i,j} = \begin{cases} r_{i,j}, & 0 \le i \le (M-1), j = 0 \\ r_{i,j} - Q(r_{i,(j-1)}) & 0 \le i \le (M-1), 1 \le j \le (N-1) \end{cases};$$

and
for $0 \le i \le (M-1)$ and $0 \le j \le (N-1)$, add the reconstructed residual value $Q(r_{i,j})$ to a prediction value of the predictive block to reconstruct one of the reconstructed sample values.

15. The video decoding apparatus of claim 14, wherein the one or more processors are configured to obtain, from a bitstream, one or more syntax elements indicating the quantized residual value $Q(\tilde{r}_{i,j})$.

16. The video decoding apparatus of claim 14, wherein for a diagonal intra prediction mode in the plurality of intra prediction modes, $Q(r_{i,j})$ is defined as:

$$Q(r_{i,j}) = \begin{cases} Q(\tilde{r}_{i,j}), & i = 0, 0 \le j \le (N-1) \\ Q(\tilde{r}_{i,j}), & 1 \le i \le (M-1), j = 0 \\ Q(\tilde{r}_{i,j}) + Q(r_{i-1,j-1}), & 1 \le i \le (M-1), 1 \le j \le (N-1) \end{cases},$$

wherein $Q(r_{i-1,j-1})$ is a reconstructed residual value for a residual value one column left of and one row above the residual value $r_{i,j}$.

17. The video decoding apparatus of claim 16, wherein, for the diagonal intra prediction mode, the residual value $\tilde{r}_{i,j}$ is defined as:

$$\tilde{r}_{i,j} = \begin{cases} r_{i,j}, & i = 0, 0 \le j \le (N-1) \\ r_{i,j}, & 1 \le i \le (M-1), j = 0 \\ r_{i,j} - Q(r_{i-1,j-1}), & 1 \le i \le (M-1), 1 \le j \le (N-1) \end{cases}.$$

18. The video decoding apparatus of claim 14, wherein the residual value $r_{i,j}$ is a bit-shifted residual value.

19. The video decoding apparatus of claim 14, wherein the video decoding apparatus comprises at least one of:
an integrated circuit;
a microprocessor; and
a wireless communication device that includes the one or more processors.

20. A video encoding apparatus comprising:
a memory configured to store video data; and
one or more processors configured to:
generate an encoded representation of a picture of the video data; and
generate a bitstream that comprises the encoded representation of the picture,
wherein the one or more processors are configured such that, as part of generating the encoded representation of the picture, the one or more processors:
use an intra prediction mode from a plurality of intra prediction modes to generate a predictive block for a prediction unit, the plurality of intra prediction modes includes intra prediction modes having prediction directions between prediction directions of intra prediction modes 22 and 30 and prediction directions between prediction directions of intra prediction modes 6 and 14 as defined in High Efficiency Video Coding (HEVC) text specification draft 10;
generate a residual block, wherein the residual block is a block for which transform application is skipped and the residual block consists of residual values, and
wherein the one or more processors are configured such that, as part of generating the residual block, the one or more processors:
generate the residual values in the residual block such that the residual values in the residual block indicate differences between sample values of the predictive block for the prediction unit and original sample values; and
after generating the residual values:
for $0 \le i \le (M-1)$ and $0 \le j \le (N-1)$, where M is a height of a block and N is the width of a block:
determine a residual value $\tilde{r}_{i,j}$ for a residual value $r_{i,j}$, wherein:
for each of the intra prediction modes having prediction directions between the prediction directions of intra prediction modes 22 and 30, $\tilde{r}_{i,j}$ is defined as:

$$\tilde{r}_{i,j} = \begin{cases} r_{i,j}, & i = 0, 0 \le j \le (N-1) \\ r_{i,j} - Q(r_{(i-1),j}), & 1 \le i \le (M-1), 0 \le j \le (N-1) \end{cases},$$

$Q(r_{(i-1),j})$ denotes a reconstructed residual value for a residual value $r_{i-1,j}$ one row above the residual value $r_{i,j}$, and
for each of the intra prediction modes having prediction directions between the prediction directions of intra prediction modes 6 and 14, $\tilde{r}_{i,j}$ is defined as:

$$\tilde{r}_{i,j} = \begin{cases} r_{i,j}, & 0 \le i \le (M-1), j = 0 \\ r_{i,j} - Q(r_{i,(j-1)}) & 0 \le i \le (M-1), 1 \le j \le (N-1) \end{cases},$$

and
$Q(r_{i,(j-1)})$ denotes a reconstructed residual value for a residual value $r_{i,j-1}$ one column left of the residual value $r_{i,j}$; and
quantize the residual value $\tilde{r}_{i,j}$ to produce a quantized residual value $Q(\tilde{r}_{i,j})$.

21. The video encoding apparatus of claim 20, further comprising signaling the quantized residual value $Q(\tilde{r}_{i,j})$ in a bitstream.

22. The video encoding apparatus of claim 20, wherein for a vertical intra prediction mode in the plurality of intra prediction modes, $Q(r_{i,j})$ is defined as:

$$Q(r_{i,j}) = \begin{cases} Q(\tilde{r}_{i,j}), & i = 0, 0 \le j \le (N-1), \\ Q(\tilde{r}_{i,j}) + Q(r_{i-1,j}) & 1 \le i \le (M-1), 0 \le j \le (N-1) \end{cases},$$

and
for a horizontal intra prediction mode in the plurality of intra prediction modes, $Q(r_{i,j})$ is defined as:

$$Q(r_{i,j}) = \begin{cases} Q(\tilde{r}_{i,j}), & 0 \le i \le (M-1), j = 0, \\ Q(\tilde{r}_{i,j}) + Q(r_{i,j-1}) & 0 \le i \le (M-1), 1 \le j \le (N-1) \end{cases}.$$

23. The video encoding apparatus of claim 22, wherein the one or more processors are configured to:
add the reconstructed residual value $Q(r_{i,j})$ to a prediction value to reconstruct a sample value; and
use the sample value for intra prediction or inter prediction of other blocks.

24. The video encoding apparatus of claim 20, wherein for the intra prediction modes having prediction directions between the prediction directions of intra prediction modes 22 and 30, the quantized residual value $Q(r_{i,j})$ is defined as:

$$Q(r_{i,j}) = \begin{cases} Q(\tilde{r}_{i,j}), & i = 0, 0 \le j \le (N-1), \\ Q(\tilde{r}_{i,j}) + Q(r_{i-1,j}) & 1 \le i \le (M-1), 0 \le j \le (N-1) \end{cases},$$

and
for the intra prediction modes having prediction directions between the prediction directions of intra prediction modes 6 and 14, $Q(r_{i,j})$ is defined as:

$$Q(r_{i,j}) = \begin{cases} Q(\tilde{r}_{i,j}), & 0 \le i \le (M-1), j = 0, \\ Q(\tilde{r}_{i,j}) + Q(r_{i,j-1}) & 0 \le i \le (M-1), 1 \le j \le (N-1) \end{cases}.$$

25. The video encoding apparatus of claim 20, wherein for a diagonal intra prediction mode in the plurality of intra prediction modes, $\tilde{r}_{i,j}$ is defined as:

$$\tilde{r}_{i,j} = \begin{cases} r_{i,j}, & i = 0, 0 \le j \le (N-1) \\ r_{i,j}, & 1 \le i \le (M-1), j = 0 \\ r_{i,j} - Q(r_{i-1,j-1}), & 1 \le i \le (M-1), 1 \le j \le (N-1) \end{cases},$$

wherein $Q(r_{i-1,j-1})$ is a reconstructed residual value for a residual value $r_{i-1,j-1}$ that is one column left and one row above the residual value $r_{i,j}$.

26. The video encoding apparatus of claim 25, wherein, for the diagonal intra prediction mode, $Q(r_{i,j})$ is defined as:

$$Q(r_{i,j}) = \begin{cases} Q(\tilde{r}_{i,j}), & i = 0, 0 \le j \le (N-1) \\ Q(\tilde{r}_{i,j}), & 1 \le i \le (M-1), j = 0 \\ Q(\tilde{r}_{i,j}) + Q(r_{i-1,j-1}), & 1 \le i \le (M-1), 1 \le j \le (N-1) \end{cases},$$

wherein $Q(r_{i-1,j-1})$ is a reconstructed version of a residual value one column left of and one row above the residual value $r_{i,j}$; and
the one or more processors are configured to add the reconstructed residual value $Q(r_{i-1,j-1})$ to a prediction value to reconstruct a sample value.

27. The video encoding apparatus of claim 20, wherein the residual value $r_{i,j}$ is a bit-shifted residual value.

28. The video encoding apparatus of claim 20, wherein the video encoding apparatus comprises at least one of:
an integrated circuit;
a microprocessor; and
a wireless communication device that includes the one or more processors.

29. A video decoding apparatus comprising:
means for receiving a bitstream that comprises an encoded representation of a picture of video data; and
means for reconstructing the picture based at least in part on syntax elements in the bitstream, wherein the means for reconstructing the picture comprises:
means for using an intra prediction mode from a plurality of intra prediction modes to generate a predictive block for a prediction unit, the plurality of intra prediction modes including intra prediction modes having prediction directions between prediction directions of intra prediction modes 22 and 30 and prediction directions between prediction directions of intra prediction modes 6 and 14 as defined in High Efficiency Video Coding (HEVC) text specification draft 10;
means for generating a residual block, wherein the residual block is a block for which transform application is skipped, the residual block consists of reconstructed residual values, and the means for generating the residual block comprises means for generating the reconstructed residual values in the residual block such that the reconstructed residual values in the residual block indicate differences between sample values of the predictive block for the prediction unit and reconstructed sample values, wherein, for $0 \le i \le (M-1)$ and $0 \le j \le (N-1)$, where M is a height of the residual block and N is the width of the residual block, and $Q(r_{i,j})$ is a reconstructed residual value in the residual block for a residual value $r_{i,j}$ at position (i,j):
for each of the intra prediction modes having prediction directions between the prediction directions of intra prediction modes 22 and 30, $Q(r_{i,j})$ is defined as:

$$Q(r_{i,j}) = \begin{cases} Q(\tilde{r}_{i,j}), & i = 0, 0 \le j \le (N-1), \\ Q(\tilde{r}_{i,j}) + Q(r_{i-1,j}) & 1 \le i \le (M-1), 0 \le j \le (N-1) \end{cases},$$

$Q(\tilde{r}_{i,j})$ denotes a quantized version of a residual value $\tilde{r}_{i,j}$, the residual value $\tilde{r}_{i,j}$ is defined as:

$$\tilde{r}_{i,j} = \begin{cases} r_{i,j}, & i = 0, 0 \le j \le (N-1) \\ r_{i,j} - Q(r_{(i-1),j}), & 1 \le i \le (M-1), 0 \le j \le (N-1) \end{cases},$$

$Q(r_{i-1,j})$ is a reconstructed residual value for a residual value one row above the residual value $r_{i,j}$, and
for each of the intra prediction modes having prediction directions between the prediction directions of intra prediction modes 6 and 14, $Q(r_{i,j})$ is defined as:

$$Q(r_{i,j}) = \begin{cases} Q(\tilde{r}_{i,j}), & 0 \le i \le (M-1), j = 0, \\ Q(\tilde{r}_{i,j}) + Q(r_{i,j-1}) & 0 \le i \le (M-1), 1 \le j \le (N-1) \end{cases},$$

and $Q(r_{i,j-1})$ is a reconstructed residual value for a residual value one column left of the residual value $r_{i,j}$, and the residual value $\tilde{r}_{i,j}$ is defined as:

$$\tilde{r}_{i,j} = \begin{cases} r_{i,j}, & 0 \le i \le (M-1), j = 0 \\ r_{i,j} - Q(r_{i,(j-1)}) & 0 \le i \le (M-1), 1 \le j \le (N-1) \end{cases};$$

and for $0 \le i \le (M-1)$ and $0 \le j \le (N-1)$, means for adding the reconstructed residual value $Q(r_{i,j})$ to a prediction value of the predictive block to reconstruct one of the reconstructed sample values.

30. A video encoding apparatus comprising:
means for generating an encoded representation of a picture of video data; and
means for generating a bitstream that comprises the encoded representation of the picture,
wherein the means for generating the encoded representation of the picture comprises:
means for using an intra prediction mode from a plurality of intra prediction modes to generate a predictive block for a prediction unit, the plurality of intra prediction modes includes intra prediction modes having prediction directions between prediction directions of intra prediction modes 22 and 30 and prediction directions between prediction directions of intra prediction modes 6 and 14 as defined in High Efficiency Video Coding (HEVC) text specification draft 10;

means for generating a residual block, wherein the residual block is a block for which transform application is skipped, the residual block consists of residual values, and the means for generating the residual block comprises:

means for generating the residual values in the residual block such that the residual values in the residual block indicate differences between sample values of the predictive block for the prediction unit and original sample values; and for $0 \le i \le (M-1)$ and $0 \le j \le (N-1)$, where M is a height of the residual block and N is the width of the residual block:

means for determining, after generating the residual values, a residual value $\tilde{r}_{i,j}$ for a residual value $r_{i,j}$, wherein:

for each of the intra prediction modes having prediction directions between the prediction directions of intra prediction modes 22 and 30, $\tilde{r}_{i,j}$ is defined as:

$$\tilde{r}_{i,j} = \begin{cases} r_{i,j}, & i=0, 0 \le j \le (N-1) \\ r_{i,j} - Q(r_{(i-1),j}), & 1 \le i \le (M-1), 0 \le j \le (N-1) \end{cases},$$

$Q(r_{(i-1),j})$ denotes a reconstructed residual value for a residual value $r_{i-1,j}$ one row above the residual value $r_{i,j}$, and for each of the intra prediction modes having prediction directions between the prediction directions of intra prediction modes 6 and 14, $\tilde{r}_{i,j}$ is defined as:

$$\tilde{r}_{i,j} = \begin{cases} r_{i,j}, & 0 \le i \le (M-1), j=0 \\ r_{i,j} - Q(r_{i,(j-1)}) & 0 \le i \le (M-1), 1 \le j \le (N-1) \end{cases},$$

$Q(r_{i,(j-1)})$ denotes a reconstructed residual value for a residual value $r_{i,j-1}$ one column left of the residual value $r_{i,j}$; and means for quantizing the residual value $\tilde{r}_{i,j}$ to produce a quantized residual value $Q(\tilde{r}_{i,j})$.

31. A non-transitory computer-readable data storage medium having instructions stored thereon that, when executed, cause a video decoding apparatus to:

receive a bitstream that comprises an encoded representation of a picture of video data; and reconstruct the picture based at least in part on syntax elements in the bitstream, wherein as part of causing the video decoding apparatus to reconstruct the picture, the instructions cause the video decoding apparatus to:

use an intra prediction mode from a plurality of intra prediction modes to generate a predictive block for a prediction unit, the plurality of intra prediction modes including intra prediction modes having prediction directions between prediction directions of intra prediction modes 22 and 30 and prediction directions between prediction directions of intra prediction modes 6 and 14 as defined in High Efficiency Video Coding (HEVC) text specification draft 10;

generate a residual block, wherein the residual block is a block for which transform application is skipped, the residual block consists of reconstructed residual values, and as part of causing the video decoding apparatus to generate the residual block, the instructions cause the video decoding apparatus to generate the reconstructed residual values in the residual block such that the reconstructed residual values in the residual block indicate differences between sample values of the predictive block for the prediction unit and reconstructed sample values, wherein, for $0 \le i \le (M-1)$ and $0 \le j \le (N-1)$, where M is a height of the residual block and N is the width of the residual block, and $Q(r_{i,j})$ is a reconstructed residual value in the residual block for a residual value $r_{i,j}$ at position (i,j):

for each of the intra prediction modes having prediction directions between the prediction directions of intra prediction modes 22 and 30, $Q(r_{i,j})$ is defined as:

$$\tilde{r}_{i,j} = \begin{cases} r_{i,j}, & i=0, 0 \le j \le (N-1) \\ r_{i,j} - Q(r_{(i-1),j}), & 1 \le i \le (M-1), 0 \le j \le (N-1) \end{cases},$$

$Q(\tilde{r}_{i,j})$ denotes a quantized version of a residual value $\tilde{r}_{i,j}$, the residual value $\tilde{r}_{i,j}$ is defined as:

$$\tilde{r}_{i,j} = \begin{cases} r_{i,j}, & i=0, 0 \le j \le (N-1) \\ r_{i,j} - Q(r_{(i-1),j}), & 1 \le i \le (M-1), 0 \le j \le (N-1) \end{cases},$$

and $Q(r_{i-1,j})$ is a reconstructed residual value for a residual value one row above the residual value $r_{i,j}$, and for each of the intra prediction modes having prediction directions between the prediction directions of intra prediction modes 6 and 14, $Q(r_{i,j})$ is defined as:

$$Q(r_{i,j}) = \begin{cases} Q(\tilde{r}_{i,j}), & 0 \le i \le (M-1), j=0, \\ Q(\tilde{r}_{i,j}) + Q(r_{i,j-1}) & 0 \le i \le (M-1), 1 \le j \le (N-1) \end{cases},$$

$Q(r_{i,j-1})$ is a reconstructed residual value for a residual value one column left of the residual value $r_{i,j}$, and the residual value $\tilde{r}_{i,j}$ is defined as:

$$\tilde{r}_{i,j} = \begin{cases} r_{i,j}, & 0 \le i \le (M-1), j=0 \\ r_{i,j} - Q(r_{i,(j-1)}) & 0 \le i \le (M-1), 1 \le j \le (N-1) \end{cases};$$

and for $0 \le i \le (M-1)$ and $0 \le j \le (N-1)$, add the reconstructed residual value $Q(r_{i,j})$ to a prediction value of the predictive block to reconstruct one of the reconstructed sample values.

32. A non-transitory computer-readable data storage medium having instructions stored thereon that, when executed, cause a video encoding apparatus to:

generate an encoded representation of a picture of video data; and generate a bitstream that comprises the encoded representation of the picture, wherein as part of causing the video encoding apparatus to generate the encoded representation of the picture, the instructions cause the video encoding apparatus to:

use an intra prediction mode from a plurality of intra prediction modes to generate a predictive block for a prediction unit, the plurality of intra prediction modes includes intra prediction modes having prediction directions between prediction directions of intra prediction modes 22 and 30 and prediction directions between prediction directions of intra prediction modes 6 and 14 as defined in High Efficiency Video Coding (HEVC) text specification draft 10;

generate a residual block for, wherein the residual block is a block for which transform application is skipped, the residual block consists of residual values, and as part of causing the video encoding apparatus to generate the residual block, the instructions cause the video encoding apparatus to:

generate the residual values in the residual block such that the residual values in the residual block indicate differences between sample values of the predictive block for the prediction unit and original sample values; and after generating the residual values:

for 0≤i≤(M−1) and 0≤j≤(N−1), where M is a height of the residual block and N is the width of the residual block:

determine a residual value $\tilde{r}_{i,j}$ for a residual value $r_{i,j}$, wherein:

for each of the intra prediction modes having prediction directions between the prediction directions of intra prediction modes 22 and 30, $\tilde{r}_{i,j}$ is defined as:

$$\tilde{r}_{i,j} = \begin{cases} r_{i,j}, & i = 0, 0 \leq j \leq (N-1) \\ r_{i,j} - Q(r_{(i-1),j}), & 1 \leq i \leq (M-1), 0 \leq j \leq (N-1) \end{cases},$$

$Q(r_{(i-1),j})$ denotes a reconstructed residual value for a residual value $r_{i-1,j}$ one row above the residual value $r_{i,j}$, and for each of the intra prediction modes having prediction directions between the prediction directions of intra prediction modes 6 and 14, $\tilde{r}_{i,j}$ is defined as:

$$\tilde{r}_{i,j} = \begin{cases} r_{i,j}, & 0 \leq i \leq (M-1), j = 0 \\ r_{i,j} - Q(r_{i,(j-1)}) & 0 \leq i \leq (M-1), 1 \leq j \leq (N-1) \end{cases},$$

$Q(r_{i,(j-1)})$ denotes a reconstructed residual value for a residual value $r_{i,j-1}$ one column left of the residual value $r_{i,j}$; and quantize the residual value $\tilde{r}_{i,j}$ to produce a quantized residual value $Q(\tilde{r}_{i,j})$.

33. The video decoding device of claim 14, further comprising a display configured to display decoded video data.

34. The video encoding device of claim 20, further comprising a camera configured to capture the video data.

* * * * *